(12) United States Patent
Hu

(10) Patent No.: US 11,727,598 B2
(45) Date of Patent: *Aug. 15, 2023

(54) SYSTEMS AND METHODS FOR POSITIONING AN OBJECT

(71) Applicant: SHANGHAI UNITED IMAGING HEALTHCARE CO., LTD., Shanghai (CN)

(72) Inventor: Renfang Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 54 days.

This patent is subject to a terminal disclaimer.

(21) Appl. No.: 17/455,933

(22) Filed: Nov. 22, 2021

(65) Prior Publication Data
US 2022/0084245 A1 Mar. 17, 2022

Related U.S. Application Data

(63) Continuation of application No. 16/236,585, filed on Dec. 30, 2018, now Pat. No. 11,182,927.

(30) Foreign Application Priority Data

| Sep. 18, 2018 | (CN) | 201811088902.X |
| Sep. 18, 2018 | (CN) | 201821524684.5 |
| Nov. 30, 2018 | (CN) | 201811458370.4 |

(51) Int. Cl.
*G06T 7/80* (2017.01)
*G06T 7/70* (2017.01)
(Continued)

(52) U.S. Cl.
CPC .......... *G06T 7/80* (2017.01); *G06T 7/70* (2017.01); *G06T 7/97* (2017.01); *H04N 7/183* (2013.01);
(Continued)

(58) Field of Classification Search
None
See application file for complete search history.

(56) References Cited

U.S. PATENT DOCUMENTS

| 2012/0215094 A1 | 8/2012 | Rahimian et al. |
| 2013/0083894 A1 | 4/2013 | Niebler et al. |

(Continued)

FOREIGN PATENT DOCUMENTS

| CN | 101297760 A | 11/2008 |
| CN | 100502788 C | 6/2009 |

(Continued)

OTHER PUBLICATIONS

Zhang, Xinyou, Medical Graphics and Image Processing, China Traditional Chinese Medicine Press, 2018, 7 pages.

*Primary Examiner* — Daniel T Tekle
(74) *Attorney, Agent, or Firm* — Metis IP LLC

(57) ABSTRACT

A method for positioning an object in a device is provided. The method may include: obtaining, using a capture device, a target image of the object on a table of the device; determining, in the target image, a current mock location associated with a target region of the object to be scanned or treated by the device; determining a distance between a current physical location of the target region and a target position based on the current mock location associated with the target region in the target image and a mapping relation; and/or causing the table to move such that the target region of the object is located at or in the vicinity of the target position, based on the distance.

20 Claims, 29 Drawing Sheets

(51) Int. Cl.
 *H04N 7/18* (2006.01)
 *G06T 7/00* (2017.01)
(52) U.S. Cl.
 CPC .............. *G06T 2207/10028* (2013.01); *G06T 2207/30004* (2013.01); *G06T 2207/30204* (2013.01)

(56) References Cited

U.S. PATENT DOCUMENTS

| | | |
|---|---|---|
| 2015/0047125 A1 | 2/2015 | Bae et al. |
| 2015/0272505 A1 | 10/2015 | Schmidt et al. |
| 2016/0073379 A1 | 3/2016 | Braun et al. |
| 2016/0225170 A1* | 8/2016 | Rifu .................. G06T 11/005 |
| 2018/0160994 A1 | 6/2018 | Harrington et al. |

FOREIGN PATENT DOCUMENTS

| | | |
|---|---|---|
| CN | 102698373 A | 10/2012 |
| CN | 103424113 A | 12/2013 |
| CN | 203736217 U | 7/2014 |
| CN | 104123432 A | 10/2014 |
| CN | 104414677 A | 3/2015 |
| CN | 104936283 A | 9/2015 |
| CN | 103767722 B | 4/2016 |
| CN | 106388851 A | 2/2017 |
| CN | 107456239 A | 12/2017 |
| JP | 2004223027 A | 8/2004 |

* cited by examiner

800

```
┌─────────────────────────────────────────────────────────────┐
│ Displaying the one or more images and/or a second message   │  ∿ 801
│ notifying that the one or more mock locations need to be    │
│                      determined                              │
└─────────────────────────────────────────────────────────────┘
                              ↓
┌─────────────────────────────────────────────────────────────┐
│ Receiving, from an operator, information indicating a       │  ∿ 803
│ location of at least one marker in at least one image of    │
│ the one or more images                                       │
└─────────────────────────────────────────────────────────────┘
                              ↓
┌─────────────────────────────────────────────────────────────┐
│ Determining the one or more mock locations based on the     │  ∿ 805
│                   received information                       │
└─────────────────────────────────────────────────────────────┘
```

FIG. 8

SYSTEMS AND METHODS FOR POSITIONING AN OBJECT

CROSS-REFERENCE TO RELATED APPLICATIONS

This application is a continuation of U.S. patent application Ser. No. 16/236,585, filed on Dec. 30, 2018, which claims priority to Chinese Patent Application No. 201811088902.X, filed on Sep. 18, 2018, Chinese Patent Application No. 201821524684.5, filed on Sep. 18, 2018, and Chinese Patent Application No. 201811458370.4, filed on Nov. 30, 2018, the contents of each of which are hereby incorporated by reference in its entirety.

TECHNICAL FIELD

The present disclosure generally relates to imaging technology, and more specifically relates to systems and methods for positioning an object to be imaged or treated.

BACKGROUND

In medical imaging (e.g., computed tomography (CT) imaging, magnetic resonance imaging (MRI), positron emission tomography-computed tomography (PET-CT) imaging, positron emission tomography-magnetic resonance imaging (PET-MRI), or the like) or radiation therapy (RT), a target of an object needs to be positioned so that the target can be located at an imaging isocenter of an imaging device or a treatment isocenter of a radiotherapy device. The positioning process is generally conducted before the imaging process or the RT process. The positioning process is generally complicated, time consuming, and/or has low accuracy, which may influence the efficiency of the imaging process or the RT process. Thus, it is desirable to provide systems and methods for positioning an object before an imaging process or radiotherapy process.

SUMMARY

In one aspect of the present disclosure, a method for positioning an object in a device is provided. The method may include: obtaining, using a capture device, a target image of the object on a table of the device; determining, in the target image, a current mock location associated with a target region of the object to be scanned or treated by the device; determining a distance between a current physical location of the target region and a target position based on the current mock location associated with the target region in the target image and a mapping relation between an element in a calibration image captured using the capture device and a calibration distance that is between a physical location of the element when the calibration image is taken and the target position; and/or causing the table to move such that the target region of the object is located at or in the vicinity of the target position, based on the distance.

In another aspect of the present disclosure, a method for calibrating a table of a device is provided. The method may include: causing the table of the device to move to one or more physical locations; obtaining one or more images of the table at the one or more physical locations; and/or determining, based on the one or more physical locations and the one or more images, a first mapping relation.

In another aspect of the present disclosure, a method for positioning an object in a device is provided. The method may include: obtaining, using a first capture device, a first image of a table of the device, the table being positioned at a first position such that a portion of the table is irradiated by a laser emitted from a laser source mounted on the device; determining, in the first image, a first target mock location of the portion of the table irradiated by the laser; obtaining, using the first capture device, a second image of the object on the table of the device, the table being positioned at a second position; identifying, in the second image, a target region of the object to be scanned or treated by the device based on a target preset in a protocol, the target corresponding to the target region of the object; determining, in the second image, a starting mock location of the target region of the object based on a scanning direction or treating direction preset in the protocol; determining a first difference between the first target mock location and the starting mock location in a first direction; and/or causing the table to be adjusted based on the first difference such that the target region of the object is located at or in a vicinity of a first target position.

In another aspect of the present disclosure, a system for positioning an object in a device is provided. The system may include: at least one storage device storing a set of instructions; and at least one processor in communication with the storage device. When executing the set of instructions, the at least one processor may be configured to cause the system to perform operations including: obtaining, using a capture device, a target image of the object on a table of the device; determining, in the target image, a current mock location associated with a target region of the object to be scanned or treated by the device; determining a distance between a current physical location of the target region and a target position based on the current mock location associated with the target region in the target image and a mapping relation between an element in a calibration image captured using the capture device and a calibration distance that is between a physical location of the element when the calibration image is taken and the target position; and/or causing the table to move such that the target region of the object is located at or in the vicinity of the target position, based on the distance.

In another aspect of the present disclosure, a system for calibrating a table of a device is provided. The system may include: at least one storage device storing a set of instructions; and at least one processor in communication with the storage device. When executing the set of instructions, the at least one processor may be configured to cause the system to perform operations including: causing the table of the device to move to one or more physical locations; obtaining one or more images of the table at the one or more physical locations; and/or determining, based on the one or more physical locations and the one or more images, a mapping relation.

In another aspect of the present disclosure, a system for positioning an object in a device is provided. The system may include: at least one storage device storing a set of instructions; and at least one processor in communication with the storage device. When executing the set of instructions, the at least one processor may be configured to cause the system to perform operations including: obtaining, using a first capture device, a first image of a table of the device, the table being positioned at a first position such that a portion of the table is irradiated by a laser emitted from a laser source mounted on the device; determining, in the first image, a first target mock location of the portion of the table irradiated by the laser; obtaining, using the first capture device, a second image of the object on the table of the device, the table being positioned at a second position;

identifying, in the second image, a target region of the object to be scanned or treated by the device based on a target preset in a protocol, the target corresponding to the target region of the object; determining, in the second image, a starting mock location of the target region of the object based on a scanning direction or treating direction preset in the protocol; determining a first difference between the first target mock location and the starting mock location in a first direction; and/or causing the table to be adjusted based on the first difference such that the target region of the object is located at or in a vicinity of a first target position.

In another aspect of the present disclosure, a system is provided. The system may include: a device configured to scan or treat an object, the device including a table and a bore configured to accommodate the table and the object, the table being configured to support the object; a capture device configured to acquire a target image of the object on the table; an image processing module configured to determine, in the target image, a current mock location associated with a target region of the object to be scanned or treated by the device; and a control module. The control module may be configured to: determine a distance between a current physical location of the target region and a target position based on the current mock location associated with the target region in the target image and a mapping relation between an element in a calibration image captured using the capture device and a calibration distance that is between a physical location of the element when the calibration image is taken and the target position; and/or cause the table to move such that the target region of the object is located at or in the vicinity of the target position, based on the distance.

In another aspect of the present disclosure, a system is provided. The system may include: a device configured to scan or treat an object, the device including a table and a bore configured to accommodate the table and the object, the table being configured to support the object; a capture device configured to acquire one or more images of the object and/or the table; a control module including: a table control unit configured to cause the table to move; a capturing control unit configured to cause the capture device to acquire an image; a calibration unit configured to determining, based on one or more physical locations of the table and one or more images of the table captured at the one or more physical locations, a mapping relation; and a table positioning unit configured to determine a current physical location of the table and/or the object or a portion thereof.

In another aspect of the present disclosure, a system is provided. The system may include: a device configured to scan or treat an object, the device including a table and a bore configured to accommodate the table and the object, the table being configured to support the object; a laser source configured to emit a laser to the table; a first capture device configured to: acquire a first image of the table of the device, the table being positioned at a first position such that a portion of the table is irradiated by the laser; and acquire a second image of the object on the table of the device, the table being positioned at a second position; an image processing module configured to: determine, in the first image, a target mock location of the portion of the table irradiated by the laser; identify, in the second image, a target region of the object to be scanned or treated by the device based on a target preset in a protocol, the target corresponding to the target region of the object; and determine, in the second image, a starting mock location of the target region of the object based on a scanning direction or treating direction preset in the protocol; and a control module configured to: determine a difference between the target mock location and the starting mock location in a direction; and cause the table to be adjusted based on the difference such that the target region of the object is located at or in a vicinity of a target position.

In another aspect of the present disclosure, a non-transitory computer readable medium is provided. The non-transitory computer readable medium may store instructions, the instructions, when executed by at least one processor, causing the at least one processor to implement a method comprising: obtaining a target image of an object on a table of a device; determining, in the target image, a current mock location associated with a target region of the object to be scanned or treated by the device; determining a distance between a current physical location of the target region and a target position based on the current mock location associated with the target region in the target image and a mapping relation between an element in a calibration image captured using the capture device and a calibration distance that is between a physical location of the element when the calibration image is taken and the target position; and/or causing the table to move such that the target region of the object is located at or in the vicinity of the target position, based on the distance.

In another aspect of the present disclosure, a non-transitory computer readable medium is provided. The non-transitory computer readable medium may store instructions, the instructions, when executed by at least one processor, causing the at least one processor to implement a method comprising: causing a table of a device to move to one or more physical locations; obtaining one or more images of the table at the one or more physical locations; and/or determining, based on the one or more physical locations and the one or more images, a mapping relation.

In another aspect of the present disclosure, a non-transitory computer readable medium is provided. The non-transitory computer readable medium may store instructions, the instructions, when executed by at least one processor, causing the at least one processor to implement a method comprising: obtaining, using a capture device, a first image of a table of the device, the table being positioned at a first position such that a portion of the table is irradiated by a laser emitted from a laser source mounted on the device; determining, in the first image, a target mock location of the portion of the table irradiated by the laser; obtaining, using the capture device, a second image of the object on the table of the device, the table being positioned at a second position; identifying, in the second image, a target region of the object to be scanned or treated by the device based on a target preset in a protocol, the target corresponding to the target region of the object; determining, in the second image, a starting mock location of the target region of the object based on a scanning direction or treating direction preset in the protocol; determining a difference between the target mock location and the starting mock location in a direction; and/or causing the table to be adjusted based on the difference such that the target region of the object is located at or in a vicinity of a target position.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for determining the one or more mock locations according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes,"

and/or "including," when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes a treatment and/or an imaging procedure in a radiation system of the present disclosure.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
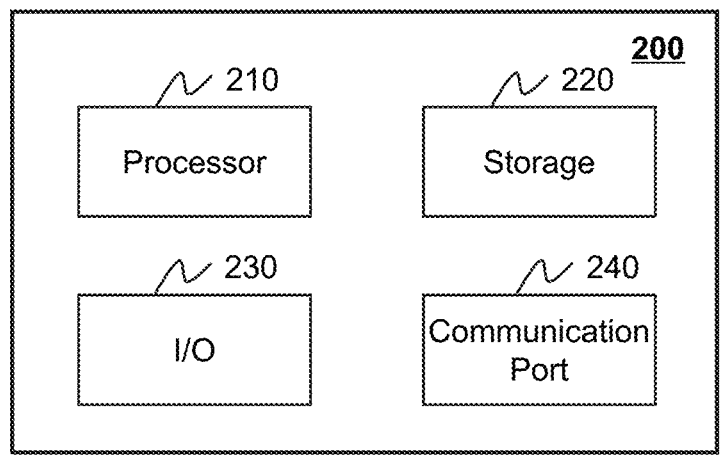
FIG. 2 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Figure 1:
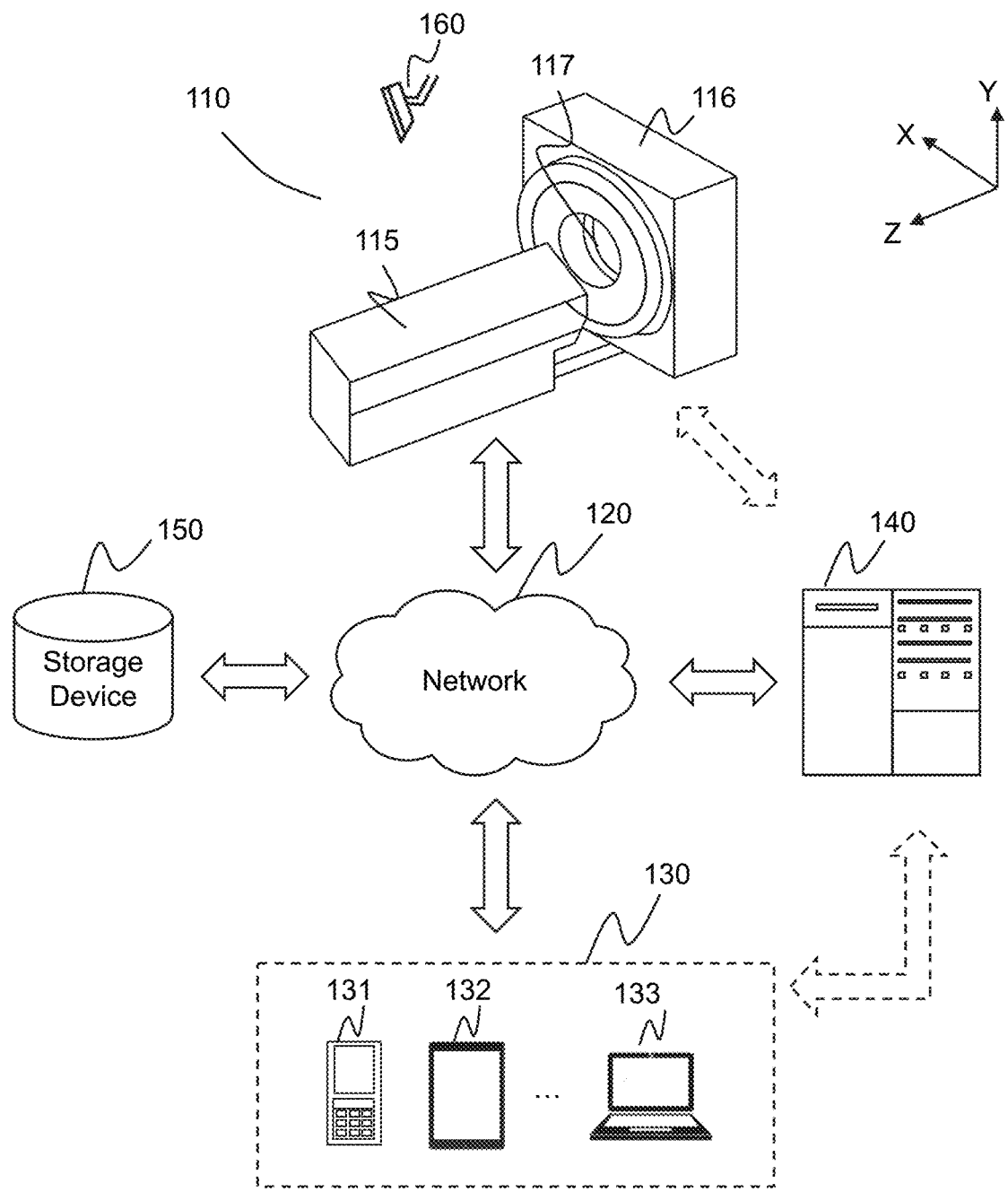
FIG. 1 is a schematic diagram illustrating an exemplary system according to some embodiments of the present disclosure.

FIG. 1 is a schematic diagram illustrating an exemplary system according to some embodiments of the present disclosure. As shown in FIG. 1, the system 100 may include an apparatus 110, a network 120, one or more terminals 130, a processing device 140, and a storage device 150. In some embodiments, the system 100 may include one or more capture devices 160. The components in the system 100 may be connected in one or more of various ways. Merely by way of example, the apparatus 110 may be connected to the processing device 140 through the network 120. As another example, the apparatus 110 may be connected to the processing device 140 directly as indicated by the bi-directional arrow in dotted lines linking the apparatus 110 and the processing device 140. As still another example, the storage device 150 may be connected to the processing device 140 directly or through the network 120. As still another example, the terminal 130 may be connected to the processing device 140 directly (as indicated by the bi-directional arrow in dotted lines linking the terminal 130 and the processing device 140) or through the network 120. As still another example, the capture device 160 may be connected to the processing device 140 directly or through the network 120.

In some embodiments, the apparatus 110 may be an imaging device. The imaging device may generate or provide image(s) via scanning an object or a part of the object. In some embodiments, the imaging device may be a medical imaging device, for example, a positron emission tomography (PET) device, a single-photon emission computed tomography (SPECT) device, a computed tomography (CT) device, a magnetic resonance imaging (MRI) device, an ultrasonography device, an X-ray photography device, or the like, or any combination thereof. In some embodiments, the imaging device may include a gantry 116 configured to imaging the object, a detection region 117, and/or a table 115 configured to support the object during an imaging process. In some embodiments, the imaging device may include a single-modality scanner. The single-modality scanner may include an MRI scanner, a CT scanner, a PET scanner, or the like, or any combination thereof. In some embodiments, the imaging device may include a multi-modality scanner. The multi-modality scanner may include a positron emission tomography-computed tomography (PET-CT) scanner, a positron emission tomography-magnetic resonance imaging (PET-MRI) scanner, or the like, or any combination thereof. In some embodiments, the imaging device may transmit image(s) via the network 120 to the processing device 140, the storage device 150, and/or the terminal(s) 130. For example, the image(s) may be sent to the processing device 140 for further processing or may be stored in the storage device 150.

In some embodiments, the apparatus 110 may be a radiation therapy (RT) device. In some embodiments, the RT device may deliver a radiation beam to an object (e.g., a patient, or a phantom) or a portion thereof. The RT device may treat the object (or a portion thereof). In some embodiments, the RT device may include a linear accelerator (also referred to as "linac"). The linac may generate and emit a radiation beam (e.g., an X-ray beam) from a treatment head. The radiation beam may pass through one or more collimators (e.g., a multi-leaf collimator (MLC)) of certain shapes, and enter into the object. In some embodiments, the radiation beam may include electrons, photons, or other types of radiation. In some embodiments, the energy of the radiation beam may be in the megavoltage range (e.g., >1 MeV), and may therefore be referred to as a megavoltage beam. The treatment head may be coupled to the gantry 116. The gantry 116 may rotate, for example, clockwise or counter-clockwise around a gantry rotation axis. In some embodiments, the treatment head may rotate along with the gantry 116. In some embodiments, the RT device may include a table 115 configured to support the object during a radiation treatment.

In some embodiments, the capture device 160 may be configured to capture one or more images of the table and/or the object. In some embodiments, the capture device 160 may capture the table and/or the object from a top view. In some embodiments, the capture device 160 may capture the table and/or the object from a side view. In some embodiments, the capture device 160 may include a stereo camera configured to capture a still image or video. In some embodiments, the stereo camera may include a binocular vision device or a multi-camera. In some embodiments, the capture device 160 may include a digital camera. The digital camera may include a 2D camera, a 3D camera, a panoramic camera, a VR (virtual reality) camera, a web camera, an instant picture camera, or the like, or any combination thereof. The digital camera may include an optical sensor, a radio detector, an artificial retina, a mirror, a telescope, a microscope, or the like, or any combination thereof. In some embodiments, the capture device 160 may capture image(s) corresponding to the same (or substantially similar) field of view (FOV) or different FOVs. In some embodiments, the size of the FOV may be adjusted according to the position of a camera, the orientation of a camera, the time of capturing, or the like, or a combination thereof. In some embodiments, the capture device 160 may be part of the apparatus 110.

In some embodiments, the object to be captured, treated, scanned (also referred to as imaged) may include a body, substance, or the like, or any combination thereof. In some embodiments, the object may include a specific portion of a body, such as a head, a thorax, an abdomen, or the like, or any combination thereof. In some embodiments, the object may include a specific organ, such as a breast, an esophagus, a trachea, a bronchus, a stomach, a gallbladder, a small intestine, a colon, a bladder, a ureter, a uterus, a fallopian tube, etc. In the present disclosure, "object" and "subject" are used interchangeably.

The network 120 may include any suitable network that can facilitate the exchange of information and/or data for the system 100. In some embodiments, one or more components of the system 100 (e.g., the apparatus 110, the terminal 130, the processing device 140, the storage device 150) may communicate information and/or data with one or more other components of the system 100 via the network 120. For example, the processing device 140 may obtain image(s) from the apparatus 110 (or the capture device 160) via the network 120. As another example, the processing device 140 may obtain user instruction(s) from the terminal 130 via the network 120. The network 120 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™. In some embodiments, the terminal(s) 130 may be part of the processing device 140.

The processing device 140 may process data and/or information obtained from the apparatus 110, the terminal 130, the capture device 160, and/or the storage device 150. For example, the processing device 140 may obtain image(s) or video(s) from the capture device 160. As another example, the processing device 140 may process the image(s) or video(s) to obtain an ROI, a starting position of the ROI, pixel information of the ROI, or the like.

In some embodiments, the processing device 140 may be a single server or a server group. The server group may be centralized or distributed. In some embodiments, the processing device 140 may be local or remote. For example, the processing device 140 may access information and/or data stored in the apparatus 110, the terminal 130, and/or the storage device 150 via the network 120. As another example, the processing device 140 may be directly connected to the apparatus 110, the terminal 130, and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. In some embodiments, the processing device 140, or a portion of the processing device 140 may be integrated into the apparatus 110.

The storage device 150 may store data, instructions, and/or any other information. In some embodiments, the storage device 150 may store data obtained from the apparatus 110, the terminal 130, the capture device 160, and/or the processing device 140. For example, the storage device 150 may store image(s) or video(s) generated by the capture device 160. In some embodiments, the storage device 150 may store data and/or instructions that the processing device 140 may execute or use to perform exemplary methods described in the present disclosure. For example, the storage device may store an algorithm, a model, or the like, or any combination thereof to process the image. In some embodiments, the storage device 150 may include a mass storage device, removable storage, a volatile read-and-write memory, a read-only memory (ROM), or the like, or any combination thereof. Exemplary mass storage devices may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components of the system 100 (e.g., the processing device 140, the terminal 130). One or more components of the system 100 may access the data or instructions stored in the storage device 150 via the network 120. In some embodiments, the storage device 150 may be directly connected to or communicate with one or more other components of the system 100 (e.g., the processing device 140, the terminal 130). In some embodiments, the storage device 150 may be part of the processing device 140.

FIG. 2 is a schematic diagram illustrating exemplary hardware and/or software components of a computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the apparatus 110, the terminal 130, the storage device 150, and/or any other component of the system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

In some embodiments, a GPU (not shown) in the processor 210 may be configured for graphics processing. The GPU may include one or more raster operation units (ROPs), a bus interface, one or more shaders, or the like. The GPU may include one or more electronic circuits to accelerate the creation of one or more images in a frame buffer intended for output to a display device (e.g., a display device of the I/O 230). In some embodiments, the GPU may perform graphics processing in one or more training processes for training a deep learning model. The GPU may perform one or more convolution operations (e.g., multiple matrix multiplications) involved in the training process(es). Exemplary producers of GPU may include NVIDIA, Intel, AMD, etc. It should be noted that the terms "graphics processing" and "image processing" in the present disclosure are different. Image processing may refer to an overall process for processing one or more images (e.g., image segmentation, image classification, image identification, image registration, image fusion). Graphics processing, as mentioned above, may include one or more convolution operations used in training a deep learning model with one or more images. In some embodiments, graphics processing may be a part of deep learning model training. In some embodiments, graphics processing may be a part of image processing based on a deep learning model.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors.

The storage 220 may store data/information obtained from the apparatus 110, the terminal 130, the storage device 150, and/or any other component of the system 100. In some embodiments, the storage 220 may include a mass storage, removable storage, a volatile read-and-write memory, a read-only memory (ROM), or the like, or any combination thereof. Exemplary mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for determining a regularization item.

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the apparatus 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
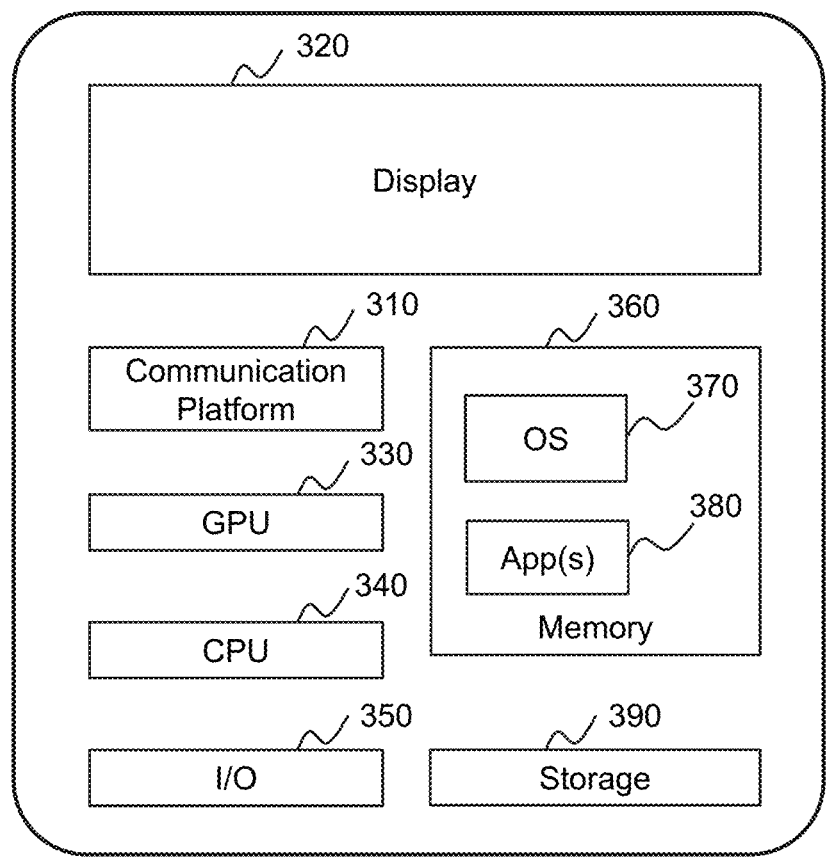
FIG. 3 is a schematic diagram illustrating exemplary hardware and/or software components of a mobile device on which the terminal may be implemented according to some embodiments of the present disclosure.

FIG. 3 is a schematic diagram illustrating exemplary hardware and/or software components of a mobile device 300 on which the terminal 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the system 100 via the network 120.

In some embodiments, the GPU 330 may be configured for graphics processing. The GPU 330 may include one or more raster operation units (ROPs), a bus interface, one or more shaders, or the like. The GPU 330 may include one or more electronic circuits to accelerate the creation of one or more images in a frame buffer intended for output to a display device (e.g., the display 320). In some embodiments, the GPU 330 may perform graphics processing in one or more training processes for training a deep learning model. The GPU 330 may perform one or more convolution operations (e.g., multiple matrix multiplications) involved in the training process(es). Exemplary producers of the GPU 330 may include NVIDIA, Intel, AMD, etc.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
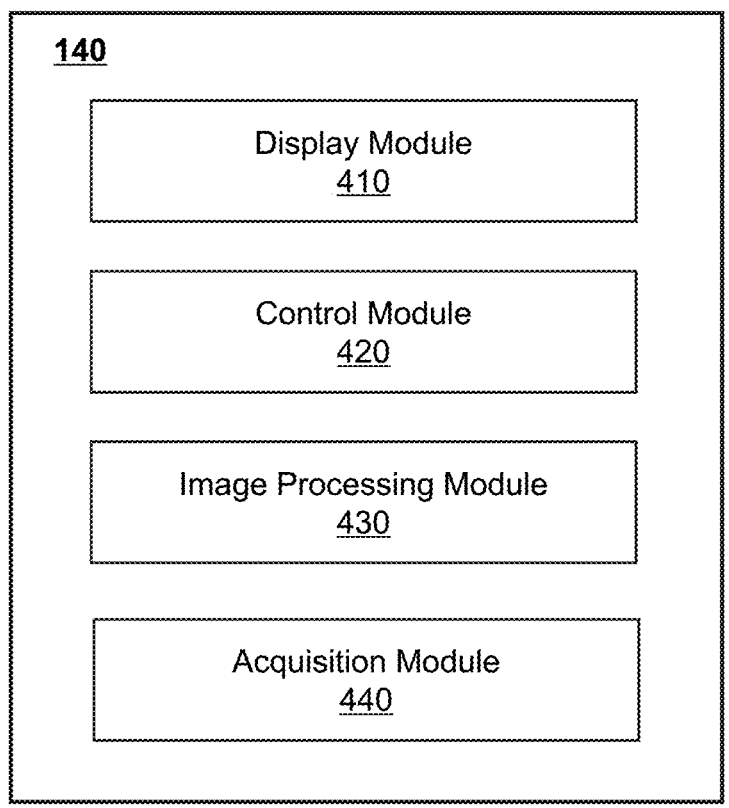
FIG. 4 is a block diagram illustrating an exemplary processing device according to some embodiments of the present disclosure.

FIG. 4 is a block diagram illustrating an exemplary processing device according to some embodiments of the present disclosure. The processing device 140 may include a display module 410, a control module 420, an image processing module 430, and an acquisition module 440.

The display module 410 may display information associated with the system 100. In some embodiments, the display module 410 may display one or more images. In some embodiments, the display module 410 may display a message notifying that one or more mock locations need to be determined. In some embodiments, the display module 410 may display a message notifying that the table is ready to be moved.

The control module 420 may control operations of modules or components of the system 100. In some embodiments, the control module 420 may cause the table to move to one or more physical locations. In some embodiments, the control module 420 may determine a first mapping relation based on the one or more physical locations and the one or more images. In some embodiments, the control module 420 may determine one or more distances from the one or more physical locations to a target position. In some embodiments, the control module 420 may determine a first mapping relation based on the one or more mock locations and the one or more distances. In some embodiments, the control module 420 may determine an initial mapping relation based on the one or more physical locations and one or more mock locations. In some embodiments, the control module 420 may determine the first mapping relation by correcting the initial mapping relation based on the one or more distances. In some embodiments, the control module 420 may cause the table to move to one or more heights. In some embodiments, the control module 420 may determine a mock location in an image. In some embodiments, the control module 420 may determine a second mapping relation based on a first height, a second height, a first mock location, and a second mock location. In some embodiments, the control module 420 may calibrate the first mapping relation based on the second mapping relation and a height of the table at which the first mapping relation is determined. In some embodiments, the control module 420 may determine a distance between a current physical location of a target region and a target position based on the current mock location of the target region in a target image and a mapping relation. In some embodiments, the control module 420 may cause the table to move such that the target region of the object is located at or in the vicinity of the target position based on the distance.

The image processing module 430 may process one or more images. In some embodiments, the image processing module 430 may determine one or more mock locations in the one or more images. In some embodiments, the image processing module 430 may determine the one or more mock locations based on received information. In some embodiments, the image processing module 430 may determine, in the target image, a target region of the object to be scanned or treated by the device. In some embodiments, the image processing module 430 may determine a current mock location of the target region in the target image. In some embodiments, the image processing module 430 may determine a first target mock location of the portion of the table irradiated by laser. In some embodiments, the image processing module 430 may identify a target region of the object to be scanned or treated by the device in an image based on a target preset in a protocol. In some embodiments, the image processing module 430 may determine a starting mock location of the target region of the object in an image based on a scanning direction or a treating direction preset in the protocol. In some embodiments, the image processing module 430 may determine a difference between the first target mock location and the starting mock location in a direction. In some embodiments, the image processing module 430 may update the starting mock location of the object based on the scanning direction or treating direction preset in the protocol in an image.

The acquisition module 440 may acquire data. The acquisition module 440 may acquire data from one or more of the apparatus 110, the network 120, the terminal 130, the storage device 150, the capture device 160 or any devices or components disclosed in the present disclosure capable of storing data.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 140 may further include an input module (or unit) configure to receive one or more instructions for moving the table from an operator. The input module may be in communication with the control module 420.

Figure 5A:
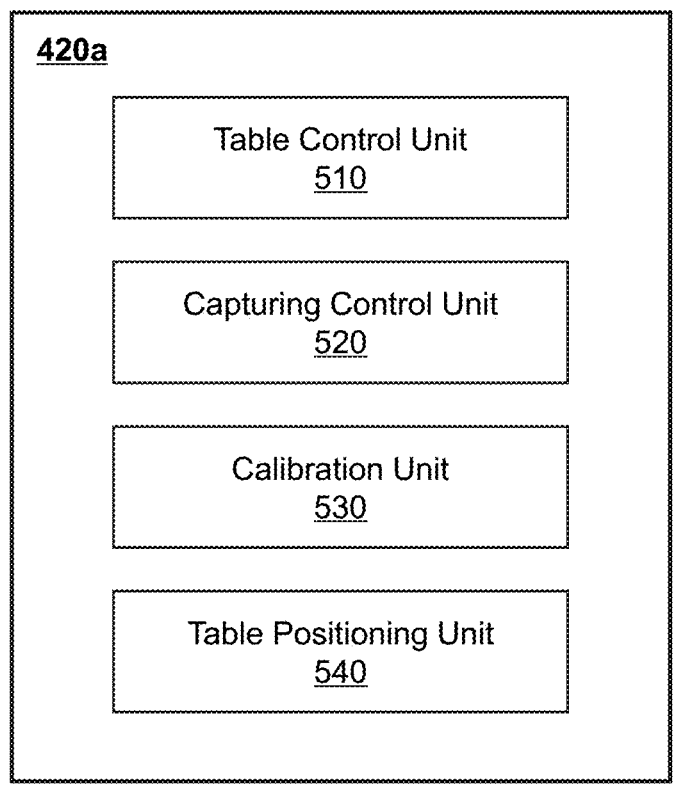
FIGS. 5A and 5B are block diagrams illustrating exemplary control modules according to some embodiments of the present disclosure.
Figure 5B:
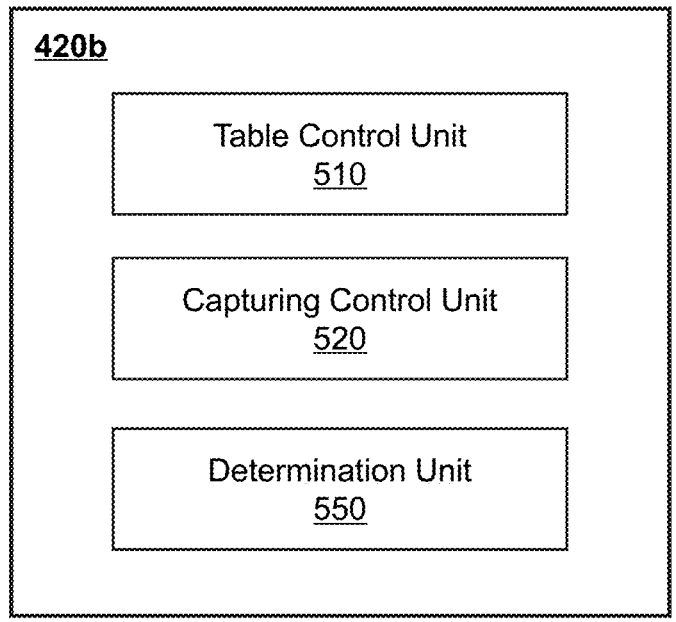

FIGS. 5A and 5B are block diagrams illustrating exemplary control modules according to some embodiments of the present disclosure. FIG. 5A is a block diagram illustrating an exemplary control module according to some embodiments of the present disclosure. FIG. 5B is a block diagram illustrating another exemplary control module according to some embodiments of the present disclosure. The control module 420a may include a table control unit 510, a capturing control unit 520, a calibration unit 530, and a table positioning unit 540. The control module 420b may include a table control unit 510, a capturing control unit 520, and a determination unit 550.

The table control unit 510 may cause the table to move. The capturing control unit 520 may control the capture device 160 to capture image(s) of the table and the object. The calibration unit 530 may generate a mapping relation based on one or more physical locations and one or more distances. The table positioning unit 540 may determine a distance between a current physical location of a target region and a target position based on the current mock location of the target region in a target image and a mapping relation. In some embodiments, the table positioning unit 540 may determine a current physical location of the table and/or the object or a portion thereof. In some embodiments, the table positioning unit 540 may obtain the mapping relation between the physical locations of the table and the mock locations. The determination unit 550 may determine whether a difference between a target mock location and a starting mock location of the target region of the object is larger than a threshold.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
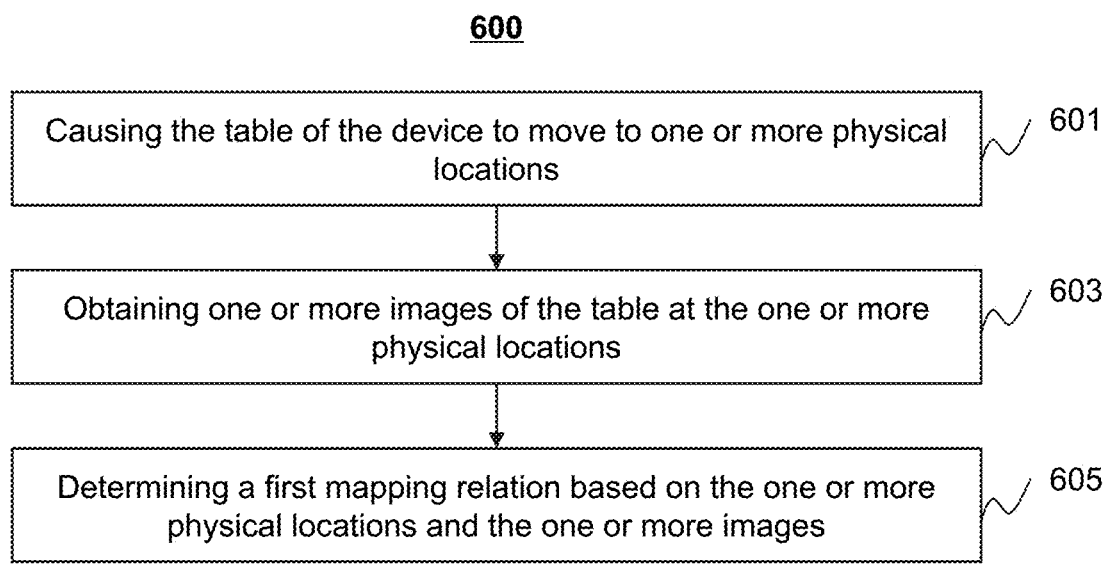
FIG. 6 is a flowchart illustrating an exemplary process for calibrating a table of a device according to some embodiments of the present disclosure.

FIG. 6 is a flowchart illustrating an exemplary process for calibrating a table of a device (e.g., the apparatus 110) according to some embodiments of the present disclosure. At least a portion of process 600 may be implemented on the computing device 200 as illustrated in FIG. 2 or the mobile device 300 as illustrated in FIG. 3. In some embodiments, one or more operations of the process 600 may be implemented in the system 100 as illustrated in FIG. 1. In some embodiments, one or more operations in the process 600 may be stored in the storage device 150 and/or the storage (e.g., the storage 220, the storage 390, etc.) as a form of instructions, and invoked and/or executed by the processing device 140, or the processor 210 of the processing device 140. In some embodiments, the instructions may be transmitted in the form of electronic current or electrical signals.

In 601, the processing device 140 (e.g., the control module 420 (e.g., the table control unit 510)) may cause the table (e.g., the table 115, the table 1001, the table 1603, the table 1721) of the device to move to one or more physical locations. The device may include an imaging device and/or a treatment device, for example, the apparatus 110 in FIG. 1. The table (e.g., the table 115 of the apparatus 110) may be configured to support an object. In the present disclosure, "table" and "couch" are used interchangeably. For example, the table may be used to support an object in an imaging process performed by a CT scanner. As another example, the table may be used to support an object in a radiation therapy process performed by an RT device. A target region of the object may be scanned or treated by the apparatus 110. In some embodiments, the processing device 140 may send an instruction (e.g., in the form of control signals) to the apparatus 110 to cause the table to move in various directions. For example, the processing device 140 may cause the table to move in a longitudinal direction (e.g., along a long axis of the table in a horizontal plane (i.e., the Z-axis direction illustrated in FIG. 1)), a lateral direction (e.g., along a short axis of the table in a horizontal plane (i.e., the X-axis direction illustrated in FIG. 1)), a vertical direction, a direction oblique to the longitudinal direction and/or the lateral direction in any plane, or the like. In some embodiments, the calibration process of the table may be performed when the table is unloaded (e.g., no object is lying on or placed on the table).

In some embodiments, the processing device 140 may cause the table to move to one or more physical locations, for example, in a horizontal plane. As used herein, the term "physical location" may refer to an actual position of a component in the system 100, e.g., the table 115 or a portion of the table 115, an object (e.g., a patient) to be imaged or treated in the system 100, etc. With reference to the table 115, in some embodiments, the actual position of the table may be an actual position of the entire table. The physical location of the entire table may be represented by a table code (interchangeably referred to as "couch code") recorded by and/or in the apparatus 110, and/or can be read from the apparatus 110. In some embodiments, the actual position of a portion of the table may be an actual position of at least one marker on the table. The at least one marker may be located at a fixed position on the table. The actual position of the at least one marker may be determined based on the actual position of the entire table and the position of the at least one marker relative to the table. In some embodiments, the actual position of the at least one marker may be represented by the table code.

In some embodiments, the at least one marker may have a particular color and/or a particular shape that can be identified from an image including elements (e.g., pixels) representing the at least one marker. For instance, the at least one marker may be a band, a cross, a circle, or have any other shape. Additionally or alternatively, the color of the at least one marker may be different from the other portions of the table, such as white, red, black, etc. In some embodiments, the at least one marker may be non-reflective. Thus, the at least one marker may be identified from an image including the at least one marker without being affected by light reflection. In some embodiments, the at least one marker may be a position sensor (e.g., an infrared emitter) mounted at a fixed position on the table.

In some embodiments, the processing device 140 may cause the table to move to an initial physical location. For instance, the initial physical location may be a position closest or farthest to the gantry 116 of the apparatus 110 within the movement range of the table. In some embodiments, the table code of the table at the initial physical location may be set as zero. In some embodiments, the processing device 140 may cause the table to move to other physical locations of the one or more physical locations from the initial physical location at a fixed incremental length. The fixed incremental length may be a default value set by the system 100 or a specific value set by an operator via a user terminal (e.g., the terminal 130). For instance, the fixed incremental length may be 10 millimeters (mm), 20 mm, 50 mm, or more, or less. The table may be stopped and/or may stay still for a predetermined time period after reaching each of the one or more physical locations. The predetermined time period may be, for example, 0.5 seconds (s), 1 s, 1.5 s, or more, or less. The table may be in a complete still status at the end of the predetermined time period.

In some embodiments, the operator may send an instruction to cause the table of the device to move to the one or more physical locations via the terminal 130. For example, the terminal 130 (or the display module 410) may display a first message notifying that the table is ready to be moved. The operator may send an instruction for moving the table to one physical location of the one or more physical locations. In some embodiments, the operator may press (or operate) one or more operating keys (or buttons, handles) associated with the movement of the table so that the instruction(s) may be sent to the processing device. The processing device 140 may receive the instruction. In response to the instruction, the apparatus 110 may cause the table to move to the physical location.

In 603, the processing device 140 (e.g., the acquisition module 440) may obtain one or more images (also referred to as calibration images) of the table (or the at least one marker) at the one or more physical locations. In some embodiments, the image(s) of the table may be captured using a capture device (e.g., the capture device 160 illustrated in FIG. 1) when the table (or the at least one marker) is located at the one or more physical locations. In some embodiments, the capturing control unit 520 may control the capture device to capture the image(s) of the table, and the image(s) may be transmitted to or acquired by the acquisition module 440.

In some embodiments, the capture device may be configured to acquire one or more images of the table when the table is located at the one or more physical locations. The capture device 160 (e.g., a camera) may be mounted at a fixed position relative to the apparatus 110. For example, the capture device 160 may be mounted above the table such that at least one of the least one marker is within the shooting range of the capture device 160 when the table is located at any position within the movement range of the table. In some embodiments, one or more capture devices may be mounted above the table to obtain a three-dimensional (3D) image of the table. In some embodiments, one or more additional capture devices may be mounted at a side of the table to obtain one or more images of the table from a side view, so as to obtain information relating to the thickness of the target region. In some embodiments, the capture device may include a stereo camera, a digital camera, an infrared camera, or the like, or any combination thereof. More descriptions of the capture device may be found elsewhere in the present disclosure (e.g., FIG. 1 and descriptions thereof).

Figure 10:
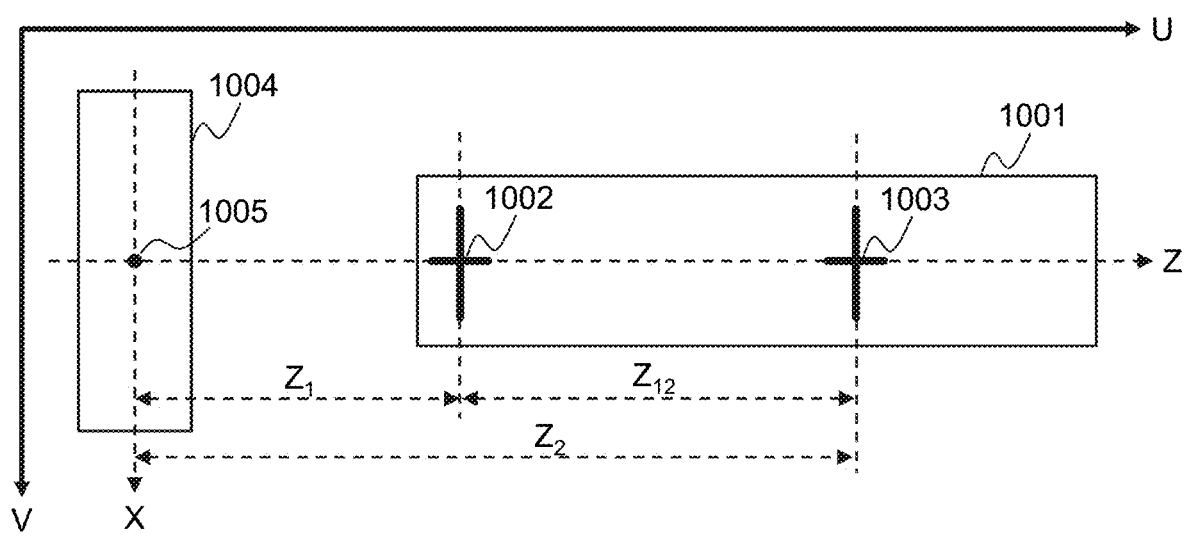
FIG. 10 is a top view illustrating an exemplary position of the table during a calibration process according to some embodiments of the present disclosure.

In 605, the processing device 140 (e.g., the control module 420 (e.g., the calibration unit 530)) may determine a first mapping relation based on the one or more physical locations and the one or more images. In some embodiments, the processing device 140 may determine a mock location in each of the one or more images of the table. As used herein, the term "mock location" may refer to a position of an element (including a pixel or a group of pixels) in an image, in which the element in the image corresponds to a component (or a portion thereof) of the system 100, and the image is acquired when the component (or a portion thereof) of the system 100 is located at a physical location. The component of the system 100 may include the table 115, an object to be imaged or treated in the system 100, etc. A mock location may correspond to a physical location. If the position of the capture device that captures the image(s) is fixed, a mock location of an element in an image may change with the physical location of the component (or a portion thereof) that corresponds to the element when the image is captured. With reference to the component being the table 115 having a marker in the system 100, in some embodiments, a mock location of the element in an image that corresponds to the table 115 (or a portion thereof) may be represented by a position of an element representing the center of the marker in the image. In some embodiments, the mock location may be represented by a first coordinate of a pixel corresponding to the center of the marker in the image. For instance, as illustrated in FIG. 10, a two-dimensional coordinate system (e.g., the U-V coordinate system) may be determined based on the image. The first coordinate may be a coordinate corresponding to the U axis. In some embodiments, the U axis may be parallel to a longitudinal direction (e.g., the Z-axis direction as illustrated in FIG. 1) of the table in the image.

In some embodiments, the processing device 140 may determine a mock location in each of the one or more images, for example, using a template matching algorithm, a target tracking algorithm, a neural network model, a machine learning algorithm, etc. For example, if the template matching algorithm is used, a template for identifying the mock location(s) may be determined. Specifically, the terminal 130 may display the image(s) and/or a second message notifying that the mock location(s) need to be determined. A user (e.g., an operator) may provide information indicating a location of the at least one marker in at least one image of the one or more images. A template may be determined based on the information provided by the user. The processing device 140 may further determine the mock location(s) based on the template. More descriptions regarding the determination of the mock location in each of the one or more images may be found elsewhere in the present disclosure, for example, in FIGS. 7A, 8, and 13, and the descriptions thereof.

As used herein, the first mapping relation may indicate a relation between a plurality of mock locations and a plurality of distances relative to a target position. As used herein, the term "target position" may refer to a desired physical position of a component (or a portion thereof) of the system 100. For instance, the target position may be an isocenter of the apparatus 110. The component of the system 100 may include the table 115, an object to be imaged or treated in the system 100, etc. In some embodiments, the target position may be a fixed physical position in a two-dimensional (2D) coordinate system (e.g., in the horizontal plane) of the apparatus 110. In some embodiments, the target position may be a fixed physical position in a three-dimensional (3D) coordinate system of the apparatus 110. For a calibration procedure, in some embodiments, the target position may be represented by a table code in which an actual position of the at least one marker of the table is located at the isocenter of the apparatus 110 (e.g., an imaging isocenter of an imaging device, or a treatment isocenter of an RT device). For an imaging or treatment procedure applied to an object, in some embodiments, the target position may be where a region of interest of the object is desired to be.

In some embodiments, to determine the first mapping relation, the processing device 140 may determine, for each of the one or more images, a distance from a physical location (of the table when the image is acquired) to the target position. In some embodiments, the distance from the physical location to the target position may be represented by a difference between the table code of the table at the physical location and the table code of the table (e.g., the at least one marker on the table) at the target position. In some embodiments, the first mapping relation may be associated with a specific height of the table (e.g., at a maximum height). More descriptions of the first mapping relation and the height may be found elsewhere in the present disclosure (e.g., FIGS. 9 and 14 and descriptions thereof).

In some embodiments, the processing device 140 may determine the first mapping relation based on the one or more mock locations and the one or more distances. More descriptions regarding the determination of the first mapping relation based on the one or more mock locations and the one or more distances may be found elsewhere in the present disclosure, for example, in FIG. 7A and the descriptions thereof. In some embodiments, the processing device 140 may determine an initial mapping relation between the one or more physical locations and the one or more mock locations. The processing device 140 may further determine the first mapping relation by correcting the initial mapping relation based on the one or more distances. More descriptions regarding the determination of the first mapping relation by correcting the initial mapping relation based on the one or more distances may be found elsewhere in the present disclosure, for example, in FIG. 7B and the descriptions thereof.

In some embodiments, the processing device 140 may determine a second mapping relation. The second mapping relation may indicate a relation between a plurality of heights of the table and a plurality of mock locations. For instance, the processing device 140 may cause the table to move to a first height, and obtain a first image of the table at the first height captured by the capture device 160. The processing device 140 may further cause the table to move to a second height, and obtain a second image of the table at the second height. The processing device 140 may further determine a first mock location in the first image and determine a second mock location in the second image. The second mapping relation may be determined based on the first height, the second height, the first mock location, and the second mock location. The processing device 140 may further calibrate the first mapping relation based on the second mapping relation and a height of the table at which the first mapping relation is determined, thereby generating a calibrated first mapping relation. After being calibrated, the first mapping relation may indicate relations between a plurality of mock locations and a plurality of distances relative to the target position at various heights. More descriptions regarding the determination of the second mapping relation may be found elsewhere in the present disclosure, for example, in FIGS. 9 and 23, and the descriptions thereof.

In some embodiments, a fitting curve and/or a lookup table may be generated based on the first mapping relation. For instance, the lookup table may include a plurality of mock locations and a plurality of corresponding distances at a specific height of the table. As another example, the fitting curve may be associated with a fitting function. For any given mock location in an image acquired at a physical location, the processing device 140 may determine a corresponding distance of the physical location relative to the target position using the fitting function. In some embodiments, the fitting curve and/or the lookup table may be generated based on the calibrated first mapping relation. For example, the lookup table may include a plurality of mock locations and a plurality of corresponding distances at various heights of the table. In some embodiments, in response to a determination that the first mapping relation is determined, the lookup table is generated, and/or that the fitting curve is generated, the processing device 140 may send a third message to the terminal 130. The terminal 130 may display the third message to notify the operator that the table is successfully calibrated. The third message may be displayed in the form of words, sounds, graphs (e.g., a notification symbol), or the like, or any combination thereof. The operator may confirm that the calibration of the table is completed via the terminal 130. In some embodiments, the first mapping relation or the calibrated first mapping relation may be stored in a storage (e.g., the storage device 150 of the system 100). In some embodiments, the first mapping relation or the calibrated first mapping relation may be used to automatically or semi-automatically position an object on the table. More descriptions regarding positioning the object on the table based on the (calibrated) first mapping relation, the second mapping relation, and/or the lookup table may be found elsewhere in the present disclosure, for example, in FIG. 15 and the descriptions thereof.

It should be noted that in some embodiments, the calibration process illustrated in FIG. 6 may be performed only once (e.g., at the time or after the apparatus 110 and/or the table are installed), and the stored first mapping relation or the calibrated first mapping relation may be used repeatedly in the positioning of various objects. In some embodiments, after the apparatus 110 is used for a period of time, a positioning error may be generated or increased, and at least a portion of the operations of the process 600 may be performed again to update the (calibrated) first mapping relation.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the operations 601 and 603 may be performed alternately, that is, after the table is moved to a physical location, an image of the table may be captured, and afterwards the table may be moved to another physical location, and another image of the table may be captured.

Figure 7A:
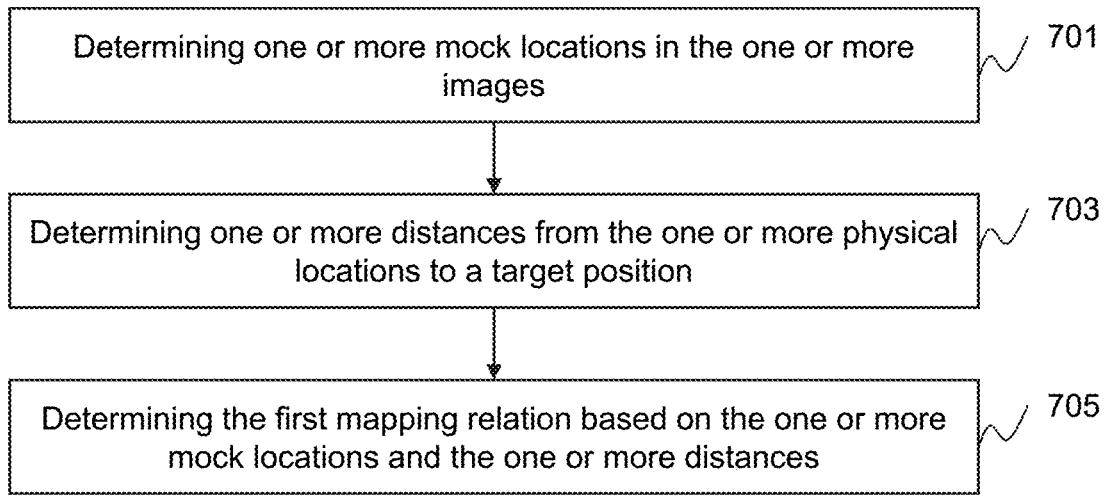
FIGS. 7A and 7B are flowcharts illustrating exemplary processes for determining a first mapping relation based on one or more mock locations in one or more images according to some embodiments of the present disclosure.
Figure 7B:
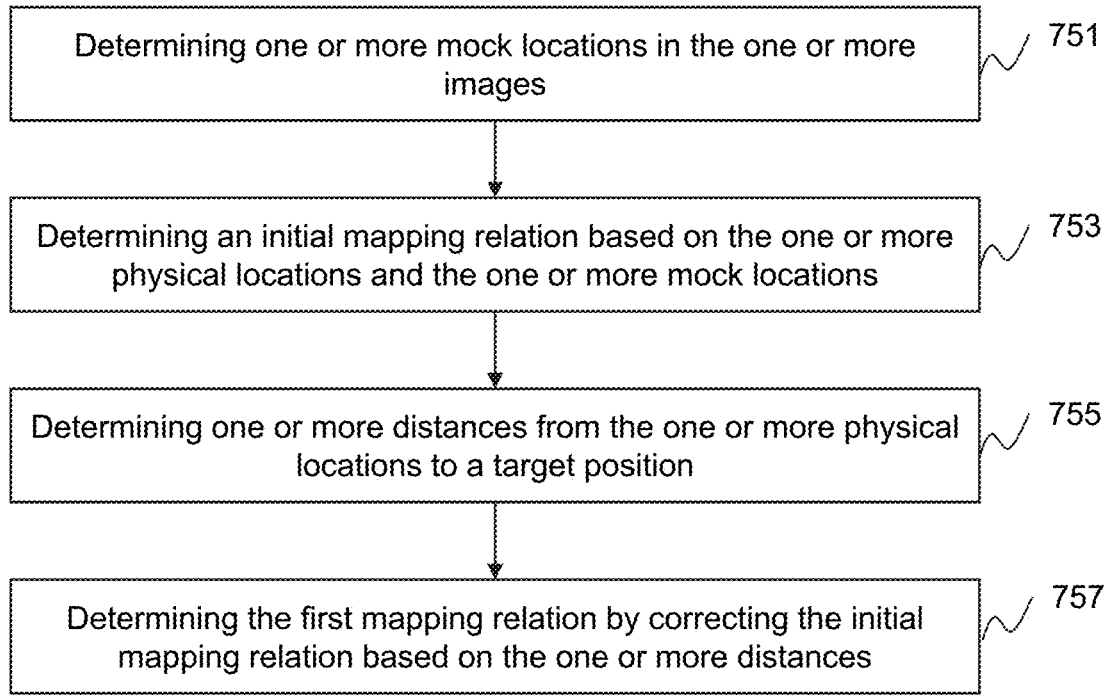

FIGS. 7A and 7B are flowcharts illustrating exemplary processes for determining a first mapping relation based on one or more mock locations in one or more images according to some embodiments of the present disclosure. FIG. 7A is a flowchart illustrating an exemplary process for determining a first mapping relation based on one or more mock locations in one or more images according to some embodiments of the present disclosure. At least a portion of process 700 may be implemented on the computing device 200 as illustrated in FIG. 2 or the mobile device 300 as illustrated in FIG. 3. In some embodiments, one or more operations of the process 700 may be implemented in the system 100 as illustrated in FIG. 1. In some embodiments, one or more operations in the process 700 may be stored in the storage device 150 and/or the storage (e.g., the storage 220, the storage 390, etc.) as a form of instructions, and invoked and/or executed by the apparatus 110 (e.g., the processing device 140, or the processor 210 of the processing device 140). In some embodiments, the instructions may be transmitted in the form of electronic current or electrical signals. In some embodiments, operation 605 illustrated in FIG. 6 may be performed according to the process 700.

In 701, the processing device 140 (e.g., the image processing module 430) may determine one or more mock locations in the one or more images (e.g., the image(s) obtained in 603). In some embodiments, the processing device 140 may determine the one or more mock locations using a template matching algorithm, a target tracking algorithm, a neural network model, a machine learning algorithm, etc. For example, if the template matching algorithm is used, a template for identifying the mock location(s) may be determined. Specifically, the terminal 130 may display the image(s) and/or a second message notifying that the mock location(s) need to be determined. A user (e.g., an operator) may provide information indicating a location of the at least one marker in at least one image of the one or more images. A template may be determined based on the information provided by the user. The processing device 140 may further determine the mock location(s) based on the template. In some embodiments, the target tracking algorithm may include a Mean-Shift tracking algorithm, a Continuously Adaptive Mean-Shift (CamShift) algorithm, a Hierarchical Convolutional Features (HCF) algorithm, or the like, or any combination thereof. In some embodiments, the neural network model may include a you only look once (YOLO) model, a Haar-boosting model, a Faster regional-convolutional neural network (R-CNN) model, a Mask R-CNN model, or the like, or any combination thereof. More descriptions regarding the determination of the mock location in each of the one or more images using the template matching algorithm may be found elsewhere in the present disclosure, for example, in FIGS. 8 and 13, and the descriptions thereof.

In 703, the processing device 140 (e.g., the control module 420 (e.g., the calibration unit 530)) may determine one or more distances from the one or more physical locations to a target position (e.g., the target position illustrated in 605 of FIG. 6). In some embodiments, for each of the one or more images, the processing device 140 may determine a distance from a physical location where the image is acquired to the target position. Merely by way of example, the physical location and the target position may be represented by table codes. For instance, the table code of the physical location (e.g., of the at least one marker) may be recorded by the apparatus 110 as z. The table code of the target position (e.g., of the at least one marker) at the isocenter of the apparatus 110 may be recorded by the apparatus 110 as $z_{ref}$. In some embodiments, the distance may be determined based on the table code of the physical location and the table code of the target position. For instance, the distance L may be determined according to the following equation:

$$L = z - z_{ref} \quad (1)$$

In some embodiments, to determine $z_{ref}$, the processing device 140 may cause the table to move to a physical location such that the at least one marker aligns with a laser emitted from a laser source mounted on the apparatus 110, and the processing device 140 may determine the corresponding table code of the table at the physical location as $z_{ref}$. In some embodiments, the laser source may be mounted above the center of the apparatus 110 (e.g., in the gantry 116) and may emit the laser toward the isocenter of the apparatus 110.

In 705, the processing device 140 (e.g., the control module 420 (e.g., the calibration unit 530)) may determine the first mapping relation based on the one or more mock locations and the one or more distances. In some embodiments, the first mapping relation may be presented in a curve (interchangeably referred to as a fitting curve) obtained by using a curve fitting technique. For example, the processing device 140 may determine the curve based on the one or more mock locations and the one or more distances using a polynomial fitting algorithm, such as a linear fitting algorithm. In some embodiments, the processing device 140 may also determine a fitting function associated with the curve. For any given mock location in an image acquired at a physical location, the processing device 140 may determine a corresponding distance of the physical location relative to the target position using the fitting function. In some embodiments, the first mapping relation may be presented in a lookup table obtained by interpolation. For instance, the processing device 140 may perform an interpolation on the mock locations to determine the distances corresponding to all the first coordinates of pixels in the one or more images according to an interpolation algorithm. Merely by way of example, the interpolation algorithm may include a nearest-neighbor interpolation algorithm, a spline interpolation algorithm, a cubic interpolation algorithm, a piecewise linear interpolation algorithm, or the like, or any combination thereof.

FIG. 7B is a flowchart illustrating another exemplary process for determining a first mapping relation according to some embodiments of the present disclosure. At least a portion of process 750 may be implemented on the computing device 200 as illustrated in FIG. 2 or the mobile device 300 as illustrated in FIG. 3. In some embodiments, one or more operations of the process 750 may be implemented in the system 100 as illustrated in FIG. 1. In some embodiments, one or more operations in the process 750 may be stored in the storage device 150 and/or the storage (e.g., the storage 220, the storage 390, etc.) as a form of instructions, and invoked and/or executed by the apparatus 110 (e.g., the processing device 140, or the processor 210 of the processing device 140). In some embodiments, the instructions may be transmitted in the form of electronic current or electrical signals. In some embodiments, operation 605 illustrated in FIG. 6 may be performed according to the process 750.

In 751, the processing device 140 (e.g., the image processing module 430) may determine one or more mock locations in the one or more images. In some embodiments, operation 751 may be performed in a manner similar to operation 701. For example, the processing device 140 may determine the one or more mock locations in the one or more images using a template matching algorithm, a target tracking algorithm, a neural network model, a machine learning algorithm, etc.

In 753, the processing device 140 (e.g., the control module 420 (e.g., the calibration unit 530)) may determine an initial mapping relation based on the one or more physical locations and the one or more mock locations. In some embodiments, the processing device 140 may perform a curve fitting operation and/or an interpolation operation on the one or more physical locations and the one or more mock locations. The curve fitting techniques and interpolation algorithms in operation 753 may be similar to the curve fitting techniques and interpolation algorithms in operation 705. An initial curve and/or an initial lookup table may represent the initial mapping relation.

In 755, the processing device 140 (e.g., the control module 420 (e.g., the calibration unit 530)) may determine one or more distances from the one or more physical locations to a target position (e.g., the target position illustrated in 605 of FIG. 6). In some embodiments, the operation 755 may be performed in a manner similar to operation 703. For instance, each distance may be determined by subtracting the table code of the target position from the table code of each of the physical location(s).

In 757, the processing device 140 (e.g., the control module 420 (e.g., the calibration unit 530)) may determine the first mapping relation by correcting the initial mapping relation based on the one or more distances. For example, the processing device 140 may correlate the one or more distances (from the one or more physical locations to the target position) with the one or more mock locations. If the initial mapping relation is represented by the initial lookup table, the processing device 140 may replace each physical location in the initial lookup table with a corresponding distance determined in operation 755, so as to generate the lookup table representing the first mapping relationship. If the initial mapping relation is represented by the initial curve, the processing device 140 may translate or revise the initial curve along an axial direction representing the table code. For instance, the processing device 140 may translate or revise the initial curve shown in FIG. 11B downward by $z_{ref}$ along the axis representing the couch code.

It should be noted that the above descriptions regarding the processes 700 and 750 are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 8 is a flowchart illustrating an exemplary process for determining the one or more mock locations according to some embodiments of the present disclosure. At least a portion of process 800 may be implemented on the computing device 200 as illustrated in FIG. 2 or the mobile device 300 as illustrated in FIG. 3. In some embodiments, one or more operations of the process 800 may be implemented in the system 100 as illustrated in FIG. 1. In some embodiments, one or more operations in the process 800 may be stored in the storage device 150 and/or the storage (e.g., the storage 220, the storage 390, etc.) as a form of instructions, and invoked and/or executed by the apparatus 110 (e.g., the processing device 140, or the processor 210 of the processing device 140). In some embodiments, the instructions may be transmitted in the form of electronic current or electrical signals. In some embodiments, operation 701 illustrated in FIG. 7A or operation 751 illustrated in FIG. 7B may be performed according to the process 800.

In 801, the processing device 140 (e.g., the display module 410) may display the one or more images and/or a second message notifying that the one or more mock locations need to be determined. In some embodiments, the processing device 140 may transmit instructions for displaying the image(s) and/or second message to the terminal 130, so that the terminal 130 may display the image(s) and/or the second message. In some embodiments, the one or more images may be captured by the capture device 160 if the at least one marker (or the table) is located at the one or more physical locations. The terminal 130 may obtain the one or more images from the capture device 160 or the storage device 150. In some embodiments, the terminal 130 may display the one or more images and/or the second message via a user interface. For example, the second message may be displayed as words, sounds or symbols on a screen of the terminal 130. A user (e.g., an operator) may view the one or more images and/or the second message via the user interface.

In 803, the processing device 140 (e.g., the acquisition module 440) may receive information indicating a location of at least one marker in at least one image of the one or more images. In some embodiments, the terminal 130 may receive, from an operator, information indicating a location of at least one marker in at least one image of the one or more images, and the terminal 130 may transmit the information to the processing device 140, so that the processing device 140 may receive the information. In some embodiments, the operator may provide the information indicating the location of the at least one marker in the at least one image of the one or more images via the user interface of the terminal 130. For instance, the operator may manually mark rough pixel(s) in one image of the one or more images. The rough pixel(s) may be marked in the vicinity of or at the center of the elements representing the at least one marker. Merely by way of example, the operator may mark the rough pixel(s) by clicking on the rough pixel(s) in the image displayed on the screen of the terminal 130 using a mouse.

In 805, the processing device 140 (e.g., the image processing module 430) or the terminal 130 (e.g., the GPU 330 or the CPU 340) may determine the one or more mock locations based on the received information. In some embodiments, the processing device 140 may determine a region of interest (ROI) having a predetermined size in the image marked by the operator. For instance, the ROI may be a square, a rectangle, a trapezoid, a triangle, etc. In some embodiments, the elements (e.g., pixels) or feature(s) thereof in the ROI may be used as a template, and the processing device 140 may determine the mock location(s) in the image(s) based on the template and one or more algorithms (e.g., a template matching algorithm, a target tracking algorithm, a neural network model, a machine learning algorithm, etc.). In some embodiments, the rough pixel(s) may be located at the center of the ROI. The processing device 140 may determine a gradient of the pixels in the ROI. In some embodiments, because the pixel values of the pixels representing the marker may be significantly different from the pixels values of the pixels representing the background, a pixel corresponding to a highest gradient may be designated as a precise pixel representing the mock location in an image. In some embodiments, the mock location in the image may be represented by the first coordinate of the precise pixel. In some embodiments, the processing device 140 may determine two pixels corresponding to the highest gradient in the ROI. The two pixels may represent the edges of the at least one marker. The processing device 140 may further determine a middle pixel between these two pixels as the precise pixel representing the mock location in the image.

In some embodiments, the processing device 140 may move the ROI to the vicinity of the mock location in a next image, to determine the mock location in the next image. For instance, the ROI may be moved in a same direction in which the table is moved to the one or more physical locations. The ROI may be moved by a number of pixels. If the next image is acquired at a same height of the table as the marked image, the number of pixels may be determined based on a difference between the table code corresponding to the mock location in the marked image and the next table code corresponding to the mock location in the next image. If the next image is acquired at a different height of the table as compared to the marked image, the number of pixels may be determined based on a difference in the heights in which the marked image and the next image are captured, respectively.

In some embodiments, in response to a determination that the pixel gradients in the ROI do not include the highest gradient, the ROI may be moved (e.g., in a lateral direction of the image (i.e., the Z-axis direction as illustrated in FIG. 1)) by a predetermined number of pixels, and then the processing device 140 may attempt to determine the highest gradient in the ROI again. In response to a determination that the pixel gradients in the ROI still do not include the highest gradient, the processing device 140 may determine an extreme value in the gradients. In some embodiments, the mock location may be represented by the pixel coordinate of the pixel corresponding to the extreme value of the gradients. In some embodiments, in response to a determination that the pixel gradients in the ROI do not include the highest gradient, and/or that the pixel gradients in the ROI do not include the extreme value, the processing device 140 may send a message to notify the operator that a mock location may need to be determined/confirmed manually in the image. The operator may view the image and provide information indicating the location of the at least one marker via the terminal 130, for example, by marking a rough pixel in the image. In some embodiments, the processing device 140 may determine the mock location in the image based on the information indicated by the operator, as illustrated above.

It should be noted that the above description regarding the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
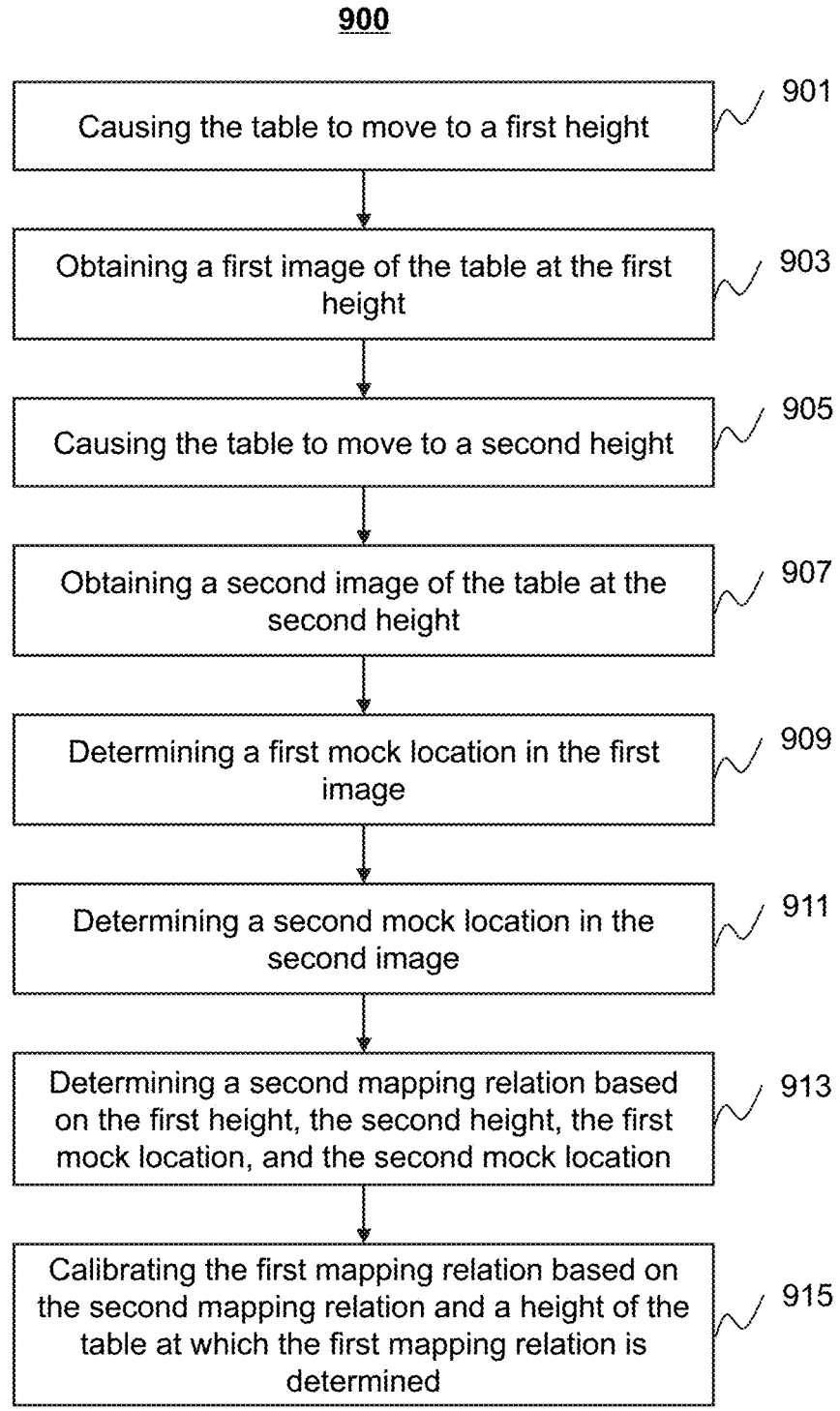
FIG. 9 is a flowchart illustrating an exemplary process for calibrating the first mapping relation according to some embodiments of the present disclosure.

FIG. 9 is a flowchart illustrating an exemplary process for calibrating the first mapping relation according to some embodiments of the present disclosure. At least a portion of process 900 may be implemented on the computing device 200 as illustrated in FIG. 2 or the mobile device 300 as illustrated in FIG. 3. In some embodiments, one or more operations of the process 900 may be implemented in the system 100 as illustrated in FIG. 1. In some embodiments, one or more operations in the process 900 may be stored in the storage device 150 and/or the storage (e.g., the storage 220, the storage 390, etc.) as a form of instructions, and invoked and/or executed by the apparatus 110 (e.g., the processing device 140, or the processor 210 of the processing device 140). In some embodiments, the instructions may be transmitted in the form of electronic current or electrical signals.

In 901, the processing device 140 (e.g., the control module 420 (e.g., the table control unit 510)) may cause the table to move to a first height. In some embodiments, the processing device 140 may send control signal(s) to the apparatus 110 to cause the table to move in a vertical plane to reach the first height. The first height may be, for example, 800 mm, 850 mm, 900 mm, 950 mm, or more, or less. In some embodiments, the at least one marker may include a first marker and a second marker. The first marker and the second marker may have the same shape or different shapes. In some embodiments, one of the first marker and the second marker may be used as the at least one marker illustrated in FIGS. 6-8. In some embodiments, the processing device 140 may further cause the table of the apparatus 110 to move in a horizontal plane such that the first marker is located at a reference position. The reference position may be a center of a shooting range of the capture device 160 (as indicated by the dashed line 20112 in FIG. 20).

In 903, the processing device 140 (e.g., the acquisition module 440) may obtain a first image of the table at the first height. For example, the processing device 140 may send control signal(s) to the capture device 160 to direct the capture device 160 to acquire the first image of the table at the first height. The first image may include elements representing the second marker.

In 905, the processing device 140 (e.g., the control module 420 (e.g., the calibration unit 530)) may cause the table to move to a second height. In some embodiments, the processing device 140 may send control signal(s) to the apparatus 110 to cause the table to move in a vertical plane to reach the second height. The second height may be, for example, 800 mm, 850 mm, 900 mm, 950 mm, or more, or less. In some embodiments, the second height may be different from the first height. Merely by way of example, the first height may be a maximum height (e.g., 950 mm) of the table, and the second height may be a minimum height (e.g., 762 mm) of the table. In some embodiments, the processing device 140 may cause the table of the apparatus 110 to maintain in a horizontal plane such that the first marker is located at the reference position (i.e., the table code may remain the same). Because the first marker is located at the reference position at various heights (e.g., the first height and the second height), mock locations associated with the first marker in images acquired at various heights may be the same.

In 907, the acquisition module 440) may obtain a second image of the table at the second height. For example, the processing device 140 may send control signal(s) to the capture device 160 to direct the capture device 160 to acquire the second image of the table at the second height. The second image may include elements representing the second marker.

In 909, the processing device 140 (e.g., the control module 420 (e.g., the calibration unit 530)) may determine a first mock location in the first image. In some embodiments, the first mock location may refer to the mock location of the second marker in the first image. Determination of the first mock location of the second marker in the first image may be similar to the determination of the mock location(s) illustrated in FIGS. 7A, 7B, and 8. For instance, the processing device 140 may determine the first mock location associated with the second marker according to a template matching algorithm, a target tracking algorithm, a neural network model, a machine learning algorithm, etc.

In 911, the processing device 140 (e.g., the control module 420 (e.g., the calibration unit 530)) may determine a second mock location in the second image. In some embodiments, the second mock location may refer to the mock location of the second marker in the second image. Determination of the second mock location of the second marker in the second image may be similar to the determination of the mock location(s) illustrated in FIGS. 7A, 7B, and 8. For instance, the processing device 140 may determine the second mock location associated with the second marker according to a template matching algorithm, a target tracking algorithm, a neural network model, a machine learning algorithm, etc.

In 913, the processing device 140 (e.g., the control module 420 (e.g., the calibration unit 530)) may determine a second mapping relation based on the first height, the second height, the first mock location, and the second mock location. In some embodiments, the processing device 140 may repeat operations 901 through 911 to determine a plurality of mock locations associated with the second marker corresponding to a plurality of heights of the table at the same table code. The processing device 140 may determine the second mapping relation based on the plurality of heights and the plurality of mock locations. For example, the processing device 140 may determine the second mapping relation according to lens imaging principles (see FIG. 23) and/or a fitting algorithm (see FIG. 14). More descriptions regarding the determination of the second mapping relation may be found elsewhere in the present disclosure, for example, in FIGS. 14 and 23 and the descriptions thereof.

In some embodiments, the processing device 140 may direct the table to move to one or more heights in a vertical plane at a fixed incremental height (e.g., 10 mm, 50 mm, or more, or less). A capture device (not shown) mounted at a side relative to the table may acquire one or more images of the table at the one or more heights. The processing device 140 may determine the second mapping relation based on the one or more heights and one or more mock locations determined in the one or more images.

In some embodiments, the processing device 140 may repeat operations 601 through 603 at various heights to obtain mock locations and physical locations corresponding to the mock locations at various heights. For each physical location (e.g., table code), the processing device 140 may determine a group of heights and a group of corresponding mock locations. In some embodiments, the processing device 140 may obtain a fitting curve (see the solid fitting line 1401, 1402, 1403, or 1404 illustrated in FIG. 14) for each physical location based on the group of heights and the group of corresponding mock locations. Each solid fitting curve may indicate a relationship between a plurality of heights and a plurality of mock locations at a specific distance from a physical location to the target position. In some embodiments, the solid fitting curve(s) may be designated as the second mapping relation. More descriptions regarding the fitting algorithm may be found elsewhere in the present disclosure, for example, in FIG. 14 and the descriptions thereof.

In 915, the processing device 140 (e.g., the control module 420 (e.g., the calibration unit 530)) may calibrate the first mapping relation based on the second mapping relation and a height of the table at which the first mapping relation is determined. In some embodiments, for each distance (corresponding to a couch code), the processing device 140 may calibrate the first mapping relation (see the dotted fitting line 1411 illustrated in FIG. 14) by calibrating the mock locations under different heights of the table. For example, for each distance, the processing device 140 may determine the mock locations under different heights of the table based on the second mapping relation and the height of the table at which the first mapping relation is determined according to the lens imaging principles (see FIG. 23). As another example, for each distance, the processing device 140 may determine the mock locations under a group of heights of the table based on fitting functions associated with the solid fitting curves (see FIG. 14). Under each height, the processing device 140 may further perform an interpolation operation (e.g., a shape-preserving spline interpolation operation) on the mock locations to determine the distances corresponding to all the mock locations in the image. The processing device 140 may further determine fitting curve(s) and/or the lookup table representing the calibrated first mapping relation (see the dotted fitting lines 1412, 1413, and/or 1414 illustrated in FIG. 14).

It should be noted that the above description regarding the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 10 is a top view illustrating an exemplary position of the table during a calibration process according to some embodiments of the present disclosure. As shown in FIG. 10, a first marker 1002 and a second marker 1003 may be set on the table 1001. The first marker 1002 and the second marker 1003 may be crosses or any other shape. The location of the first marker 1002 or the second marker 1003 may be represented by the location of the center of the corresponding cross. In some embodiments, a three-dimensional (3D) coordinate system may be used to describe the actual position(s) (also referred to as physical position(s)) of the first marker 1002 and/or the second marker 1003. As illustrated in FIG. 10, the longitudinal direction of the table 1001 may be parallel to the Z-axis direction, and the lateral direction of the table 1001 may be parallel to the X-axis direction. The X-axis direction may be perpendicular to the Z-axis direction. The Y-axis (not shown in FIG. 10 but shown in FIG. 1) may be a vertical axis that is perpendicular to a horizontal plane formed by the X axis and the Z axis.

In some embodiments, the apparatus 110 may cause the table 1001 to move towards the isocenter 1005 of the gantry 1004 along the Z-axis direction (e.g., at a fixed incremental length). The processing device 140 may determine a distance from a first physical location of the first marker 1002 to the isocenter 1005 (i.e., the target position) as $Z_1$. The processing device 140 may determine a distance from a second physical location of the second marker 1003 to the isocenter 1005 (i.e., the target position) as $Z_2$. A physical distance between the first marker 1002 and the second marker 1003 may be represented as $Z_{12}$. In some embodiments, the first physical location and/or the second physical location may be represented by a table code of the table. In some embodiments, $Z_1$ may be determined based on a difference between the table code when the first marker 1002 is located at the first physical location and the table code when the first marker 1002 is located at the isocenter 1005. $Z_2$ may be determined based on a difference between the table code when the second marker 1003 is located at the second physical location and the table code when the second marker 1003 is located at the isocenter 1005.

In some embodiments, an image may be acquired from a top view of the table 1001. A two-dimensional (2D) coordinate system may be used to determine one or more mock locations in the image. For example, the 2D coordinate system may include a U axis parallel to the Z axis of the 3D coordinate system, and a V axis parallel to the X axis of the 3D coordinate system. A mock location in the image may be represented by the coordinates (U, V). In some embodiments, the coordinate of the mock location along the U axis may be designated as the first coordinate of the mock location.

Figure 11A:
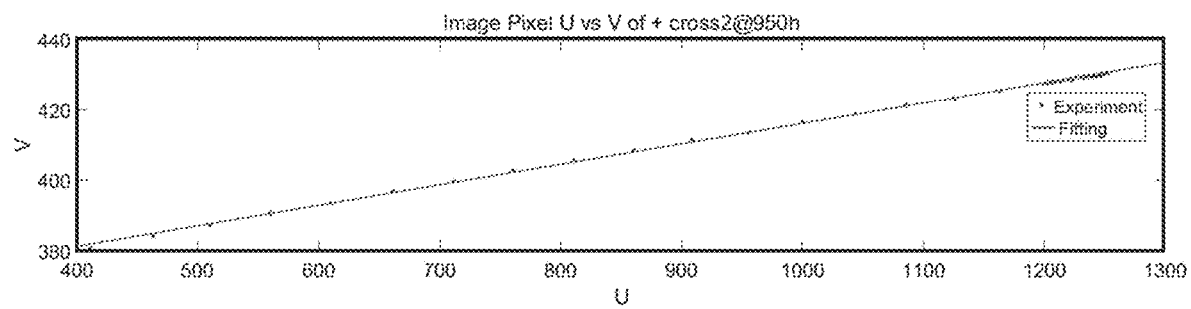
FIGS. 11A-11D are schematic diagram illustrating exemplary fitting results according to some embodiments of the present disclosure.
Figure 11B:
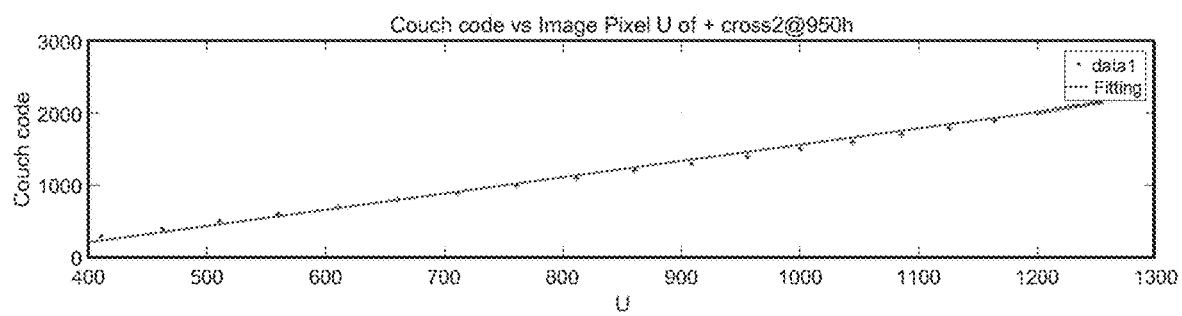
Figure 11C:
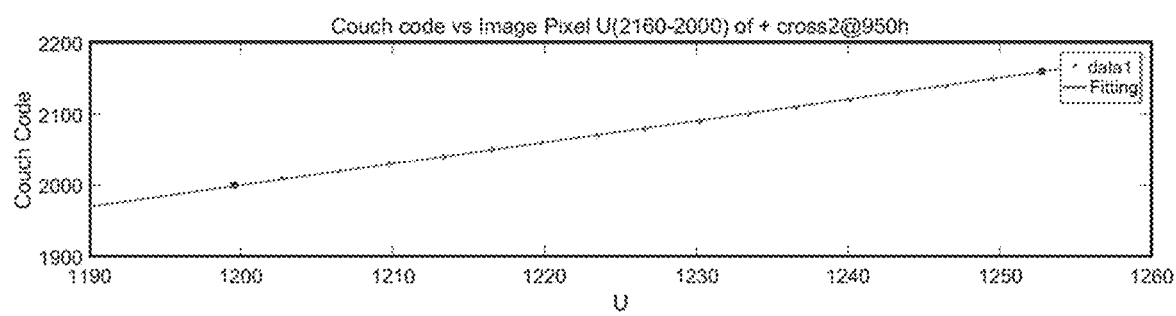
Figure 11D:
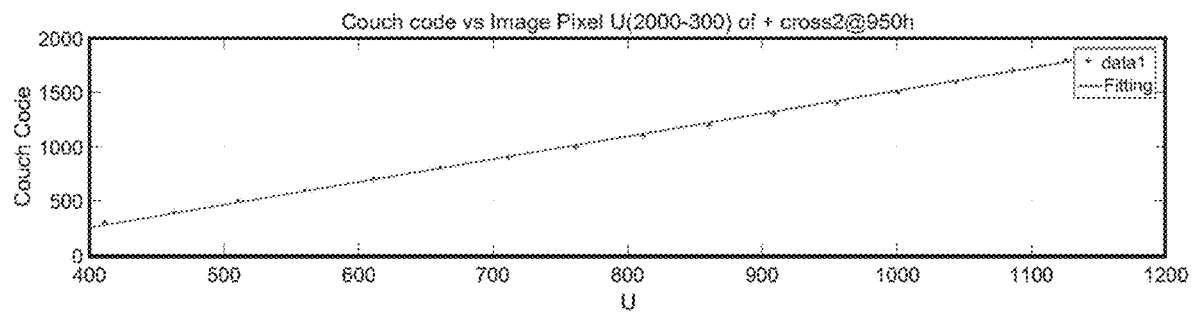

FIGS. 11A-11D are schematic diagram illustrating exemplary fitting results according to some embodiments of the present disclosure. In some embodiments, the processing device 140 may control the table to move to a plurality of physical locations (e.g., in a horizontal plane) at an incremental length. In FIGS. 11A-11D, the height of the table is 950 mm. The processing device 140 may determine a plurality of mock locations (e.g., associated with a second marker of the at least one marker on the table) in the plurality of images captured at a plurality of physical locations. FIG. 11A is a schematic diagram illustrating exemplary coordinates associated with a plurality of mock locations in a plurality of images according to some embodiments of the present disclosure. FIG. 11B is a schematic diagram illustrating an exemplary fitting line indicating a mapping relation between a plurality of couch codes from 300 mm to 2160 mm and coordinates associated with a plurality of mock locations according to some embodiments of the present disclosure. FIG. 11C is a schematic diagram illustrating an exemplary fitting line that indicates a mapping relation between a plurality of couch codes from 2000 mm to 2160 mm and coordinates associated with a plurality of mock locations according to some embodiments of the present disclosure. FIG. 11D is a schematic diagram illustrating an exemplary fitting line that indicates a mapping relation between a plurality of couch codes from 300 mm to 2000 mm and coordinates associated with a plurality of mock locations according to some embodiments of the present disclosure.

The coordinates of the mock locations change with the physical locations. A straight fitting line may be determined based on the coordinates of the plurality of mock locations in FIG. 11A. The first coordinates of the mock locations along the U axis have a linear relationship with the second coordinates of the mock locations along the V axis, additionally, the change in the V axis during the movement of the second marker is relatively small, indicating that the second marker moves along a straight line when the table is directed to move to the plurality of physical locations at the fixed incremental length, and the capture device have been installed properly. The plurality of physical locations may be represented by couch codes (interchangeably referred to as table codes) of the table. At couch codes from 300 mm to 2000 mm, the incremental length for the movement of the table is 100 mm. From couch codes 2000 mm to 2160 mm, the incremental length is 10 mm. The coordinates of the plurality of mock locations are shown in FIG. 11A and FIG. 11B. The fitting error of the fitting line illustrated in FIG. 11C is less than 1 mm. The fitting error of the fitting line illustrated in FIG. 11D is approximately 58 mm. Thus, in order to obtain a more accurate initial mapping relation based on the mock locations and the physical locations, the processing device 140 may control the table to move to a plurality of physical locations at a relatively small incremental length.

Figure 12:
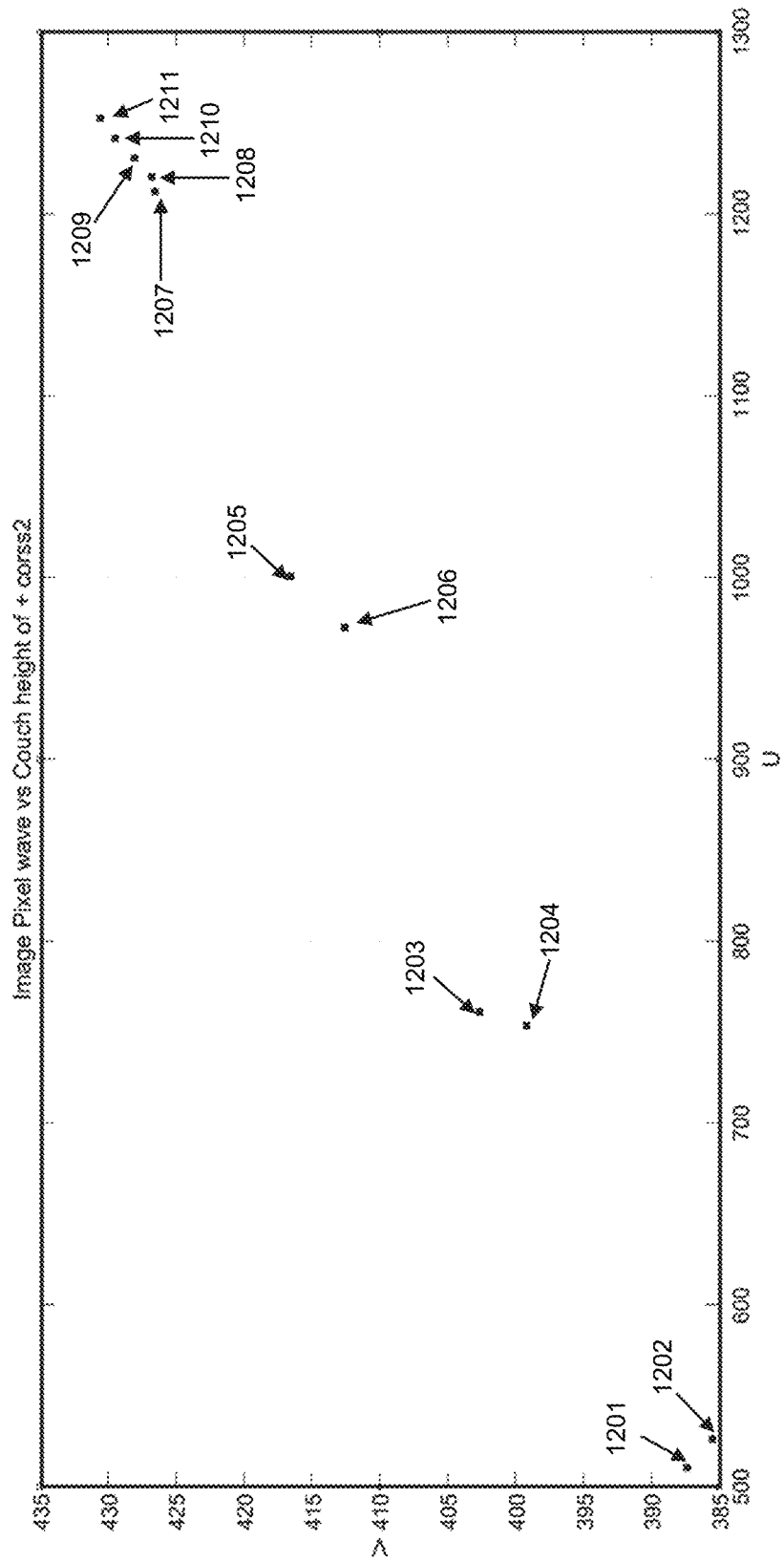
FIG. 12 is a schematic diagram illustrating exemplary mock locations corresponding to the same table code at different heights of the table according to some embodiments of the present disclosure.

FIG. 12 is a schematic diagram illustrating exemplary mock locations corresponding to the same table code at different heights of the table according to some embodiments of the present disclosure. As illustrated in FIG. 12, the mock locations may be associated with the second marker of the at least two markers on the table. Mock locations 1201 and 1202 correspond to the same couch code of 500 mm. The coordinates of the mock locations 1201 and 1202 are (510.6, 387.4) and (526.2, 385.5), respectively. The mock location 1201 corresponds to the height of 950 mm, and the mock location 1202 corresponds to the height of 762 mm. Mock locations 1203 and 1204 correspond to the same couch code of 1000 mm. The coordinates of the mock locations 1203 and 1204 are (761.3, 402.7) and (753.7, 399.2), respectively. The mock location 1203 corresponds to the height of 950 mm, and the mock location 1204 corresponds to the height of 762 mm. Mock locations 1205 and 1206 correspond to the same couch code of 1500 mm. The coordinates of the mock locations 1205 and 1206 are (1001, 416.5) and (972.8, 412.6), respectively. The mock location 1205 may correspond to the height of 950 mm, and the mock location 1206 may correspond to the height of 762 mm. The mock locations 1207, 1208, 1209, 1210, and 1211 correspond to the same couch code of 2160 mm. The coordinates of mock locations 1207, 1208, 1209, 1210, and 1211 are (1212, 426.6), (1220, 426.8), (1231, 428), (1242, 429.5), (1253, 430.5), respectively. The mock locations 1207, 1208, 1209, 1210, and 1211 correspond to the heights of 762 mm, 800 mm, 850 mm, 900 mm, 950 mm, respectively. As illustrated in FIG. 12, the mock locations associated with the second marker corresponding to the same couch code at different heights may be different. Therefore, the initial mapping relation (e.g., between a plurality of mock locations and a plurality of physical locations) and/or the first mapping relation (e.g., between a plurality of mock locations and a plurality of distances from the plurality of physical locations to the target position) may need to be calibrated for different heights.

Figure 13:
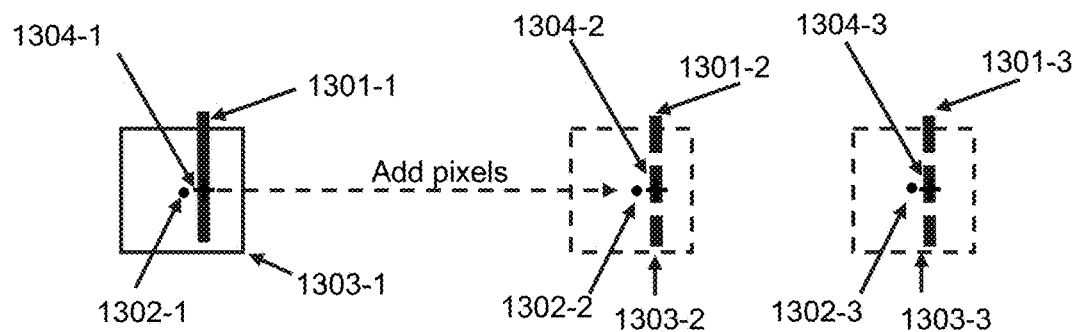
FIG. 13 is a schematic diagram illustrating exemplary identification process of a marker in one or more images according to some embodiments of the present disclosure.

FIG. 13 is a schematic diagram illustrating exemplary identification process of a marker in one or more images according to some embodiments of the present disclosure. In some embodiments, an operator may provide information indicating the location of the marker in at least one image of the one or more images via the user interface of the terminal 130. Specifically, the user may manually mark a rough pixel 1302-1 in the vicinity of the center of the marker 1301-1 in an image. In some embodiments, the processing device 140 may determine an ROI 1303-1 having a predetermined size in the image marked by the operator. For instance, as illustrated in FIG. 13, the ROI 1303-1 is a rectangle. The rough pixel 1302-1 may be located in the center of the ROI 1303-1. The processing device 140 may determine a gradient of the pixels in the ROI 1303-1. A pixel corresponding to a highest gradient may be designated as a precise pixel 1304-1 representing the mock location in the marked image. The mock location in the marked image may be represented by the first coordinate of the precise pixel 1304-1. The ROI 1303-1 may be used as a template. To determine the precise pixel 1304-2 in a next image, the processing device 140 may move the template to the vicinity of the mock location in the next image (e.g., illustrated as the ROI 1303-2). The center of the ROI 1303-2 may correspond to the rough pixel 1302-2. For instance, the template may be moved in a same direction in which the table is moved to the one or more physical locations. The template may be moved by a number of pixels. If the next image is acquired at a same height of the table as the marked image, the number of pixels may be determined based on a difference between the couch code corresponding to the mock location in the marked image and the next couch code corresponding to the mock location in the next image. For example, the number of pixels by which the template is moved may be determined according to the following equation:

$$\text{AddPixels}(n+1) = [\text{DefaultCouchCode}(n+1) - \text{DefaultCouchCode}(n)] * \text{CodeFactor}, \quad (2)$$

where n represents the image sequence number (e.g., 1, 2, 3, 4, ...), Addpixels(n+1) represents the number of pixels by which the template is moved, DefaultCouchCode(n+1) represents the couch code of the marker (e.g., the marker 1301-2 in FIG. 13) in the next image (e.g., including the marker 1301-2), DefaultCouchCode(n) represents the couch code of the marker (e.g., the marker 1301-1 in FIG. 13) in the marked image, and CodeFactor represents a relationship coefficient between a horizontal distance (e.g., the incremental length) and the number of pixels. In Equation (2), it may be assumed that the $n^{th}$ image (e.g., the marked image) and the $(n+1)^{th}$ image (e.g., the next image) are captured at the same height.

If the next image is acquired at a different height of the table as compared to the marked image, the number of pixels may be determined based on a difference in the heights associated with the marked image and the next image. As illustrated in FIG. 13, the template may be moved to the vicinity of the mock location in a next image (e.g., illustrated as the ROI 1303-3), to determine the precise pixel 1304-3 in the next image. The center of the ROI 1303-3 may correspond to the rough pixel 1302-3. For example, the number of pixels by which the template is moved may be determined according to the following equation:

$$\text{AddPixels}(\text{OtherCouchHeight}) = [\text{CouchHeight}(n+1) - \text{CouchHeight}(n)] * \text{HeightFactor}, \quad (3)$$

where AddPixels(OtherCouchHeight) represents the number of pixels by which the template is moved, CouchHeight(n+1) represents the height of the couch at which the next image (e.g., including the marker 1301-3) is acquired, CouchHeight(n) represents the height of the couch at which the marked image (e.g., including the marker 1301-1) is acquired, and HeightFactor represents a relationship coefficient between a vertical distance (e.g., a difference in the heights associated with the marked image and the next image) and the number of pixels. In Equation (3), it may be assumed that the $n^{th}$ image (e.g., the marked image) and the $(n+1)^{th}$ image (e.g., the next image) are captured at the same couch code.

Similar to the precise pixel 1304-1 in the ROI 1303-1, the processing device 140 may determine a pixel having a highest gradient in the ROI 1303-2 as the precise pixel 1304-2 in the ROI 1303-2. For the ROI 1303-3, a pixel having a highest gradient in the ROI 1303-3 may be determined as the precise pixel 1304-3 in the ROI 1303-3.

Figure 14:
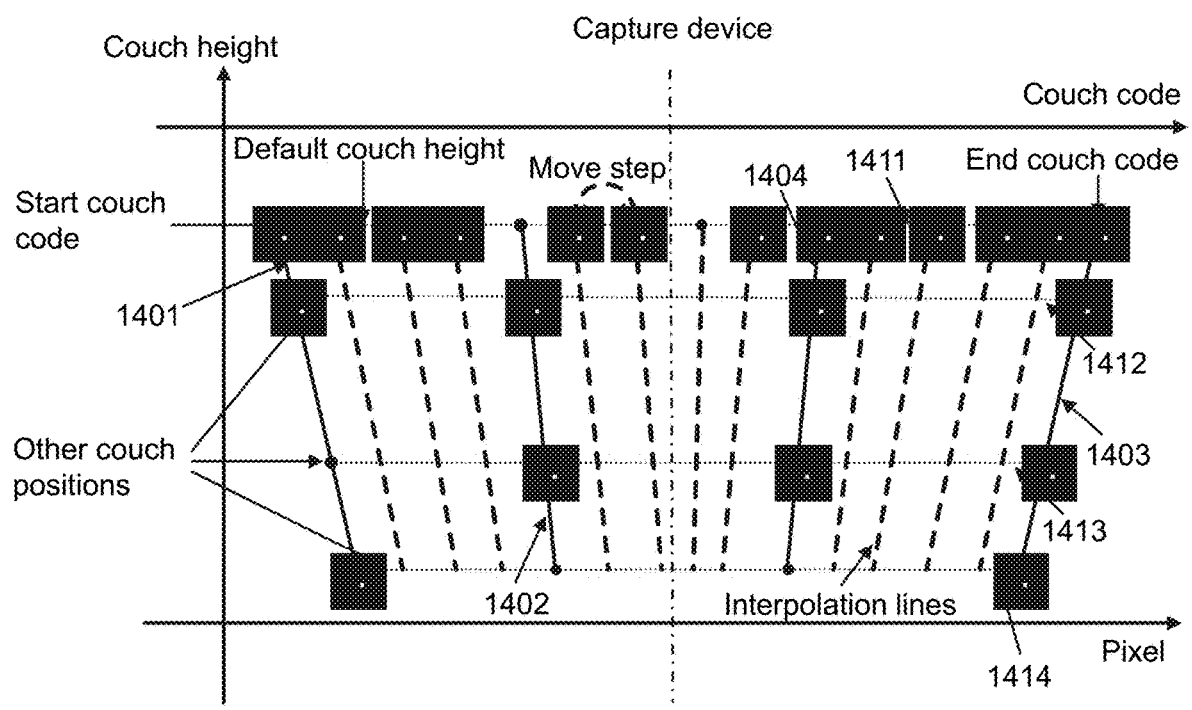
FIG. 14 is a schematic diagram illustrating exemplary fitting lines and interpolation lines for determining a calibrated first mapping relation according to some embodiments of the present disclosure.

FIG. 14 is a schematic diagram illustrating exemplary fitting lines and interpolation lines for determining a calibrated first mapping relation (e.g., a lookup table) according to some embodiments of the present disclosure. In some embodiments, the processing device 140 may repeat operations 901 through 911 to determine a plurality of mock locations associated with the second marker corresponding to a plurality of heights of the table at the same couch code. In some embodiments, the processing device 140 may repeat operations 601 through 603 at various heights of the table to obtain mock locations and physical locations (e.g., the start couch code, the end couch code, or a couch code between the start couch code and the end couch code) corresponding to the mock locations at various heights. As illustrated in FIG. 14, the four solid dots in the solid fitting line 1401 represent four mock locations corresponding to four physical locations under four heights of the table at the same couch code (i.e., the start couch code). The four solid dots in the solid fitting line 1403 represent four mock locations corresponding to four physical locations under four heights of the table at the same couch code (i.e., the end couch code). The four solid dots in the solid fitting line 1402 represent four mock locations corresponding to four physical locations under four heights of the table at the same couch code (i.e., a couch code between the start couch code and the end couch code). The four solid dots in the solid fitting line 1404 represent four mock locations corresponding to four physical locations under four heights of the table at the same couch code (i.e., another couch code between the start couch code and the end couch code). The fifteen solid dots in the dotted fitting line 1411 represent fifteen mock locations corresponding to fifteen physical locations under a first same height of the table at fifteen different couch codes from the start couch code to the end couch code. The four solid dots in the dotted fitting line 1412 represent four mock locations corresponding to four physical locations under a second same height of the table at four different couch codes from the start couch code to the end couch code. The four solid dots in the dotted fitting line 1413 represent four mock locations corresponding to four physical locations under a third same height of the table at four different couch codes from the start couch code to the end couch code. The four solid dots in the dotted fitting line 1414 represent four mock locations corresponding to four physical locations under a fourth same height of the table at four different couch codes from the start couch code to the end couch code.

For each couch code, the processing device 140 may determine a group of heights and a group of corresponding mock locations. The processing device 140 may generate a fitting line for each couch code (e.g., the solid fitting lines 1401, 1402, 1403 or 1404 illustrated in FIG. 14) based on the group of heights and the group of corresponding mock locations. In some embodiments, the processing device 140 may determine the slopes of the solid fitting lines. In some embodiments, the processing device 140 may further perform an interpolation operation (e.g., a shape-preserving spline interpolation operation) on the slopes to obtain a plurality of slopes at different couch codes. The processing device 140 may then determine an interpolation line based on each slope and each corresponding couch code, so that a plurality of interpolation lines (see the dashed lines illustrated in FIG. 14) may be generated. According to the dashed interpolation lines and the solid fitting lines, the relationship between the mock locations and various heights at each couch code may be determined.

For each height, the processing device 140 may further perform an interpolation operation (e.g., a shape-preserving spline interpolation operation) on the mock locations at various couch codes but under the same height to determine a fitting line (see the dotted fitting line 1411, 1412, 1413, or 1414 as illustrated in FIG. 14). According to the dotted fitting lines, the relationship between the mock locations and various couch codes under each height (e.g., a height between a maximum height 950 mm and a minimum height 762 mm) may be determined.

In some embodiments, the processing device 140 may determine a plurality of distances from the plurality of physical locations to the target position (e.g., by subtracting the couch code at the target position from the plurality of couch codes). The processing device 140 may further generate a lookup table based on the mock locations and the corresponding distances at various heights.

Figure 15:
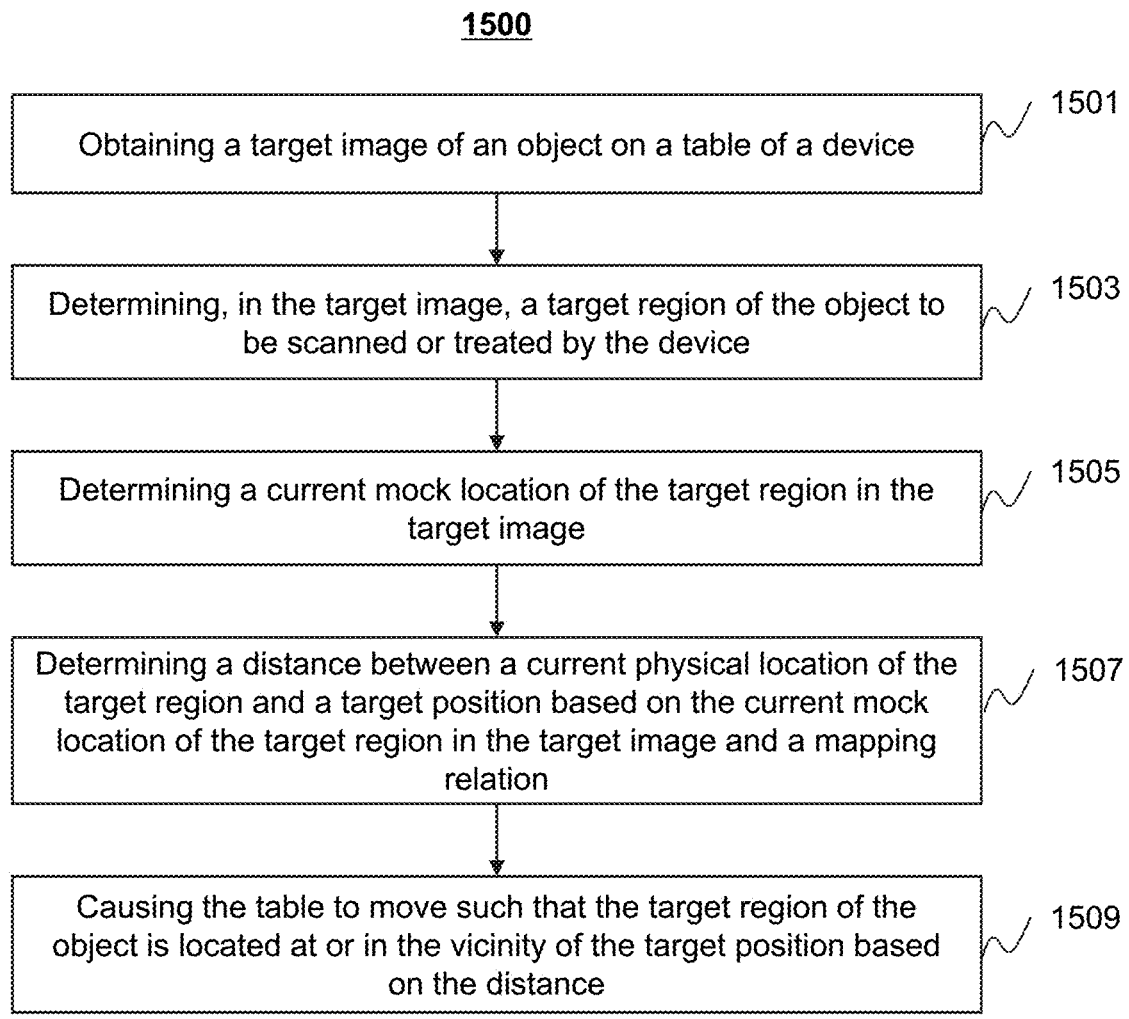
FIG. 15 is a flowchart illustrating an exemplary process for positioning an object in a device according to some embodiments of the present disclosure.

FIG. 15 is a flowchart illustrating an exemplary process for positioning an object in a device according to some embodiments of the present disclosure. At least a portion of process 1500 may be implemented on the computing device 200 as illustrated in FIG. 2 or the mobile device 300 as illustrated in FIG. 3. In some embodiments, one or more operations of the process 1500 may be implemented in the system 100 as illustrated in FIG. 1. In some embodiments, one or more operations in the process 1500 may be stored in the storage device 150 and/or the storage (e.g., the storage 220, the storage 390, etc.) as a form of instructions, and invoked and/or executed by the apparatus 110 (e.g., the processing device 140, or the processor 210 of the processing device 140). In some embodiments, the instructions may be transmitted in the form of electronic current or electrical signals.

In 1501, the processing device 140 (e.g., the acquisition module 440) may obtain a target image of an object on a table of a device (e.g., the apparatus 110, the gantry 1602). The target image may be acquired by a capture device (e.g., the capture device 160, the capture device 1601). In some embodiments, the capture device may be mounted above the table (e.g., the table 115, the table 1603) at a fixed position related to a device (e.g., the apparatus 110, the gantry 1602). The processing device 140 may obtain the target image of the object from the capture device or the storage device 150 via the network 120. The device may include an imaging device and/or a treatment device. For example, the table may be used to support an object in an imaging process by a CT scanner. As another example, the table may be used to support an object in a radiation therapy process by an RT device. The object may include a human (e.g., a patient, etc.), an animal, a material sample, or the like, or a combination thereof. The target image may be a 2D image or a 3D image.

In 1503, the processing device 140 (e.g., the image processing module 430) may determine, in the target image, a target region of the object to be scanned or treated by the device. The target region may include the head, the neck, the shoulder, a chest, a hand, an arm, the pelvis, a leg, a foot, or the like, or any combination thereof.

In some embodiments, a user (e.g., an operator) may manually determine the target region (e.g., by determining a frame representing the target region) in the image via the terminal 130. In some embodiments, the operator may mark the target region of the object in the image. For example, the operator may draw a line, a circle, a frame, etc. at the target region or in the vicinity of the target region, e.g., by using a mouse. In some embodiments, the marked image may be displayed in the terminal 130, and the operator may further adjust, modify, or edit the mark. After the operator confirms the target region, the processing device 140 may obtain information relating to the target region determined by the user.

In some embodiments, the processing device 140 may automatically determine the target region in the target image, for example, by using an image recognition algorithm. The image recognition algorithm may include but not limited to a threshold-based segmentation, a histogram-based algorithm, a pattern recognition algorithm, an image match algorithm, an artificial intelligence (AI) algorithm, an algorithm using a trained recognition model, a template matching algorithm, a target tracking algorithm, a machine learning algorithm, etc. More descriptions of the determination of the target region of the object may be found elsewhere in the present disclosure (e.g., operation 2507 of FIG. 25 and descriptions thereof). In some embodiments, the recognized target region may be displayed in the terminal 130. In some embodiments, the processing device 140 may highlight the recognized target region. For example, the target region may be surrounded by a rectangular box or indicated by a line. In some embodiments, the operator may adjust, modify, or edit the mark (e.g., the rectangular box, the line, etc.). In some embodiments, after the operator confirms the target region, the processing device 140 may obtain information relating to the target region.

In 1505, the processing device 140 (e.g., the image processing module 430) may determine a current mock location of the target region in the target image. The current mock location may correspond to a current physical location of the center (or edge) of the target region. In some embodiments, the current mock location of the target region may be the center (or an edge) of the target region. In some embodiments, the current mock location of the target region may be represented by the pixel location of the mark that indicates the target region. In some embodiments, the current mock location may be represented by a first coordinate of the pixel representing the target region or the mark thereof.

In 1507, the processing device 140 (e.g., the control module 420 (e.g., the table positioning unit 540)) may determine a distance between a current physical location of the target region and a target position based on the current mock location of the target region in the target image and a mapping relation. The target position may be the isocenter of the apparatus 110, such as a scanning isocenter, or a treatment isocenter. More descriptions of the target position may be found elsewhere in the present disclosure (e.g., FIG. 6 and descriptions thereof). In some embodiments, the processing device 140 may determine the distance between the current physical location of the target region and the target position based on a mapping relation between an element in a calibration image captured using the capture device and a calibration distance that is between a physical location of the element when the calibration image is taken and the target position. Specifically, the element may be pixel(s) representing a marker on the table. The mapping relation may be determined by calibrating the table of the device. In some embodiments, the mapping relation may be represented by one or more fitting curves and/or a lookup table. More descriptions regarding the determination of the mapping relation may be found elsewhere in the present disclosure, for example, in FIGS. 6-14 and the descriptions thereof.

In 1509, the processing device 140 (e.g., the control module 420 (e.g., the table control unit 510)) may cause the table to move such that the target region of the object is located at or in the vicinity of the target position based on the distance. For example, the processing device 140 may send control signals to the apparatus 110 to cause the table to move along a longitudinal direction based on the distance so that the target region may be located at or in the vicinity of the target position. After the target region of the object is positioned at the target position, the apparatus 110 may perform a scanning operation or a treatment operation on the target region of the object.

It should be noted that the above description regarding the process 1500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, operations 1503 and 1505 may be integrated into a single operation. In some embodiments, the processing device 140 may determine, in the target image, the target region of the object to be scanned or treated based on an image recognition algorithm described in the present disclosure. In some embodiments, the processing device 140 may receive, from an operator, an instruction to adjust the target region of the object or information indicating an adjusted target region of the object, which may be similar to operation 803 or operation 2507. In some embodiments, the processing device 140 may receive, from the operator, information indicating the (adjusted) target region of the object in the target image. The information indicating the target region of the object may include a mark labelled by the operator (e.g., drawn by the operator using a mouse) in the target image. The mark may include a line, a dot, a circle, a cross, a rectangular box, or any other shape described in the present disclosure. In some embodiments, the processing device may display the target image of the object (e.g., in a display device described in the present disclosure).

In some embodiments, an additional capture device may be mounted at a side relative to the table and/or the object. The additional capture device may obtain a reference image of the object from a side view. In some embodiments, the thickness of the target region may be determined based on the reference image acquired from the side view. In some embodiments, the thickness of the target region may be an average thickness of the target region (e.g., the abdomen, the chest) of a plurality of objects. In some embodiments, the height of the target region may be determined by adding half of the thickness of the target region to the height of the table. In some embodiments, the distance between the current physical location of the target region and the target position may be determined based on the current mock location and the height of the target region according to the mapping relation (e.g., fitting curve(s) and/or the lookup table). In some embodiments, the processing device 140 may cause the table to move in a vertical direction to adjust the height of the target region so that the target region may be located at or in the vicinity of the target position in the vertical direction. In some embodiments, the height of the target region may be adjusted before or after the table moves along the longitudinal direction.

Figure 16A:
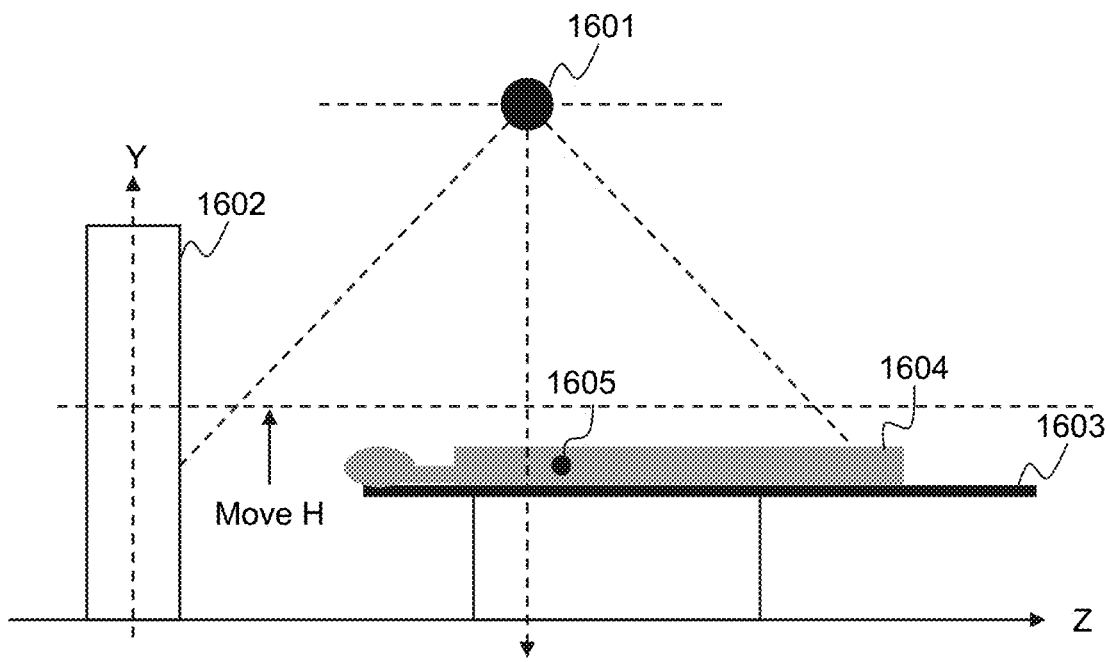
FIGS. 16A and 16B are schematic diagrams illustrating an exemplary process for positioning an object in a device according to some embodiments of the present disclosure.
Figure 16B:
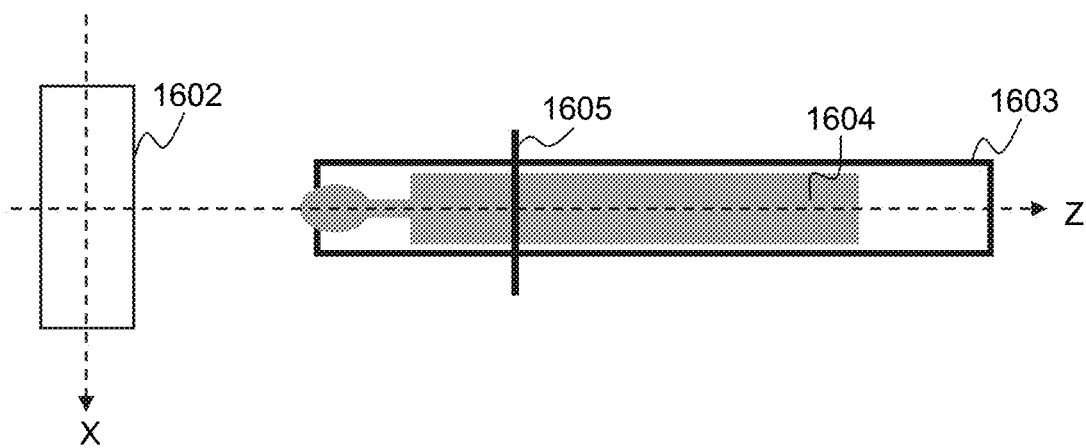

FIGS. 16A and 16B are schematic diagrams illustrating an exemplary process for positioning an object in a device according to some embodiments of the present disclosure. FIG. 16A is a side view of the positioning of an object according to some embodiments of the present disclosure. FIG. 16B is a top view of the positioning of an object according to some embodiments of the present disclosure.

As illustrated in FIGS. 16A and 16B, an object 1604 (e.g., a patient) may lie on the table 1603. A capture device 1601 (e.g., a camera) mounted above the table 1603 may acquire a target image of the object from a top view. In some embodiments, an additional capture device (not shown) may be mounted at a side relative to the table 1603 to obtain a reference image from a side view. The processing device 140 or an operator may determine a mock location 1605 in the target region (e.g., the chest) in the target image. The processing device 140 may determine a distance by which the table 1603 need to be moved to reach a target position (e.g., the isocenter of the gantry 1602) based on a mapping relation (the mapping relation illustrated in FIG. 15, the (calibrated) first mapping relation illustrated in FIGS. 6-14). In some embodiments, the height of the table 1603 may be adjusted before or after the table 1603 moves along the longitudinal direction (e.g., along the Z-axis direction shown in FIGS. 16A and 16B). Specifically, as illustrated in FIG. 16A, the table 1603 may be directed to move upward (e.g., along the Y-axis direction shown in FIG. 16A) so that the center of the target region and the target position may be located at a same height. The processing device 140 may further direct the table 1603 to move along the longitudinal direction of the table 1603 towards the gantry 1602 of the device. The table 1603 may move along the longitudinal direction of the table 1603 based on the distance between the current physical location of the target region and the target position such that the center of the target region may be located at or in the vicinity of the target position.

One embodiment of the calibration of an imaging device of the present disclosure is described below with reference to FIGS. 17-21.

Figure 17:
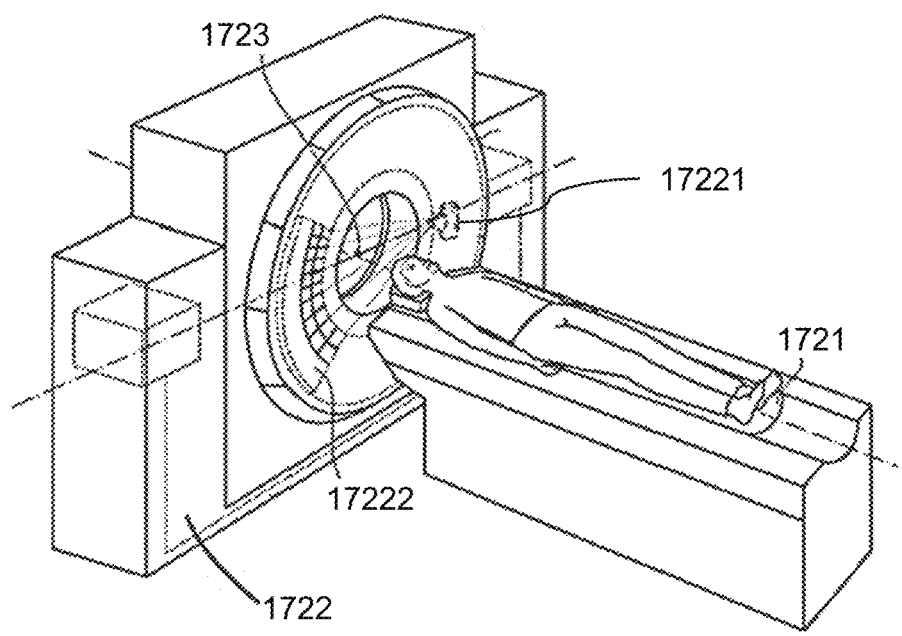
FIG. 17 is a schematic diagram illustrating an exemplary system according to some embodiments of the present disclosure.

FIG. 17 is a schematic diagram illustrating an exemplary system according to some embodiments of the present disclosure. In FIG. 17, a CT scanner is taken as an example to illustrate the basic structure of an imaging device adapted to the calibrate system. In the current embodiment, the imaging device 1700 (e.g., a CT scanner) may include a table 1721 and a gantry 1722. The table 1721 may be configured to support the object. The table 1721 can be moved such that the target region of the object to be scanned is moved to a location suitable for detection (e.g., a bore of the gantry 1722 in FIG. 17). After the target region of the object to be scanned is moved to the location suitable for detection, the imaging device 1700 (e.g., a CT scanner) may scan the target region. For example, the imaging device 1700 may have a radiation source 17221 and a detector 17222. The radiation source 17221 may emit radiation rays to the target region to be scanned. The radiation rays may pass through the target region of the object to be scanned and may be received by the detector 17222. A medical image of the object to be scanned can be obtained by analyzing the radiation rays received by the detector 17222. The imaging device can also be any of PET-CT, MR, and PET-MR.

Figure 18:
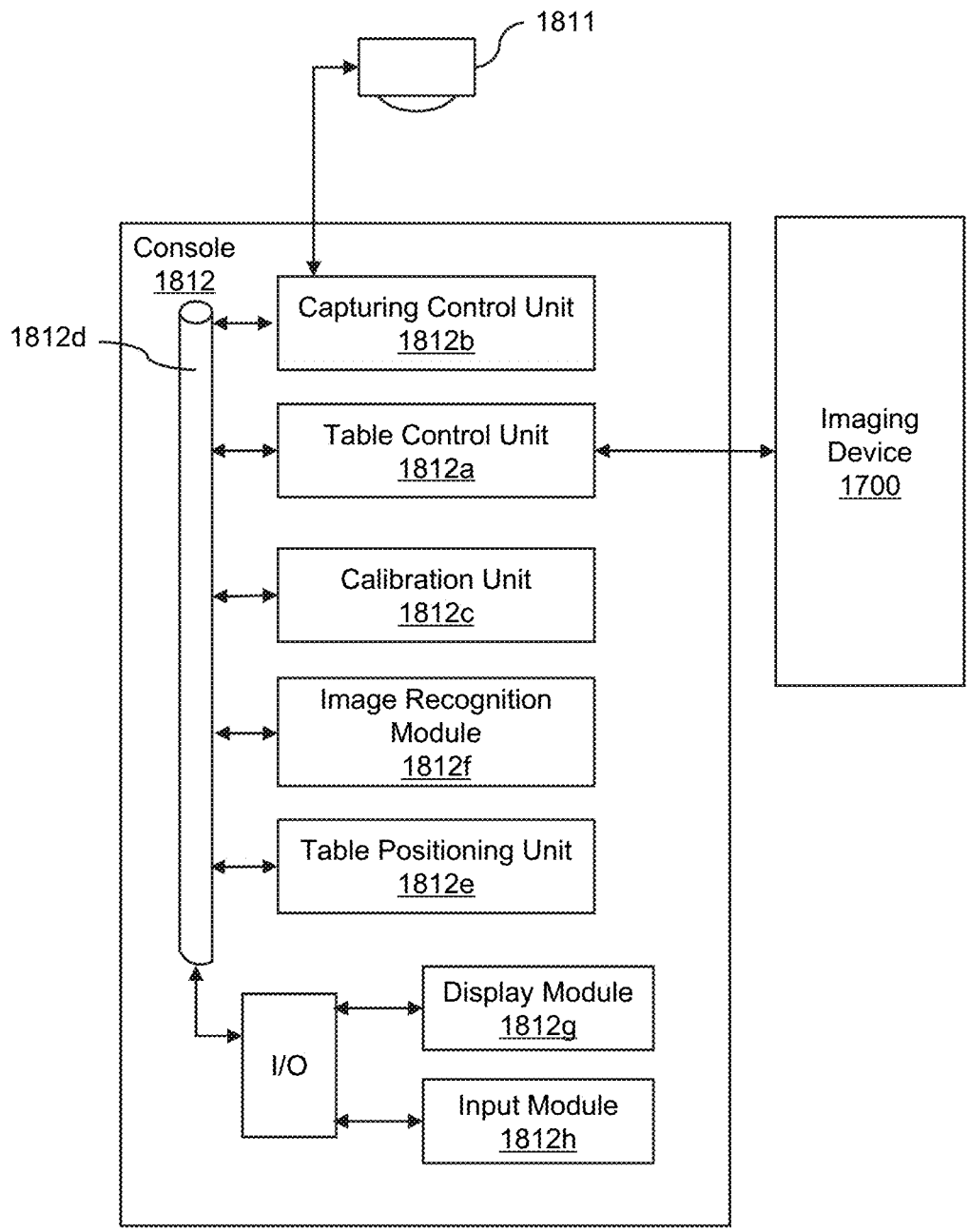
FIG. 18 is a schematic diagram illustrating an exemplary imaging device according to some embodiments of the present disclosure.

FIG. 18 is a schematic diagram illustrating an exemplary imaging device according to some embodiments of the present disclosure. In FIG. 18, in addition to the imaging device 1700, the imaging system may further include a capture device 1811, a table control unit 1812a, a capturing control unit 1812b, a calibration unit 1812c, and a table positioning unit 1812e. The table control unit 1812a, the capturing control unit 1812b, the calibration unit 1812c, and the table positioning unit 1812e are connected to each other and can exchange data. In the current embodiment, the units may collectively form a console 1812. The console 1812 may also have a bus 1812d through which the table control unit 1812a, the capturing control unit 1812b, the calibration unit 1812c, and the table positioning unit 1812e are connected. For convenience of explanation, the console 1812 and the capture device 1811 may also be collectively referred to as a calibration system hereinafter.

The capture device 1811 may be positioned at a specific location, and may capture images of all regions that the table 1721 can reach. The table control unit 1812a may be connected to the imaging device 1700. The table control unit 1812a can send a table movement signal to the imaging device 1700 to move the table 1721 of the imaging device 1700 to a plurality of physical locations. The capturing control unit 1812b, may connect with the capture device 1811. The capturing control unit 1812b may be capable of controlling the capture device 1811 and cause the capture device 1811 to capture the images of the table 1721 at each physical location. The calibration unit 1812c can obtain a plurality of physical locations and the corresponding mock locations of the table 1721. The table positioning unit 1812e can obtain the mapping relation between the physical locations of the table and the mock locations according to this information. The mapping relation can be used to determine the physical location of the table according to the image taken by the capture device before the imaging device 1700 scans the object.

The ways that the calibration unit 1812c obtains a plurality of physical locations of the table 1721 and the corresponding mock locations may be diverse. In some embodiments, the capturing control unit 1812b may obtain these images from the capture device 1811 after controlling the capture device 1811 to take an image of the table 1721 at each physical location, and transmit the images to the calibration unit 1812c via the bus 1812d. The table control unit 1812a may send a table movement signal to the imaging device 1700, the movement signal may also be transmitted to the calibration unit 1812c, and the calibration unit 1812c can obtain the physical locations of the table based on the signal(s).

Figure 19:
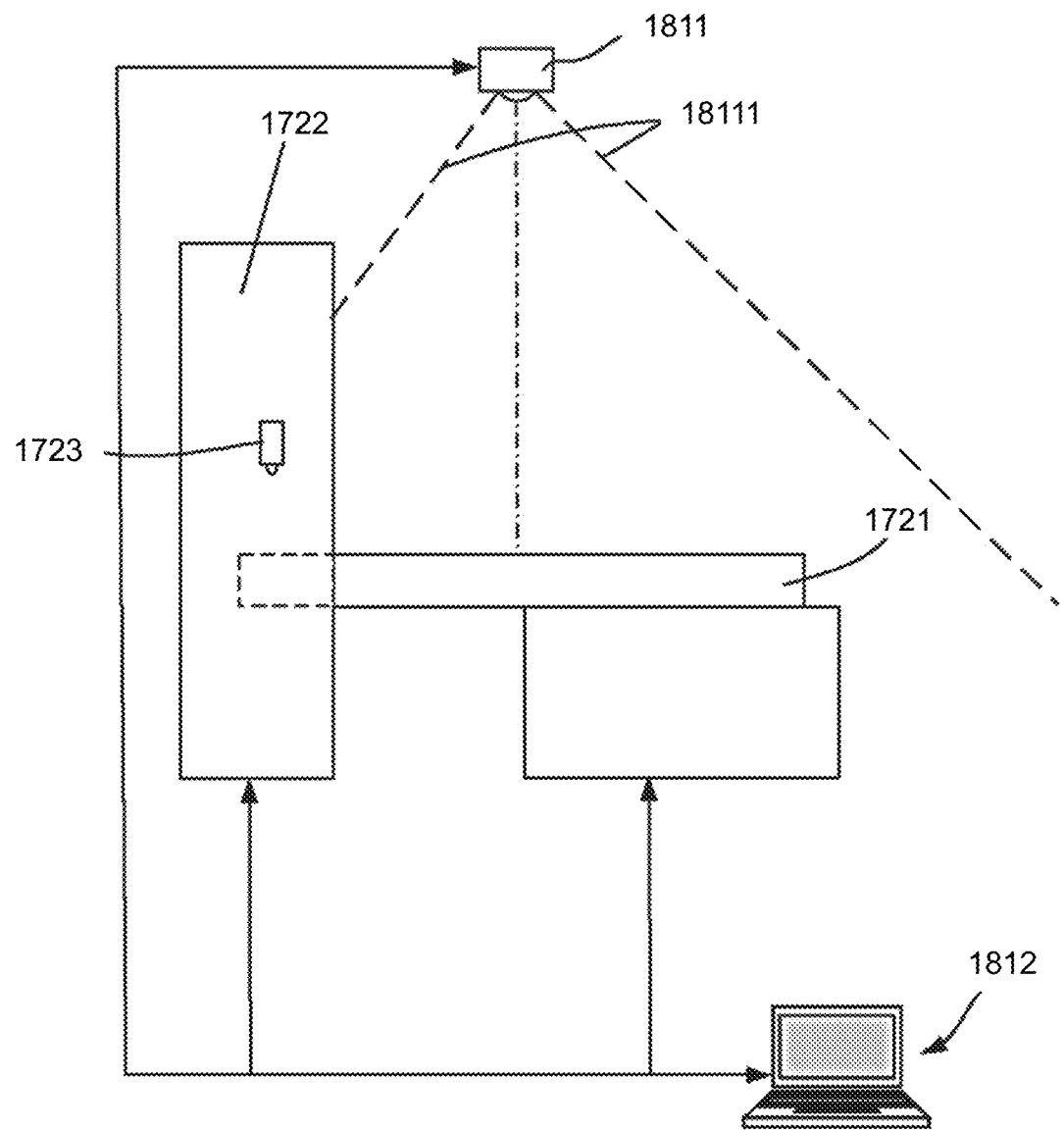
FIG. 19 is a schematic diagram illustrating an imaging device in a first state according to some embodiments of the present disclosure.
Figure 20:
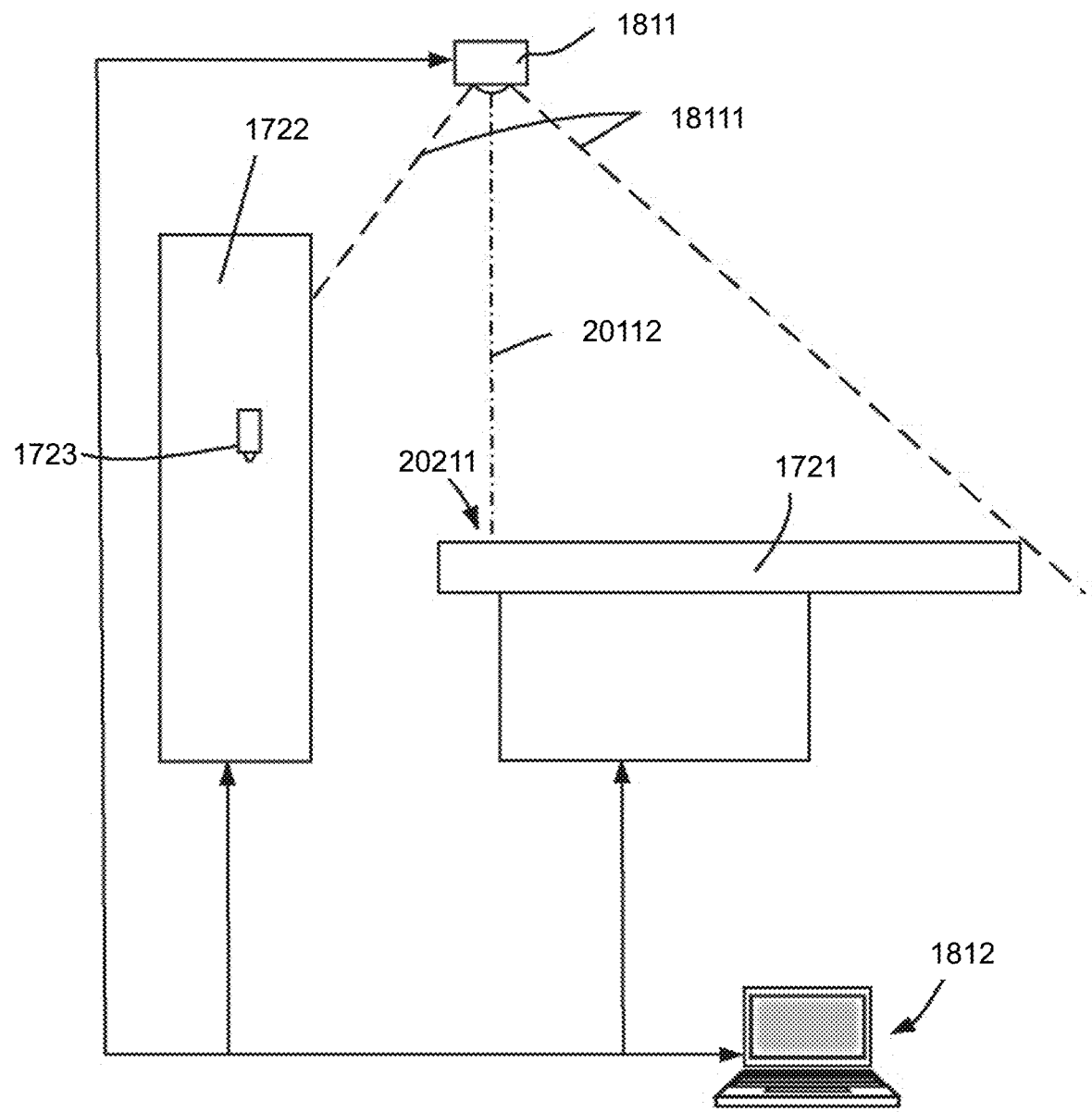
FIG. 20 is a schematic diagram illustrating an imaging device in a second state according to some embodiments of the present disclosure.

FIG. 19 is a schematic diagram illustrating an imaging device in a first state according to some embodiments of the present disclosure. FIG. 20 is a schematic diagram illustrating an imaging device in a second state according to some embodiments of the present disclosure. In FIGS. 19 and 20, the calibration system of the imaging device 1700 may include a capture device 1811 and a console 1812. An exemplary capture device may be a camera or a video camera. The capture device can capture images of the table 1721 within the movement range of the table. For example, in FIG. 19, the imaging device 1700 is in the first state. In the first state, the table 1721 of the imaging device 1700 is located closest to the gantry 1722, and the dotted line 18111 shows the range that the capture device 1811 can capture. The capture device 1811 is capable of capturing all the uncovered regions of the table 1721. In FIG. 20, the imaging device 1700 is in the second state. In the second state, the table 1721 of the imaging device 1700 is located farthest from the gantry 1722, and the capture device 1811 can capture all the regions of the table 1721.

The console 1812 can be any device capable of controlling the capture device and the imaging device 1700. For example, in the current embodiment, the console 1812 may be a personal computer. In other embodiments, the console 1812 can be a workstation, a server, or a smart mobile device. The connection between the console 1812, the imaging device 1700 and the capture device 1811 may be a direct connection as shown in FIGS. 19 and 20, or an indirect connection (e.g., via a network), or the like.

In one embodiment, the console 1812 may control the imaging device 1700 and the capture device 1811, and perform one or more of the following operations.

The console 1812 may cause the table 1721 of the imaging device 1700 to move to a plurality of physical locations by sending movement instructions to the imaging device 1700. Here the physical locations of the table 1721 may be the actual locations, not the locations in the image. Therefore, the location of the table 1721 may be referred to as a physical location in the following descriptions. Images of the table 1721 at the plurality of physical locations may be taken during the movement of the table 1721. For illustration purposes, the images may be referred to hereinafter as calibration images.

The console 1812 may obtain the mapping relation of the physical locations and the mock locations of the table 1721 according to a plurality of physical locations and corresponding mock locations in the calibration images of the table 1721.

After the console 1812 obtains the mapping relation, the mapping relation may be used to the subsequent "determination of the physical location of the table 1721 based on the image taken by the capture device 1811".

It should be noted that the specific operations for moving the table 1721 of the imaging device 1700 to a plurality of physical locations can be diverse. For example, the table 1721 of the imaging device 1700 can be moved to a certain location, and the location may be taken as the initial physical location, and then the table 1721 may be moved to the physical locations at a fixed incremental length.

On the other hand, according to the plurality of physical locations and the plurality of mock locations of the table 1721, the implementation of obtaining the mapping relation between the physical location and the mock location of the table 1721 can also be varied. In some embodiments, the specific operations of obtaining the mapping relation between the physical location and the mock location of the table 1721 may include one or more of the following operations: first, the initial mock location of the table in an initial image (captured at the initial physical location) may be obtained; then, according to other images, the mock locations of the table in the other images may be obtained; finally, the mapping relation between the physical locations and the mock locations of the table may be determined according to the initial physical location, the initial mock location, the step distance, and/or the mock locations in the other images. One or more of the operations can be performed by the console 1812.

In some embodiments, the console 1812 may be an embodiment of the processing device 140.

Figure 21:
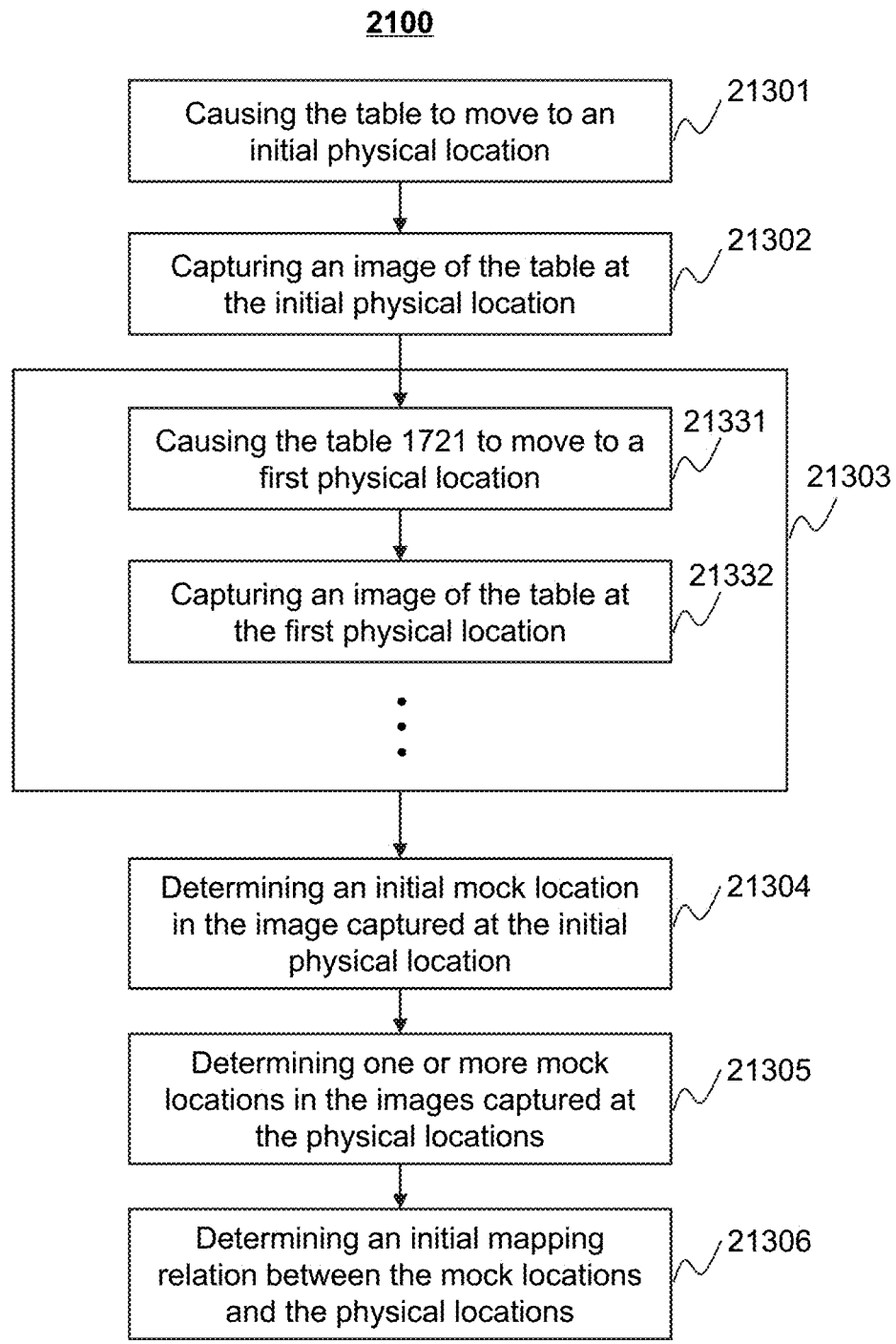
FIG. 21 is a flowchart illustrating an exemplary process for calibrating a table of an imaging system according to an embodiment of the present disclosure.

FIG. 21 is a flowchart illustrating an exemplary process for calibrating a table of an imaging system according to an embodiment of the present disclosure. In the process 2100 illustrated in FIG. 21, the operations performed by the console 1812 in the controlling of the imaging device 1700 and the capture device 1811 in another embodiment are described. In the embodiment, the console 1812 may control the imaging device 1700 and the capture device 1811 to execute the following operations.

In 21301, the console 1812 may cause the table 1721 of the imaging device 1700 to move to the initial physical location by sending a movement instruction to the imaging device 1700. As shown in FIG. 20, in the current embodiment, the initial physical location may be the location closest to the gantry 1722 within the movement range of the table 1721. In other embodiments, the initial physical location may be other locations, such as a location furthest from the gantry 1722 within the movement range.

Although this operation is described first, there may be other operations performed before this operation. For example, in FIG. 21, there may be a "start" operation before this operation. In the start operation, the calibration system and the imaging device 1700 may perform operation(s) such as self-test.

In 21302, the capture device 1811 may capture the initial image of the table 1721 when the table is located in at the initial physical location. After the initial image is captured, the console 1812 may obtain the initial image from the capture device 1811.

In 21303, the table 1721 may be moved to one or more physical locations at a fixed incremental length. After each movement of the table 1721, an image may be captured. This operation may be performed repeatedly. In some embodiments, the operation 21303 may include one or more of the following operations.

In operation 21331, the table 1721 may be moved to a first physical location for a first time at the fixed incremental length.

In operation 21332, an image of the table 1721 may be captured after the table 1721 is moved to the first physical location.

In operation 21333, the table 1721 may be moved to a second physical location for a second time at the fixed incremental length.

In operation 21334, an image of the table 1721 may be captured after the table 1721 is moved to the second physical location.

This operation may be repeated until the table 1721 is moved to an $N^{th}$ physical location for an $N^{th}$ time, and an image is captured at the $N^{th}$ physical location. As illustrated in FIG. 20, the operation may be terminated if the number (or count) of times N of moving the table 1721 reaches a predetermined number, or the table 1721 reaches the end of the movement range.

In 21304, an initial mock location of the table 1721 in the initial image may be obtained. Although this operation in FIG. 21 is illustrated as after operation 20303, the operation can be performed at any other time. For example, in some embodiments, after operation 21302, the console 1812 may determine an initial mock location of the table 1721 in the initial image in real time.

In 20305, a mock location of the table 1721 may be determined in each image captured in 21303. Similarly, operation 21305 may not necessarily be performed after operation 21304, and can be performed at another time. In some embodiments, each time the image is obtained, the console 1812 may determine a mock location of the table 1721 in the image in real time.

In 21306, the console 1812 may determine the mapping relation between the physical locations and the mock locations of the table 1721 according to the initial physical location, the initial mock location, the incremental length, and the mock locations in the images. Because the initial physical location and the incremental length are locations where the console 1812 causes the table 1721 to move by sending instruction(s) to the imaging device 1700, the console 1812 can recognize the initial physical location of the table 1721 and each physical location. In some embodiments, the console 1812 may set the initial physical location as the zero point, and use a product of the incremental length and the number (or count) of times of movement as the current physical location. On the other hand, in the aforementioned operation(s), the console 1812 can obtain an initial mock location and other mock locations. Therefore, the console can determine the mapping relation between the physical locations of the table 1721 in the movement range and the mock locations of the table 1721 in the images according to the illustrated information.

The calibration system and calibration method of the imaging device provided in this embodiment can determine the mapping relation between the physical locations and the mock locations of the table based on the initial image of the table captured in the initial physical location and the images captured at other physical locations. The calibration process is simple, fast and has high precision. Therefore, the calibration system and calibration method of the imaging device provided in this embodiment can ensure the object to be scanned can be detected by the gantry.

In addition, because the above embodiment implements the calibration of the imaging device and obtains the mapping relation between the physical locations and the mock locations of the table, if the operator wishes to scan a target region of the object, the object may be placed on the table, and the operator may only need to input information relating to the target region (e.g., mark or select the target region in an image captured by the capture device). The console 1812 can obtain the physical location of the table based on the input information, the mapping relation between the physical locations and the mock locations obtained in the calibration process, and may further control the imaging device 1700 to scan the selected target region of the object. Therefore, the calibration system of the present embodiment or the imaging device using the calibration method of the present embodiment can be used to make the positioning process more efficient.

In some embodiments, after the calibration process is completed, medical imaging can be performed according to the following operations.

An image may be captured by the capture device 1811. The image may be captured by the capture device 1811 and may illustrate the table 1721 carrying the object.

A target scan region to be scanned may be obtained. The target scan region may include the object's target region to be scanned. The scan region can be obtained by a doctor. The doctor may select or mark a frame on the image, and the console 1812 may obtain the target scan region based on the frame.

After the image and the target scan region are obtained, the mapping relation can be used to determine the physical location corresponding to the target scan region in the image. The table 1721 may be controlled to move to the target position according to the physical location, thereby implementing scanning of the target region to obtain a medical image.

It should be noted that the calibration method of the calibration system of the imaging device mentioned in the foregoing embodiment is described as being implemented on the calibration system of the imaging device shown in FIGS. 19 and 20, but this method can also be implemented on other calibration systems.

Further, although an embodiment of the calibration system and the calibration method for the imaging device of the present disclosure is as described above, but in other embodiments of the present disclosure, the calibration system and calibration method for the imaging device may have more details with respect to the above embodiments, and there can be a variety of variations in at least some of these details. For example, the specific value of the incremental length can be set according to the actual situation. If the operator wants a higher precision of the physical locations of the table and the mock locations in the image(s), the incremental length may be preset as 5 mm or 10 mm. On the other hand, if the operator wants the calibration to be faster, for example, when performing a routine calibration process every time the imaging device 1700 is turned on to verify whether the mapping relation between the physical locations of the table and the mock locations are still applicable, then the incremental length can be set as 15 mm or 20 mm, or more. At least some of these variations are described below.

As described in the above embodiments, the initial physical location can be varied. Correspondingly, in the operations of moving the table 1721 to a plurality of physical locations, the directions and manners of moving the table 1721 can also be varied. For example, in some embodiments, the table 1721 can move two-dimensionally within the horizontal plane, and accordingly, the table 1721 needs to be moved multiple times in two directions at the same or different incremental lengths. In some embodiments, in FIG. 19, the initial physical location may be the location closest to the gantry 1722 within the movement range of the table 1721, and the table 1721 may be only one-dimensionally movable within the horizontal plane. In this case, in the operations of moving the table 1721 to a plurality of physical locations, the table 1721 may be moved from the initial physical location away from the gantry 1722. In other embodiments, the initial physical location is the location furthest from the gantry 1722 within the movement range of the table 1721. In this case, the table 1721 may be moved towards the gantry 1722.

In addition to the initial physical location, the determination of the initial physical location can also be varied. For example, in some embodiments, the table 1721 may be moved to the location closest to the gantry 1722, and the location may be determined as the initial physical location. In FIG. 19, in some embodiments, the imaging device may further include an alignment module 1723. The initial physical location may be the location determined by the alignment module. That is, the aforementioned operations of "moving the table to the initial physical location" may further include the following operations.

In operation A, the table 1721 may be moved to a preset location. The preset location may be a location close to a location determined by the alignment module. In FIG. 19, the preset location may be the location where the table 1721 is closest to the gantry 1722.

In operation B, the alignment module 1723 may be activated. In the current embodiment, the alignment module 1723 may be a laser source that is positioned on the gantry 1722 and capable of emitting laser to the table 1721.

Figure 22:
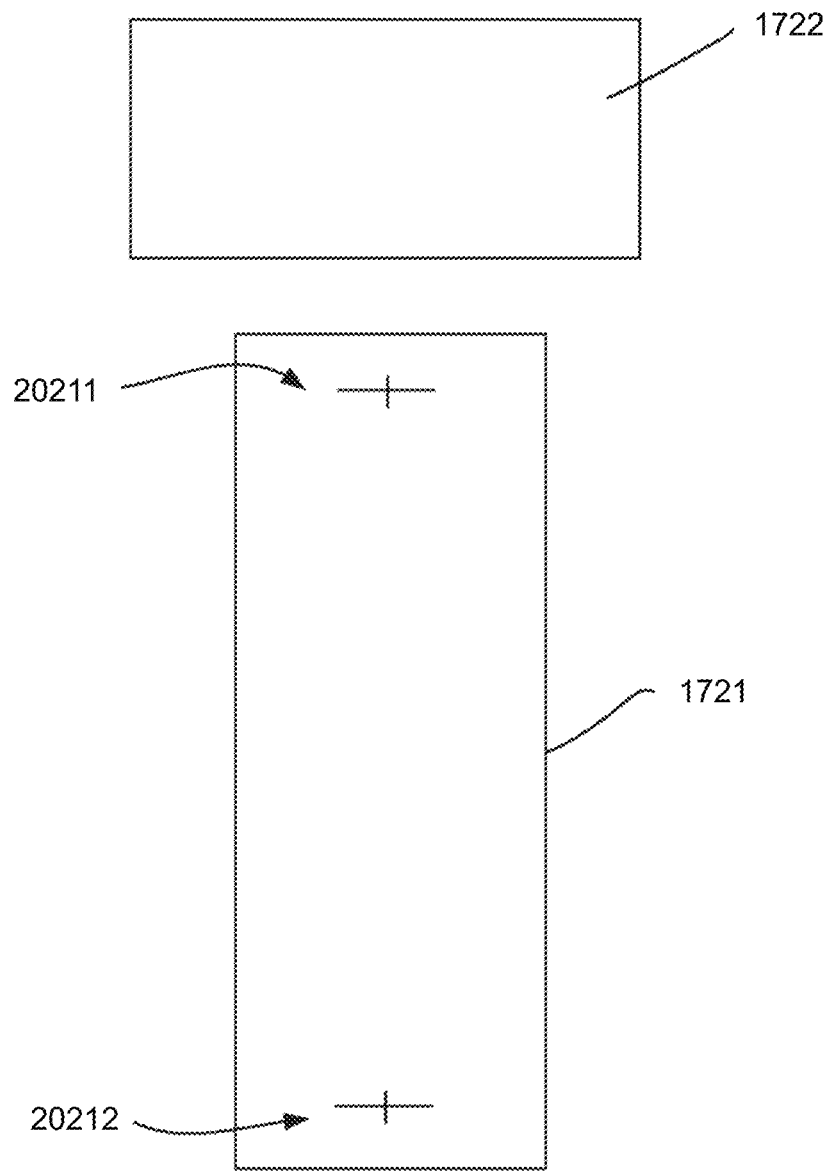
FIG. 22 is a top view of an exemplary imaging device adapted to the calibration system according to some embodiments of the present disclosure.

In operation C, the table 1721 may be moved to the initial physical location determined by the alignment module 1723 according to the alignment result of the alignment module 1723. In FIGS. 19 and 22, in the current embodiment, there is a marker 20211 on the table 1721. After the alignment module 1723 is activated, the laser will form a spot on the table 1721. The table 1721 may be moved manually or automatically so that the spot is coincident with the marker 20211. When the spot is coincident with the marker 20211, the table 1721 is considered to be in the initial physical location.

In FIGS. 19 and 20, in some embodiments, the capture device 1811 can use the same shooting parameters to shoot when taking the initial image and the other images. Such an arrangement can make it unnecessary to consider the influence of the shooting parameters in the determination of the mapping relation between the physical locations of the table 1721 and the mock locations in the images over the entire movement range.

In some embodiments, an initial image and other images can be taken using a capture device 1811 mounted above the imaging device 1700. Further, in order to enable the capture device 1811 to maintain the shooting parameters while capturing the initial image and the other images, the capture device 1811 can always capture all regions that the table 1721 can reach. In other words, both the initial image and the other images may include all regions reachable by the table 1721.

The operations of determining the initial mock location in the initial image and the other mock locations in the other images can be varied. In some embodiments, the table 1721 may have one or more specially made markers. FIG. 22 is a top view of an exemplary imaging device adapted to the calibration system according to some embodiments of the present disclosure. In FIG. 22, in some embodiments, the upper surface of the table 1721 may have two markers. The two markers may include cross markers 20211 and 20212. In another embodiment, the location of the contour or the corner of the table 1721 may be used as the initial mock location in the initial image and the mock locations in the other images. In another embodiment, the marker may be a horizontal line perpendicular to the longitudinal direction of the table 1721. The above examples are just examples of markers. The plurality of markers can be the same or different. For example, in some embodiments, the upper surface of the table 1721 may have two markers. One of the markers may be a cross marker, and the other marker may be a horizontal line perpendicular to the longitudinal direction of the table 1721. That is, the marker can be an image tag feature, such as a cross marker, a bar marker, or the like. The marker can also be a feature conforming to a shape (e.g., the feature being an outline of a shape), such as a specific shape of the edge of the table, a headrest of the table, or the like.

On the other hand, the size of the marker can also be varied. In the foregoing example, the size of the cross marker or the horizontal line may be smaller compared to the size of the table 1721. In some other embodiments, the size of the marker may be similar or identical to the size of the table 1721.

In order to increase the probability that the cross marker is accurately recognized, the color of the table 1721 and the two cross markers 20211, 20212 may be set to have a large chromatic aberration. For example, the color of the upper surface of the table 1721 can be set to black and the colors of the two cross markers 20211, 20212 can be set to white. Of course, in this case, the bed cover and other things on the table 1721 may be removed. On the other hand, in order to have at least one cross marker in the image when the table 1721 is in any location, the two cross markers 20211, 20212 may be respectively positioned at both ends of the table 1721. It should be noted that the "ends" here may refer to regions at both ends of the table 1721, rather than the two end lines of the table. As shown in FIG. 22, the manner in which the cross markers 20211, 20212 are respectively adjacent to the ends of the table 1721 may also be understood as "located at both ends of the table 1721."

In the current embodiment, at least one of the markers is included in the initial image and the other images. In other words, in a part of the initial image and the other images, for example, when the table 1721 is in the location shown in FIG. 19, the cross marker 20211 may be blocked by the gantry 1722, and the image may only illustrate the cross marker 20212. In the state shown in FIGS. 20 and 22, the image can illustrate two cross markers 20211, 20212 at the same time. Because the relative locations of the cross markers 20211, 20212 and the table 1721 are fixed, the location of the marker in the initial image can be used as the initial mock location, and the location of the marker in the other images can be used as the mock locations.

The manner in which the location of the marker in the initial image and the location of the marker in the other images are obtained may be varied. In FIGS. 19 and 20, in some embodiments, the console 1812 may have a display unit and an input unit. Therefore, when the console 1812 obtains the initial image and the other images from the capture device 1811, the images can be displayed by the display unit. The operator can identify the location of the marker in these images through the display unit, and input by means of an input unit such as a mouse, a touch screen, a keyboard, or the like, by clicking, touching, or the like. The console 1812 can determine the location of the marker in the initial image and the location of the marker in the other images based on the user input.

The display unit and input unit can also have more functions. In some embodiments, the functions of the display unit and the input unit may include one or more of the following functions.

Before moving the table 1721 to the physical locations, the display unit may display information relating to moving the table, so that the user knows that the movement of the table 1721 can be started. The input unit may receive the movement instruction. The instruction(s) may be used by the user to control the imaging device and move the table 1721 to the physical locations. In other words, in the operation of moving the table to a plurality of physical locations, the imaging device may move the table 1721 to a plurality of physical locations according to the moving instruction(s).

After the initial image is displayed by the display unit, the initial image and information may be displayed by the display unit, so that the user knows that the location of the marker in the initial image need to be input at this time. When the user makes an input, the location of the marker in the initial image may be received by the input unit. Similarly, after the image(s) are displayed by the display unit, the other images and the information may be displayed by the display unit, and the location(s) of the marker in the image(s) may be received by the input unit when the user inputs the information relating to the mock locations. In addition, after obtaining the mapping relation between the physical locations of the table and the mock locations in the images, the display unit may also display information indicating that the calibration process is successfully performed.

In some embodiments, the console 1812 may include an image recognition module (also referred as an image processing module). The image recognition module can be dedicated hardware or a software module suitable for running on a general purpose processor. After the console 1812 obtains the initial image and the other images from the capture device 1811, the mock location of the marker in the initial image and the mock locations of the marker in the other images can be determined by the image recognition module. For example, the console 1812 may store a template of a marker and software capable of running a template matching algorithm. After obtaining the initial image and the other images, the console 1812 may run the template matching algorithm on the initial image and the other images based on the template of the marker, and automatically recognize the mock location of the marker in the initial image and the mock locations of the marker in the other images. Of course, the template matching algorithm is only an example of an optional method for "automatically identifying the mock location of the marker in the initial image and the mock locations of the marker in the other image." In other examples, the identification of the mock locations of the marker can also be implemented in other ways. For example, in some embodiments, a trained neural network may be used to implement this process of automatic identification.

In addition to the method in the example used to obtain the locations of the marker manually and/or automatically, in some embodiments, the operations for obtaining the mock locations of the marker can also be manually and automatically performed. Specifically, in some embodiments, a vicinity of the first marker may be manually input, for example, a white strip marker (referred to as the first white strip), and then according to this input, the white bar center ROI (2winx, 2winy) may be automatically determined, wherein the ROI may represent the region of interest corresponding to the white bar. For example, a maximum gradient algorithm may be used to automatically obtain the exact location of the center of the white bar, and then the ROI image of the white bar may be extracted as a template. For the second marker under the default height (referred to as the second white bar), according to the distance between the second white bar and the first white bar, the ROI may be automatically moved to the vicinity of the second white bar, and then the precise location of the second white bar may be found.

The specific manner of determining the mapping relation between the physical locations and the mock locations of the table according to the initial physical location, initial mock location, incremental length, and other mock locations can be varied. For example, in some embodiments, the lookup table of physical locations and the mock locations of the table 1721 may be first determined based on the initial physical location, initial mock location, incremental length, and other mock locations. The lookup table may include the mapping relation between the physical locations in a plurality of discrete points and the corresponding mock locations of the table 1721. Then a curve illustrating the mapping relation between the physical locations and the mock locations of the table 1721 may be obtained.

The specific method in which the curve illustrating the mapping relation between the physical locations and the mock locations of the table 1721 is obtained may be diverse. In some embodiments, the mapping relation between various physical locations and mock locations of the table may be obtained based on the lookup table. In another embodiment, interpolation (e.g., preserved spline interpolation) may be performed, and the mapping relation between various physical locations of the table and the mock locations are obtained. In addition, other methods can be used to obtain the mapping relation. For example, a plurality of discrete points can be simply connected in a straight line to form the mapping relation between physical locations of the table 1721 and mock locations.

Figure 23:
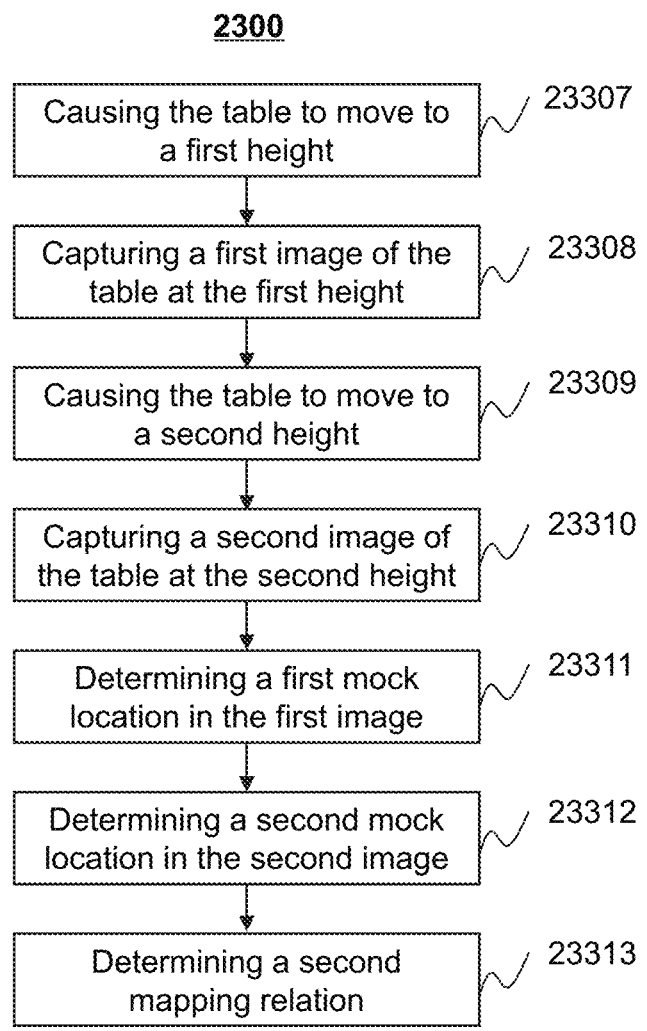
FIG. 23 is a flowchart illustrating an exemplary process for calibrating a table of an imaging device according to some embodiments of the present disclosure.

Although in the foregoing example, the calibration process of the imaging device ends after determining the mapping relation between the physical locations of the table and the mock locations, in some embodiments, the calibration process of the imaging device may also include other operation(s). FIG. 23 is a flowchart illustrating an exemplary process for calibrating a table of an imaging device according to some embodiments of the present disclosure. In the process 2300 illustrated in FIG. 23, some operations of the calibration system and the calibration method of the imaging device are described in some embodiments. In this embodiment, the operations 21301 through 21306 may be the same as the operations illustrated in any of the foregoing embodiments, and thus will not be described herein. The table 1721 may be moved in the horizontal direction in the operation of moving the table 1721 to a plurality of physical locations at an incremental length.

In 23307, the table 1721 may be moved to a preset first physical height. This operation can be implemented in the manner that the console sends movement instruction(s) to the imaging device 1700. The first physical height here may be the current height of the table 1721 when the table 1721 is moved horizontally. Therefore, in this operation, the height of the table 1721 may be maintained, which can also be understood as the table 1721 "moving" to the preset first physical height.

In 23308, a first height image of the table 1721 at the first physical height may be taken. Similarly, if the height of the table 1721 is not changed in the aforementioned operation, then the corresponding initial image or another image may be used as the first height image. Because the initial image and the other images are taken by the capture device 1811, the use of the corresponding initial image or another image may also be understood as the first height image of the table 1721 is "captured" at the first physical height.

In 23309, the table may be moved vertically to a preset second physical height. In this operation, the location of the table 1721 in the horizontal direction can be maintained.

In 23310, a second height image of the table 1721 may be captured at a second physical height different from the first physical height. Theoretically, the first physical height and the second physical height may be different, but generally, in order to obtain a better effect, the first physical height and the second physical height may be set to have a large height difference. For example, the first physical height and the second physical height may be respectively set as the highest and lowest heights that the table 1721 can reach.

In 23311, a first mock location of the table 1721 in the first height image may be determined. The specific implementation ways of this operation may be the same as or different from the obtaining of the initial mock location and the other mock locations.

In 23312, a second mock location of the table 1721 in the second height image may be determined. Similarly, the specific implementation ways of this operation may be the same or different from the obtaining of the initial mock location and the other mock locations In 23313, a second mapping relation between the physical heights and the mock locations of the table may be determined according to the first physical height, the second physical height, the first mock location, and the second mock location.

It should be noted that the operations 23307 through 23313 are described as having a larger serial number than the operations 21301 through 21306, but it does not mean that operations 23307 through 23313 must be implemented after operations 21301 through 21306 are performed, and does not mean that it must be implemented in the order from operation 23307 to operation 23313. For example, in an embodiment, operations 23307 through 23310 may be implemented before operation 21306, operation 21305, or even before operation 21304.

On the other hand, although in the above operations the table 1721 is only moved to two heights for image capturing, in some other embodiments, the table can be moved to multiple heights to take more images. The mock locations obtained from the images captured at multiple heights may be used in obtaining the second mapping relation between the physical heights the mock locations of the table.

Similar to the initial mock location, other mock locations, the ways for obtaining the first mock location of the table 1721 in the first height image and obtaining the second mock location of the table 1721 in the second height image may be diverse. For example, the location of the marker on the surface of the table may be taken as the first mock location and the second mock location.

As illustrated in FIG. 20, in some embodiments, the upper surface of the table may have two markers. When the first height image is taken, the table 1721 may be moved first so that the first marker 20211 is located at the center of the shooting range (as indicated by the dash-dotted line 20112) of the capture device 1811. Similarly, when the second height image is taken, the table 1721 may also be moved first so that the first marker 20211 is located at the center of the shooting range of the capture device 1811 (as indicated by the dash-dotted line 20112). Of course, if the horizontal location is kept unchanged during the movement of the table 1721 from the first height to the second height, then, when the second height image is taken, the first marker 20211 is naturally located at the center of the shooting range of the capture device 1811. Such an arrangement enables only one mock location of one marker to represent the first mock location or the second mock location. The relatively small amount of data may make the subsequent processing faster.

After obtaining the second mapping relation between the physical heights and the mock locations of the table according to the first physical height, the second physical height, the first mock location, and the second mock location, the second mapping relation can be used to correct the mapping relation between the physical locations and the mock locations of the table 1721 at different heights. In some embodiments, when the imaging device 1700 is running, the mapping relation between the physical locations and the mock locations of the table may be corrected according to the height of the table 1721 and the second mapping relation, so that at any height, the mock locations may correspond to the physical locations of the table 1721.

An exemplary method for correcting the mapping relation between the physical locations and the mock locations of the table according to the height of the table and the second mapping relation is described below. After obtaining the mapping relation between the physical locations and the mock locations of the table, a first marker may remain at the center of the shooting range (i.e., at the center of the image), and the location u of the second marker at different table heights (hereinafter referred to as the object distance) may be recorded.

According to the lens imaging principles, a relationship between the object distance, the image distance, and the focal length may be determined according to the following equation:

$$\frac{1}{u}+\frac{1}{v}=\frac{1}{f}. \qquad (4)$$

where u, v, and f are the object distance, the image distance, and the focal length, respectively. If the lens of the capture device 1811 is parallel to the plane of the table, the relationship between the object distance and the height h of the table may be determined according to the following equation:

$$u_h = H - h, \qquad (5)$$

where H represents a distance from the plane of the lens of the capture device 1811 to the ground. Assuming that the focal distance remains unchanged, a coefficient $m_h$ may be determined according to the following equation:

$$m_h = \frac{v_h}{u_h} = \frac{f}{u_h - f} = \frac{f}{H - h - f}. \quad (6)$$

A physical coordinate system associated with the physical locations of the table and an image coordinate system associated with the mock locations in an image may be established (e.g., as described in connection with FIG. 10). The location of the second marker in the physical coordinate system may be determined as (z, h), and the location of the second marker in the image coordinate system may be determined as U(z, h). When the second marker in the normal line of the camera (i.e., the second marker is positioned at the center of the shooting range of the camera), the couch code may be described as $Z_{law}$. At the couch code $Z_{law}$, the mock location of the second marker in the image coordinate system may be a fixed pixel position $U_{law}$ even if the table height is changed. A relation between the pixel coordinate of the second marker U(z, h) and the physical position (z, h) may be determined based on Equation (6):

$$m_h = \frac{k(U - U_{law})}{(z - Z_{law})} = \frac{f}{H - h - f}, \quad (7)$$

where k represents an actual size of each location (each pixel) in the image coordinate system. Parameters such as f and k may be obtained from the camera supplier, or may be measured, or the like. In some embodiments, Equation (8) may be further determined based on Equation (7):

$$z = k(U - U_{law})\frac{H - h - f}{f} + Z_{law}. \quad (8)$$

Parameters such as H, $Z_{law}$, $U_{law}$, f, and k may be obtained using a fitting technique (such as a least squares fitting technique) based on a plurality of mock locations U(z, h) of the second marker in the image coordinate system and a plurality of physical locations (z, h) of the second marker in the physical coordinate system.

After obtaining the above mentioned parameters, as long as the height h and the mock location in the image U(z, h) is obtained (e.g., selected, clicked by an operator), the physical location z may be determined. In some embodiments, a distance L(z, h) from the physical location to the target position $Z_{ref}$ (e.g., the isocenter of the imaging device) may be determined according to the following equation:

$$L = z - Z_{ref} = k(U - U_{law})\frac{H - h - f}{f} + Z_{law} - Z_{ref}. \quad (9)$$

Of course, the above method for correcting the mapping relation between the physical locations and the mock locations of the table according to the height of the table and the second mapping relation is only exemplary. In some other embodiments, the correction of the mapping relation between the physical locations and the mock locations of the table according to the height of the table and the second mapping relation may be accomplished in other ways. For example, the mapping relations at various heights may be determined based on a first mapping relation that is calibrated precisely at a certain height. If the height of the table at which the first mapping relation is $h_0$, and the physical location of the second marker remains at z, then the mapping relation between the mock locations in the image U(z, h) at different heights may be calculated as follows:

$$U(h, z) = \frac{H - h_0 - f}{H - h - f}[U(h_0, z) - U_{law}] + \frac{U_{law}}{k}. \quad (10)$$

According to the above equation(s), the pixel coordinates at other table heights at the same couch code may be corrected based on the lookup table that is already calibrated at the table height $h_0$, and then the mapping relations at various table heights may be determined.

Figure 24:
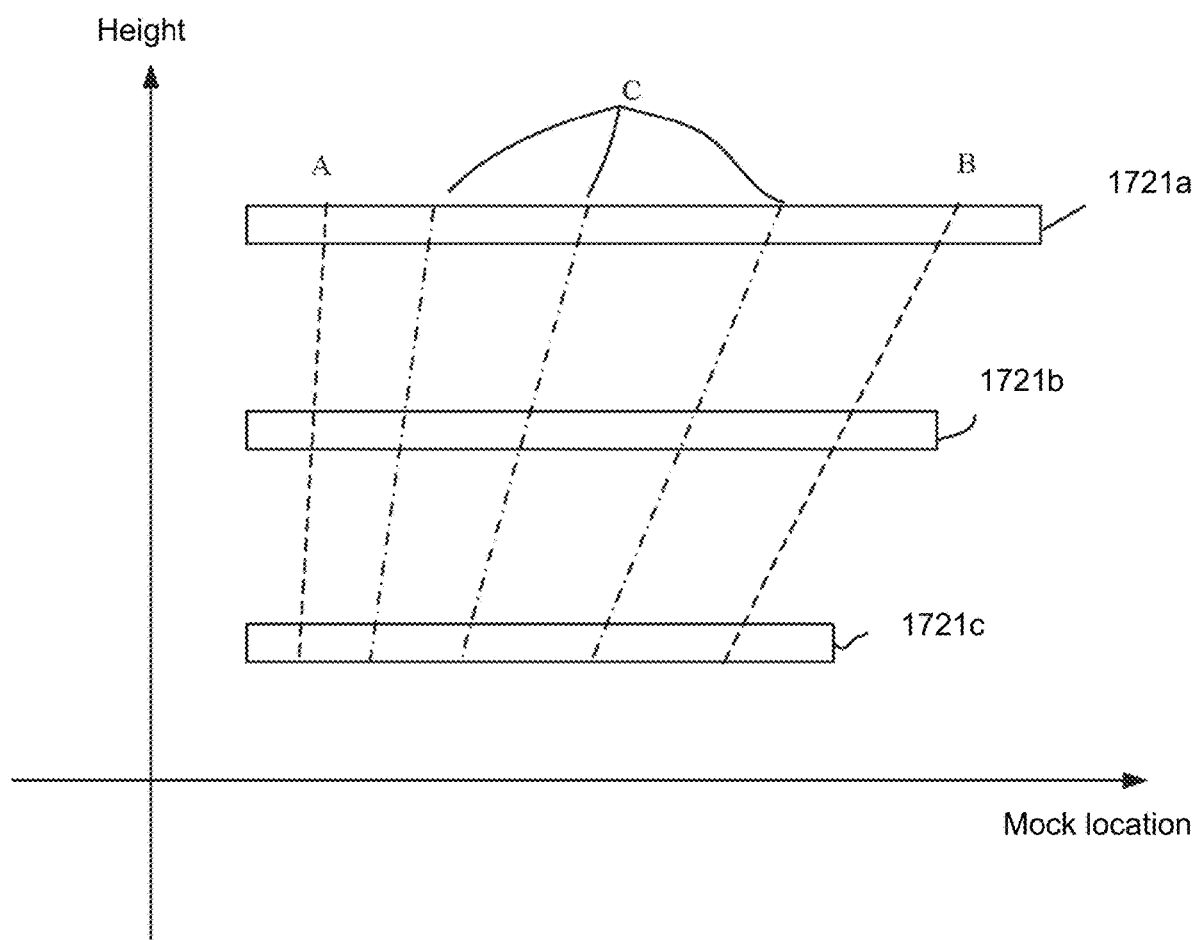
FIG. 24 is a schematic diagram illustrating an exemplary process for calibrating a mapping relation between mock locations and physical locations of the table at different heights according to some embodiments of the present disclosure.

FIG. 24 is a schematic diagram illustrating an exemplary process for calibrating a mapping relation between mock locations and physical locations of the table at different heights according to some embodiments of the present disclosure.

A method for establishing a correction relationship at different table heights in another embodiment may be described below with reference to FIG. 24. In this embodiment, the same operations as in the foregoing embodiments will not be described again. When the table 1721 is moved to different heights, all table heights may be traversed at an incremental height, and a height image may be taken for the table 1721 at each table height. Only three heights of the table 1721 are shown in FIG. 24, labeled with 1721a, 1721b, and 1721c, respectively, for illustration purposes. The different sizes of the three tables 1721a, 1721b, and 1721c do not mean that the actual size of the table 1721 is changed during the moving process, and may illustrate the display effect of the table in the images captured at different heights. The sizes of the table 1721 in different height images may change with the heights.

After obtaining the height images of the table 1721 at a plurality of heights, because the physical height of the table 1721 is known when each height image is taken, the location of the marker in each height image may also be determined. Two mapping relation curves between the table heights and the mock locations shown by the dashed lines A and B in FIG. 24 can be obtained. Of course, if there are other markers on the table 1721, more mapping relation curves can be obtained.

After obtaining the mapping relation curve(s), the slopes of a plurality of straight lines can be obtained by using shape-preserving spline interpolation, and then the slopes and the horizontal pixel corresponding to the default couch code may form a straight line relating to the horizontal pixels and the heights, as shown by the plurality of dash-dotted lines C in FIG. 24. The straight line function of the dash-dotted lines may be determined as the calibrated mapping relation at different table heights. To determine the physical location corresponding to a certain mock location at a certain table height, the table height and the mock location can be substituted into a corresponding straight line function, and the physical location corresponding to the mock location can be obtained. The present disclosure is disclosed as the above embodiments, but it is not intended to limit the disclosure, and any change and modification may be made by those skilled in the art without departing from the spirit and scope of the disclosure. Therefore, any modifications, equivalent changes, and modifications of the above-described embodiments may be made without departing from the scope of the present disclosure.

Figure 25:
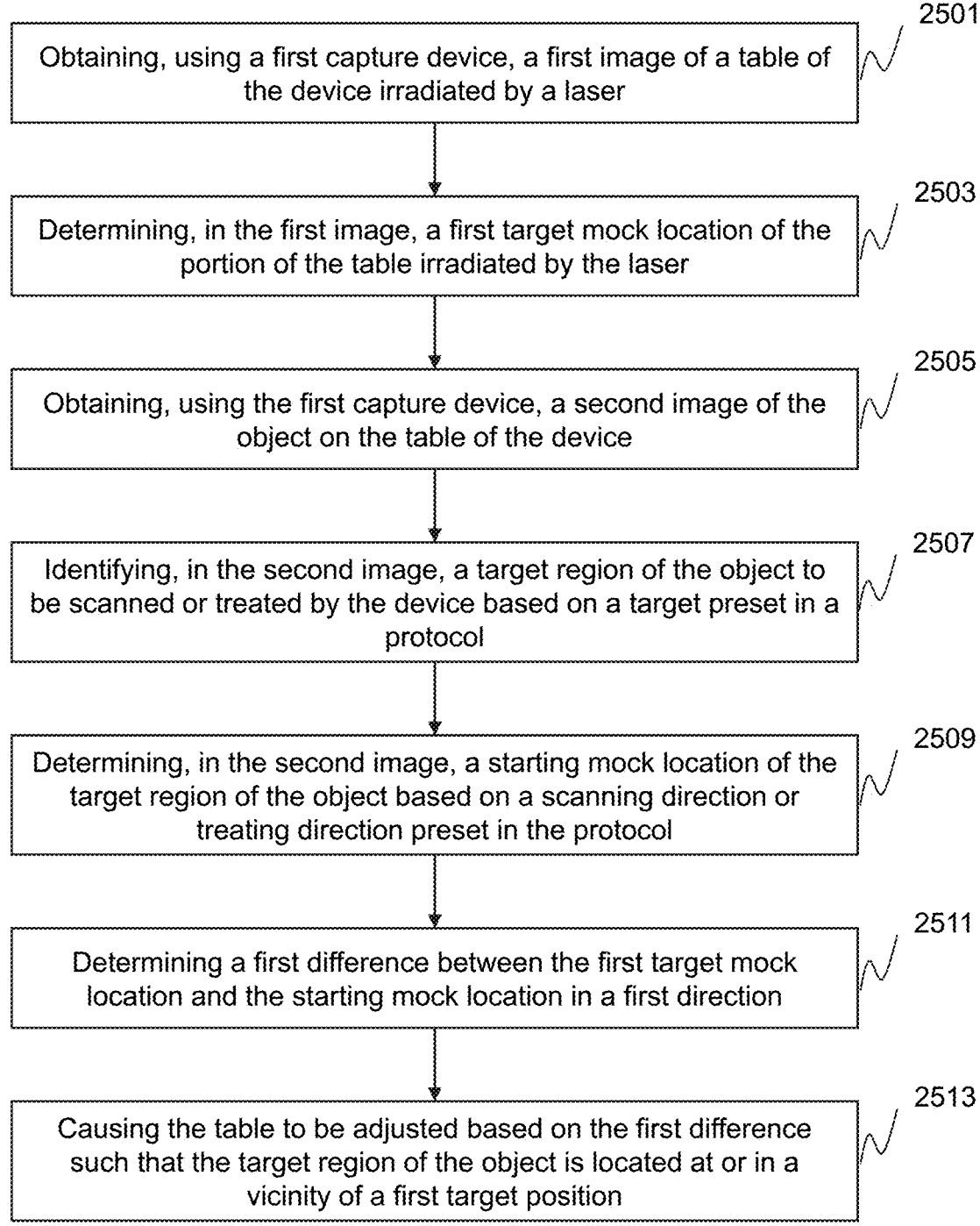
FIG. 25 is a flowchart illustrating an exemplary process for positioning an object in a device according to some embodiments of the present disclosure.

FIG. 25 is a flowchart illustrating an exemplary process for positioning an object in a device (e.g., the apparatus 110) according to some embodiments of the present disclosure. In some embodiments, a first target mock location in a first image of a table of the device may be determined. And a target region of the object may be identified in a second image. The processing device 140 may cause the table to be adjusted based on a difference between the first target mock location and the target region. In some embodiments, one or more operations of process 2500 illustrated in FIG. 25 may be performed by the processing device 140. In some embodiments, one or more operations of process 2500 may be implemented in the system 100 illustrated in FIG. 1. For example, the process 2500 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 2, or the like). The operations of the illustrated process presented below are intended to be illustrative. In some embodiments, the process 2500 may be accomplished with one or more additional operations not described, and/or without one or more of the operations discussed. Additionally, the order in which the operations of the process 2500 as illustrated in FIG. 25 and described below is not intended to be limiting.

In 2501, the processing device 140 (e.g., the acquisition module 440) may obtain a first image of a table (e.g., the table 115, the table 30201) of the apparatus 110. In some embodiments, the first image of the table may be captured using a first capture device (e.g., the capture device 160, the capture device 30101) if the table is positioned at a first position in which a portion of the table is irradiated by laser. The laser may be emitted from a laser source mounted on the apparatus 110. In some embodiments, the capturing control unit 520 may control the first capture device to capture the first image of the table, and the first image may be transmitted to or acquired by the acquisition module 440.

The first capture device may be configured to acquire image(s). In some embodiments, the first capture device may include a stereo camera, a digital camera, an infrared camera, or the like, or any combination thereof. More descriptions of the capture device may be found elsewhere in the present disclosure (e.g., FIG. 1 and descriptions thereof). In some embodiments, the first capture device may be fixed above the table. For example, the first capture device may be fixed above the table to obtain image(s) illustrating a top view of the table and/or substances (e.g., an object) positioned on the table.

In some embodiments, before the first image is captured, the table of the apparatus 110 may be positioned at the first position such that a portion of the table is irradiated by the laser. In some embodiments, the first position may be any position in which a portion of the table may be irradiated by the laser. In some embodiments, the first position may be in the detection region 117 of the apparatus 110. In some embodiments, the first capture device may be an infrared camera, so that even if the portion of the table irradiated by the laser is shielded by a portion of the apparatus 110 (e.g., the gantry 116), the portion of the table irradiated by the laser can be captured by the first capture device. In some embodiments, the first image may be an infrared image. In some embodiments, the first image may include one or more elements (e.g., pixels) representing a light spot of the laser irradiated on the portion of the table. In some embodiments, the elements representing the light spot of the laser may have relatively high thermal radiation, and accordingly, the elements can be recognized in the first image based on the thermal radiation characteristics. The light spot may have various shapes (e.g., a dot, a line, a cross, an X, etc.).

In some embodiments, the first capture device may transmit the first image to the computing device 200, the storage device 150 and/or the terminal 130 via the network 120. For example, the first capture device may transmit the first image to an interface of the terminal 130 to display the first image.

In 2503, the processing device 140 (e.g., the image processing module 430) may determine a first target mock location of the portion of the table irradiated by the laser.

In some embodiments, the first target mock location of the portion of the table may be determined based on a position of the elements representing the light spot of the laser in the first image. In some embodiments, the light spot of the laser in the first image may be pixel-precise or subpixel-precise. The position (e.g., pixel coordinate) of the elements representing the light sport of the laser may refer to a center position of the elements, a boundary position of the elements, or the like, in the first image. Merely for the purpose of illustration, the light spot of the laser may have a shape of a line, the position of the light spot of the laser in the first image may be a position of a center (e.g., a center of gravity, a center in geometry) of the line. In some embodiments, the position of the light spot of the laser in the first image may be determined as the first target mock location of the portion of the table irradiated by the laser.

In some embodiments, the first target mock location of the portion of the table may be determined manually by a user of the terminal 130 (e.g., a doctor or an operator), or automatically by the processing device 140, or semi-automatically by the user of the terminal 130 and the processing device 140. For example, the first image may be displayed in an interface of the terminal 130, and the user of the terminal 130 may mark or select the first target mock location via the I/O 350. As another example, the processing device 140 may determine the first target mock location according to one or more algorithms (e.g., a model, or an artificial intelligence (AI) algorithm, or the like, or any combination thereof). In some embodiments, the processing device 140 may segment the light spot of the laser from the first image, and determine the first target mock location based on the elements representing the light spot. In some embodiments, the user of the terminal 130 may determine a rough location of the light spot of the laser in the first image via the I/O 350, and the processing device 140 may determine a precise location of the light spot of the laser in the first image as the first target mock location based on the rough location.

In 2505, the processing device 140 (e.g., the acquisition module 440) may obtain a second image of the object on the table (e.g., the table 115, the table 30201) of the device. In some embodiments, the second image may be captured using the first capture device (e.g., the capture device 160, the capture device 30101) if the table is positioned at a second position. In some embodiments, the second position may be different from the first position. In some embodiments, before the second image is captured, the processing device 140 (e.g., the control module 420 (e.g., the table control unit 510)) may cause or control the table to move (e.g., from the first position) to the second position. In some embodiments, the second position may be any position in which the object can be conveniently positioned on the table. In some embodiments, the second position may be outside of the detection region 117 of the apparatus 110. In some embodiments, if the object is positioned on the table, the capturing control unit 520 may control the first capture device to capture the second image of the object, and the second image may be transmitted to or acquired by the acquisition module 440. In some embodiments, because the first capture device is fixed above the table, the second image may illustrate a top view of the object. In some embodiments, the second image may include elements representing at least a portion of the object and/or elements representing a portion of the table. In some embodiments, the second image may be an infrared image, and internal organs of the object may have different distribution characteristics of thermal radiation in the second image.

In 2507, the processing device 140 (e.g., the image processing module 430) may identify a target region of the object to be scanned or treated by the device in the second image based on a target preset in a protocol.

In some embodiments, the target region of the object may refer to a region of the object that needs (or is planned) to be scanned or treated by the apparatus 110. In some embodiments, the target region of the object may include a cell mass, a tissue, an organ (e.g., a prostate, a lung, a brain, a spine, a liver, a pancreas, a breast, etc.), or a combination thereof. In some embodiments, the target region of the object may include a tumor, an organ with a tumor, or a tissue with a tumor. In some embodiments, the target preset in the protocol may include an image of the target region, word(s) indicating the target region, a model associated with the target region, or the like, or any combination thereof. More descriptions of the regions of the object may be found elsewhere in the present disclosure (e.g., FIGS. 31A-31C and the descriptions thereof). In some embodiments, the processing device 140 may identify the target region of the object in the second image based on the distribution characteristics of thermal radiation of the object in the second image. In some embodiments, the processing device 140 may identify the target region of the object in the second image according to one or more image recognition algorithms (e.g., a pattern recognition algorithm, an image match algorithm, an AI algorithm, or the like, a template matching algorithm, a target tracking algorithm, a neural network model, a machine learning algorithm, or any combination thereof). Merely by way of example, the protocol may indicate that a lung nodule is to be imaged or treated, the target region of the object may include the lungs of the object, and then the processing device 140 may identify the lung region in the second image based on the distribution characteristics of lung thermal radiation and corresponding algorithm(s). In some embodiments, the processing device 140 may mark and display an identification box surrounding the target region of the object. In some embodiments, the user may adjust or edit the identification box through the user interface of the terminal 130 to modify the identified target region of the object.

In some embodiments, the protocol may include information relating to a posture of the object, a scanning direction or treating direction of the object, a region of the object to be scanned or treated, or the like, or any combination thereof. The posture of the object on the table may include a head first-prone position, a head first-supine position, a head first-decubitus right position, a head first-decubitus left position, a feet first-decubitus right position, a feet first-decubitus left position, a feet first-prone position, a feet first-supine position, etc. The region of the object to be scanned or treated may include head, breast, abdomen, buttock, shoulder, or the like. The scanning direction or treating direction of the object may include a direction from the head to the feet, a direction from the feet to the head, or the like. In some embodiments, the protocol may be determined by the system 100 or preset by a user or operator via the terminal(s) 130. In some embodiments, the acquisition module 440 may acquire the protocol from the storage device 150, the terminal 130, and/or an external data source (not shown).

In 2509, the processing device 140 (e.g., the image processing module 430) may determine a starting mock location of the target region of the object in the second image based on a scanning direction or a treating direction preset in the protocol.

In some embodiments, the starting mock location of the target region of the object may refer to the position (in the second image) of an element representing a starting position of the target region of the object to be scanned or treated along the scanning or treating direction preset in the protocol. In some embodiment, the starting mock location may be a starting mock location alone a horizontal direction (e.g., the Z-axis or X-axis direction illustrated in FIG. 1). In some embodiments, the starting mock location may be a starting mock location alone a vertical direction (e.g., the Y-axis direction illustrated in FIG. 1). In different scanning or treating directions, the starting mock location may be different. Merely by way of example, if the head of the object is to be scanned or treated, the target region (i.e., the head) may range from the crown of the head to the lower jaw. If the scanning or treating direction is preset (in the protocol) as from the head to the feet, the starting mock location may be the position of the crown in the second image; if the scanning or the treating direction is preset (in the protocol) as from the feet to the head, the first mock location may be the position of the lower jaw in the second image.

In some embodiments, the starting mock location in the second image may be determined manually by a user of the terminal 130 (e.g., a doctor or an operator), or automatically by the processing device 140, or semi-automatically by the user of the terminal 130 and the processing device 140. For example, the first capture device may transmit the second image to an interface of the terminal 130. The user of the terminal 130 may select or mark the starting mock location via the I/O 350, and then the processing device 140 may obtain the starting mock location. As another example, the processing device 140 may determine the starting mock location according to one or more image recognition algorithms illustrated in the present disclosure. As a further example, the user of the terminal 130 may determine a rough location of the starting mock location in the second image via the I/O 350, and the processing device 140 may determine a precise mock location as the starting mock location of the target region of the object based on the rough location. More descriptions of the starting mock location of the target region of the object may be found elsewhere in the present disclosure (e.g., FIGS. 30A and 30B, and descriptions thereof).

In 2511, the processing device 140 (e.g., the image processing module 430) may determine a first difference between the first target mock location and the starting mock location in a first direction.

In some embodiments, the first direction may include a direction along a long axial of the table (i.e., the Z-axis direction illustrated in FIG. 1), a direction along a short axial of the table (i.e., the X-axis direction illustrated in FIG. 1), a direction perpendicular to the table (i.e., the Y-axis direction illustrated in FIG. 1), or the like. In some embodiments, the difference between the first target mock location and the starting mock location may be denoted by the number (or count) of pixels.

In 2513, the processing device 140 (e.g., the control module 420 (e.g., the table control unit 510)) may cause the table to be adjusted based on the first difference such that the target region of the object is located at or in a vicinity of a first target position. In some embodiments, the first target position may refer to a position in which the target region of the object can be located at or in a vicinity of an isocenter of the apparatus 110. In some embodiments, the first target position may refer to a position in which the target region of the object can be irritated by the laser. In some embodiments, the first target position may be a fixed physical position in a two-dimensional (2D) coordinate system (e.g., in the horizontal plane) of the apparatus 110. In some embodiments, the first target position may be a fixed physical position in a three-dimensional (3D) coordinate system of the apparatus 110.

In some embodiments, the table may be moved by a specific distance in the first direction. In some embodiments, the specific distance may be determined by the user of the terminal 130, for example, a value of the distance inputted by the user via the I/O 350. In some embodiments, the specific distance may be pre-determined by the system 100, and stored in the storage device 150 and/or the storage 220. In some embodiments, the specific distance may be determined by the processing device 140. For example, the processing device 140 may recommend a distance as the specific distance based on the first difference. In some embodiments, the specific distance may be changed in real time according to the first difference. More descriptions of the adjustment of the table may be found elsewhere in the present disclosure (e.g., FIG. 26 and descriptions thereof).

It should be noted that the above descriptions of the process 2500 are merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, a difference between the first target position and the position in which the second image is captured may be determined as the first difference. In some embodiment, mock position(s) of the elements of the image captured by the first capture device may have a predetermined mapping relation with the physical position(s) of the table (or the object), and the mapping relation may be stored in the storage device 150, the storage 220, or another external device. In some embodiments, the processing device 140 may determine a corresponding physical difference between a current physical position (in which the second image is captured) of the target region of the object and the first target position based on the first difference between the first target mock location and the starting mock location. Therefore, the processing device 140 may determine a spatial (or physical) difference according to the difference between the first target mock location and a current starting mock location, and/or the protocol. In some embodiments, the table may be moved manually. For example, the operator may press (or operate) one or more operating keys (or buttons, handles) associated with the movement of the table so that the instruction(s) may be sent to the processing device. In this way, the operator may move the table continuously or intermittently.

Figure 26:
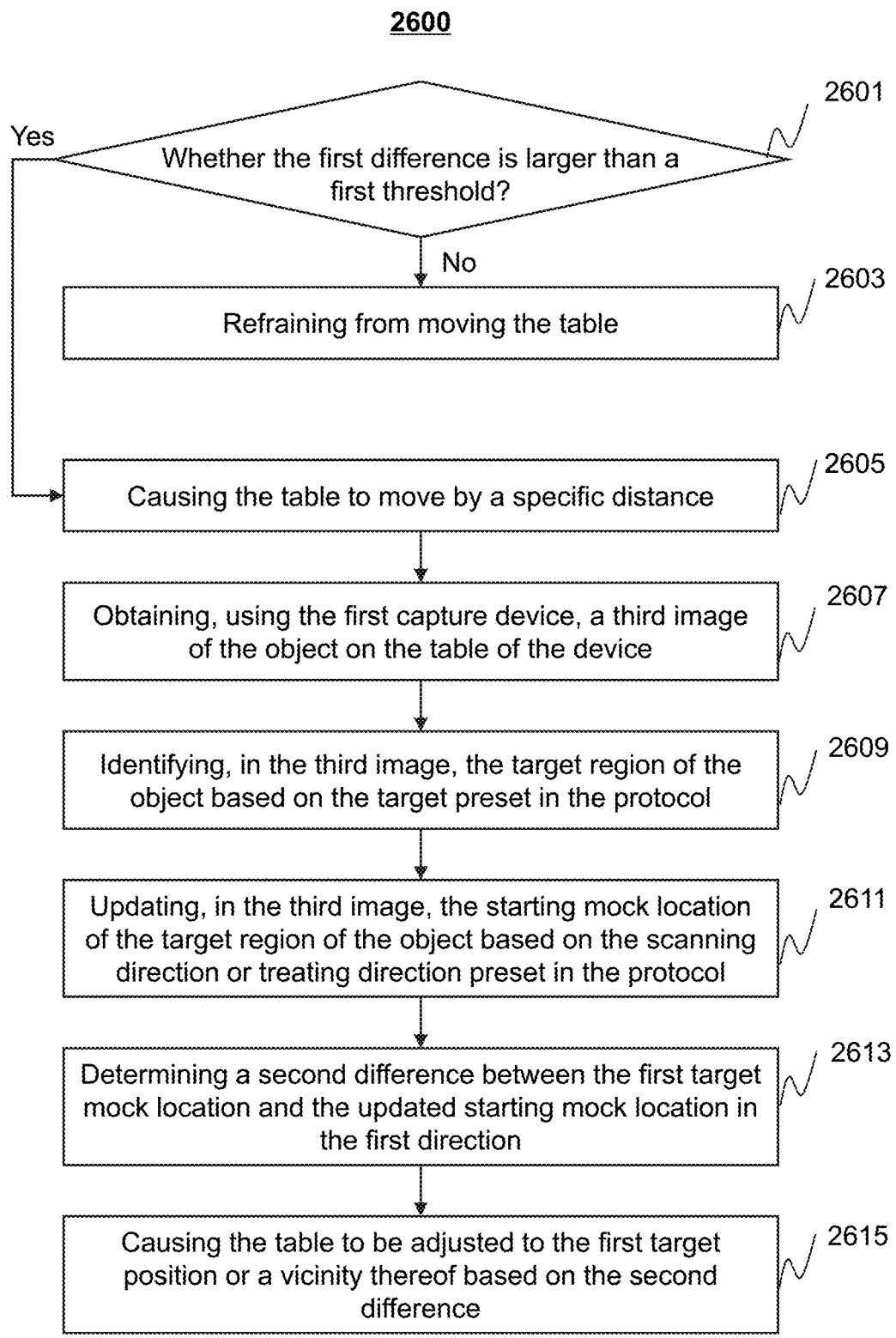
FIG. 26 is a flowchart illustrating an exemplary process for adjusting a table according to some embodiments of the present disclosure.

FIG. 26 is a flowchart illustrating an exemplary process for adjusting a table according to some embodiments of the present disclosure. In some embodiments, a target region of the object in a third image may be identified. A starting mock location of the target region of the object in the third image may be updated. The processing device 140 may cause the table to be adjusted based on a difference between the first target mock location and the updated starting mock location. In some embodiments, one or more operations of process 2600 illustrated in FIG. 26 may be performed by the processing device 140. In some embodiments, one or more operations of process 2600 may be implemented in the system 100 illustrated in FIG. 1. For example, the process 2600 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 2, or the like). The operations of the illustrated process presented below are intended to be illustrative. In some embodiments, the process 2600 may be accomplished with one or more additional operations not described, and/or without one or more of the operations discussed. Additionally, the order in which the operations of the process 2600 as illustrated in FIG. 26 and described below is not intended to be limiting. In some embodiments, operation 2513 in FIG. 25 may be performed according to the process 2600 or at least a portion thereof.

In 2601, the processing device 140 (e.g., the control module 420 (e.g., the determination unit 550)) may determine whether the first difference is larger than a first threshold.

In some embodiments, the first threshold may be a default value determined by the system 100 or preset by a user or operator via the terminal(s) 130. In some embodiments, the acquisition module 440 may acquire the first threshold from the storage device 150, the terminal 130, and/or an external data source (not shown). In response to a determination that the first difference is larger than the first threshold, the process 2600 may proceed to operation 2605. In response to a determination that the first difference is not larger than the first threshold, the process 2600 may proceed to operation 2603.

In 2603, the processing device 140 (e.g., the control module 420 (e.g., the table control unit 510)) may refrain from moving the table.

In some embodiments, the control module 420 (e.g., the table control unit 510) may include a motor, a transmission chain, a brake (e.g., an electromagnetic lock), or the like, or any combination thereof. The motor may drive a running and/or a stop of the transmission chain. The transmission chain may be used to move the table. The brake may be configured to locate the table and prevent the table from moving, or release the table to move. The processing device 140 may control the motor to drive the transmission chain to realize the movement of the table. In some embodiments, if a first difference is not larger than the first threshold, the processing device 140 may determine that the table arrives at the first target position, the processing device 140 may control the motor to stop running, and the brake to fix the table.

In 2605, the processing device 140 (e.g., the control module 420 (e.g., the table control unit 510)) may cause the table to move by a specific distance.

In some embodiments, the specific distance may be determined by the system 100 or preset by a user or operator via the terminal(s) 130. In some embodiments, the acquisition module 440 may acquire the specific distance from the storage device 150, the terminal 130, and/or an external data source (not shown). In some embodiments, the specific distance may be preset in the protocol. In some embodiments, the specific distance may be determined by the processing device 140 dynamically. In some embodiments, the processing device 140 may determine the specific distance based on the difference between the first target mock location and the current starting mock location of the target region of the object (e.g., the first difference). Merely by way of example, the processing device 140 may determine a physical difference between the current physical position of the target region of the object and the first target position based on the difference between the first target mock location and the current starting mock location of the target region of the object, and then the processing device 140 may determine the specific distance based on the physical difference (e.g., the specific distance may be determined as the physical difference multiplied by a ratio coefficient, wherein the ratio coefficient can be determined by the system 100 or preset by a user or operator via the terminal(s) 130). In some embodiments, if the first difference has a relatively large value, the table may be caused to move by a relatively large specific distance.

In some embodiments, the processing device 140 may control the motor to drive the transmission chain to cause the table to move by the specific distance. After the table is moved by the specific distance, the processing device 140 may control the brake to fix the table, and the table may be located at a certain position. In some embodiments, the certain position may be located between the first position and the second position.

In 2607, the processing device 140 (e.g., the acquisition module 440) may obtain a third image of the object on the table of the device. In some embodiments, the third image may be captured using the first capture device. If the table is moved by the specific distance, the capturing control unit 520 may control the first capture device to capture the third image of the object, and the third image may be transmitted to or acquired by the acquisition module 440. The capturing process of the third image may be similar to the capturing process of the first image of the table and/or the second image of the object in the process 2500, and is not repeated here. In some embodiments, because the first capture device is fixed above the table, the third image may illustrate a top view of the object. In some embodiments, the first capture device may transmit the third image to the computing device 200, the storage device 150 and/or the terminal 130 via the network 120. For example, the first capture device may transmit the third image to an interface of the terminal 130 to display the third image to the user.

In 2609, the processing device 140 (e.g., the image processing module 430) may identify the target region of the object based on the target preset in the protocol. The process of identifying the target region of the object in the third image may be similar to the process of identifying the target region of the object in the second image in operation 2507, and is not repeated here.

In 2611, the processing device 140 (e.g., the image processing module 430) may update the starting mock location of the object based on the scanning direction or treating direction preset in the protocol in the third image. Because the object may move with the table, the target region of the object may be moved with the movement of the object. Because the first capture device that captures the third image may be fixed, the starting mock location of the object may change in the third image.

In some embodiments, the starting mock location of the target region of the object may be directly determined in the third image. In some embodiments, the starting mock location in the third image may be determined manually by a user of the terminal 130 (e.g., a doctor or an operation), or automatically by the processing device 140, or semi-automatically by the user of the terminal 130 and the processing device 140. For example, the first capture device may transmit the third image to an interface of the terminal 130. The user of the terminal 130 may select or mark the starting mock location via the I/O 350, and then the processing device 140 may obtain the starting mock location. In some embodiments, similar to the determination of the starting mock location in the second image (as illustrated in 2509), the processing device 140 may determine the starting mock location in the third image according to one or more image recognition algorithms described in the present disclosure.

Alternatively or additionally, in some embodiments, the processing device 140 may determine the starting mock location in the third image based on information relating to the target region of the object in the second image. For example, the processing device 140 may estimate the starting mock location in the third image based on the starting mock location in the second image and the specific distance that the table is moved. As another example, the processing device 140 may match the target region of the object in the third image using a templet including the target region of the object in the second image, and determine the starting mock location in the third image.

In 2613, the processing device 140 (e.g., the image processing module 430) may determine a second difference between the first target mock location and the update starting mock location in the first direction. The process of determining the second difference may be similar to the process of determining the first difference in operation 2511, and is not repeated here.

In 2615, the processing device 140 (e.g., the control module 420 (e.g., the table control unit 510)) may cause the table to be adjusted to the first target position or a vicinity thereof based on the second difference. The adjustment of the table based on the second difference may be similar to the adjustment of the table based on the first difference. More descriptions of the adjustment of the table may be found elsewhere in the present disclosure (e.g., operation 2513 of process 2500 in FIG. 25 and descriptions thereof). In some embodiments, to cause the table to be adjusted to the first target position or a vicinity thereof based on the second difference, the process 2600 may return to 2601, and the operations 2601 through 2615 may be repeated one or more times, until a current difference between the first target mock location and a currently updated starting mock location in the first direction is not larger than the first threshold.

It should be noted that the above descriptions of the process 2600 are merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the process 2600 may iteratively update the difference between the first target mock location and a currently updated starting mock location by performing the operations 2601 through 2613, until the condition described in 2601 is satisfied. As another example, at least a portion of the operations in process 2600 may be omitted, and the table may be successfully moved to the first target position or a vicinity thereof at one operation in 2513. In some embodiments, the processing device 140 may determine a corresponding physical distance between a current physical position (in which the third image is captured) of the target region of the object and the first target position based on the second difference.

Figure 27:
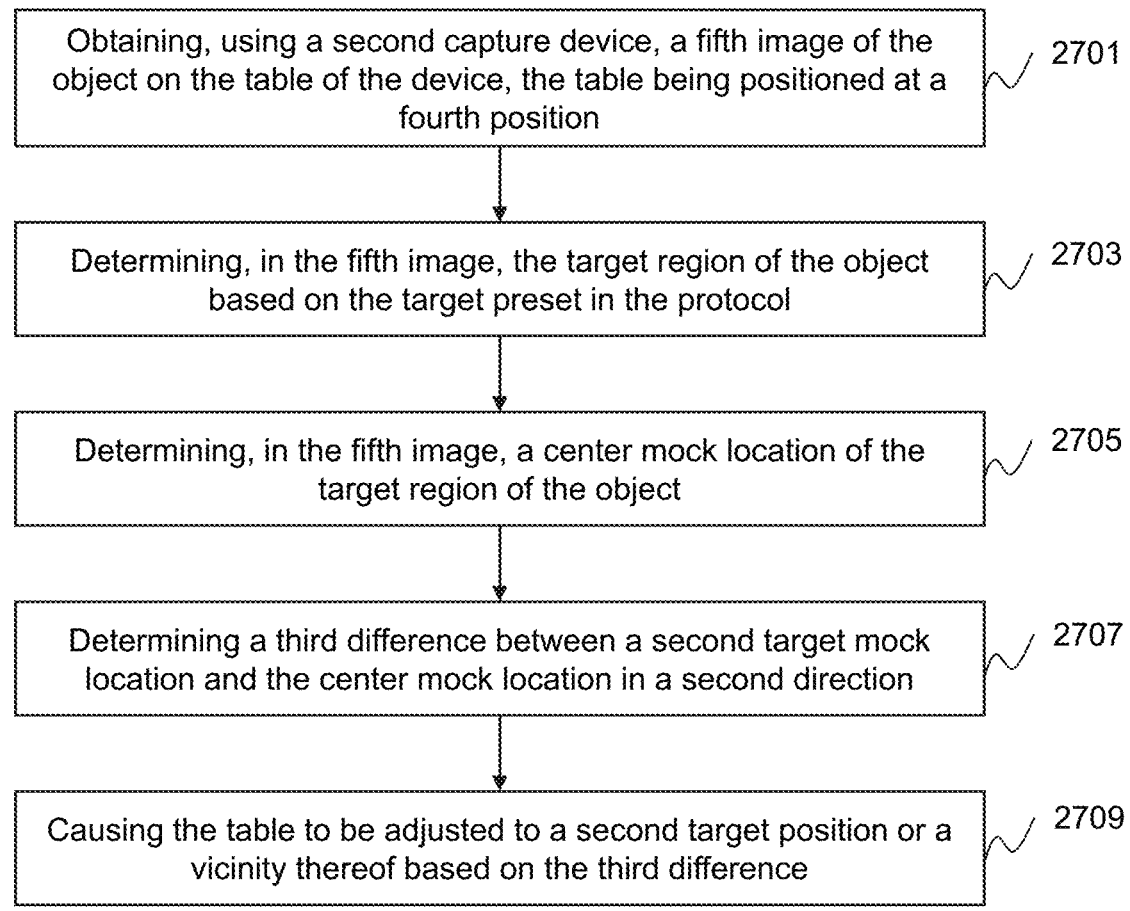
FIG. 27 is a flowchart illustrating an exemplary process for adjusting a table according to some embodiments of the present disclosure.

FIG. 27 is a flowchart illustrating an exemplary process for adjusting a table according to some embodiments of the present disclosure. In some embodiments, a fifth image of the object on the table may be obtained. The target region of the object in the fifth image may be determined. A center mock location of the target region of the object in the fifth image may be determined. The processing device 140 may cause the table to be adjusted to a second target position based on a difference between a second target mock location and the center mock location. In some embodiments, one or more operations of process 2700 illustrated in FIG. 27 may be performed by the processing device 140. In some embodiments, one or more operations of process 2700 may be implemented in the system 100 illustrated in FIG. 1. For example, the process 2700 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 2, or the like). The operations of the illustrated process presented below are intended to be illustrative. In some embodiments, the process 2700 may be accomplished with one or more additional operations not described, and/or without one or more of the operations discussed. Additionally, the order in which the operations of the process 2700 as illustrated in FIG. 27 and described below is not intended to be limiting. In some embodiments, one or more operations in process 2700 may be performed in the process 2500.

In 2701, the processing device 140 (e.g., the acquisition module 440) may obtain a fifth image of the object on the table of the apparatus 110. In some embodiments, the fifth image may be captured using a second capture device (not shown).

The second capture device may be configured to acquire image(s). In some embodiments, the second capture device may include a stereo camera, a digital camera, an infrared camera, or the like, or any combination thereof. In some embodiments, the second capture device may be the same as or different from the first capture device. More descriptions of the capture device may be found elsewhere in the present disclosure (e.g., FIG. 1 and descriptions thereof). In some embodiments, the second capture device may be fixed such that the second capture device may be capable of capturing image(s) from a side of the object and/or the table. For example, the second capture device may be fixed on a side of the object and/or the table, and the fifth image may illustrate a side view of the object and/or the table. In some embodiments, at the time the fifth image is captured, the table may be positioned at a fourth position. In some embodiments, the fourth position may include any position in the movement of the table. In some embodiments, the fourth position may be the last position (e.g., the first target position) in which the table is positioned in the process 2500. In some embodiments, the second capture device may transmit the fifth image to the computing device 200, the storage device 150 and/or the terminal 130 via the network 120. In some embodiments, the fifth image may be transmitted to or acquired by the acquisition module 440. In some embodiments, the processing device 140 (e.g., the display module 410) may display the fifth image. In some embodiments, the fifth image may be an infrared image, and internal organs of the object may have different distribution characteristics of thermal radiation in the fifth image.

In some embodiments, before the fifth image is captured, a fourth image of the table may be captured by the second capture device. In some embodiments, before the fourth image is captured, the table may be positioned at a third position such that a portion of the table can be irradiated by the laser emitted from the laser source mounted on the apparatus 110. In some embodiments, the third position may be the same as the first position (described in 2501). The second capture device may capture the fourth image of the table positioned at the third position. In some embodiments, at the time the fourth image is captured, the object may not be positioned on the table yet. In some embodiments, the fourth image and the first image may be captured substantially at the same time. In some embodiments, the processing device 140 (the image processing module 430) may determine a second target mock location of the portion of the table irradiated by the laser. The determination of the second target mock location may be similar to the determination of the first target mock location as illustrated in 2503. More descriptions of the determination of the second target mock location may be found in the description of 2503.

In 2703, the processing device 140 (e.g., the image processing module 430) may determine the target region of the object in the fifth image based on the target preset in the protocol. In some embodiments, the target region of the object may be the same as or similar to what is described in connection with 2507. In some embodiments, the processing device 140 may mark and cause the display (e.g., on a display device) of an identification box surrounding the target region of the object. In some embodiments, the user may adjust or edit the identification box through the user interface of the terminal 130 to modify the identified target region of the object. More descriptions of the determination of the target region of the object may be found in the description of 2507.

In 2705, the processing device 140 (e.g., the image processing module 430) may determine a center mock location of the target region of the object in the fifth image. The center mock location may refer to the position (in the fifth image) of an element representing the center of the target region of the object along a vertical direction (e.g., the Y-axis direction illustrated in FIG. 1). In some embodiments, the center mock location may refer to the position of an element representing a point that has a maximum density in the target region of the object. In some embodiments, the center mock location may include a gravity center, a center in geometry, or the like.

In 2707, the processing device 140 (e.g., the image processing module 430) may determine a third difference between the second target mock location and the center mock location in a second direction.

In some embodiments, the second direction may include a horizontal direction or a vertical direction. The vertical direction (e.g., the Y-axis direction illustrated in FIG. 1) may be taken as an example to illustrate the following operations. For example, the processing device 140 may compare the pixel coordinate of the center mock location in the fifth image and the pixel coordinate of the second target mock location in the third image. In some embodiments, the third difference may be denoted by the number (or count) of pixels in the vertical direction.

In 2709, the processing device (e.g., the control module 420) may cause the table to be adjusted to a second target position or a vicinity thereof based on the third difference. In some embodiments, the second target position may refer to a position in which the target region of the object can be located at or in a vicinity of an isocenter of the apparatus 110. In some embodiments, the second target position may refer to a position in which the target region of the object can be irritated by the laser. In some embodiments, the second target position may be a fixed physical position in a two-dimensional (2D) coordinate system (e.g., in the vertical plane (i.e., the Y-Z plane)) of the apparatus 110. In some embodiments, the second target position may be a fixed physical position in a three-dimensional (3D) coordinate system of the apparatus 110. In some embodiments, the adjustment of the table in the second direction may be similar to the adjustment of the table in the first direction. More descriptions of the adjustment of the table in the second direction may be found elsewhere in the present disclosure (e.g., FIG. 28 and descriptions thereof).

In some embodiments, the processing device 140 may determine a corresponding physical distance between a current physical position (in which the fifth image is captured) of the target region of the object and the second target position based on the third difference. In some embodiments, the processing device 140 may cause the table to move by the physical distance along the second direction to the second target position or a vicinity thereof.

It should be noted that the above descriptions of the process 2700 are merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. In some embodiments, the target region of the object may be positioned at or in a vicinity of the first target position in the first direction by performing the process 2500. In some embodiments, the target region of the object may be positioned at or in a vicinity of the second target position in a second direction by performing the process 2700. In some embodiments, the first target position and the second target position may correspond to a same physical 3D spatial position in the 3D coordinate system of the apparatus 110. In some embodiments, process 2700 may be performed after or before the process 2500. In some embodiments, operations of process 2700 and operations of process 2500 may be performed alternately.

Figure 28:
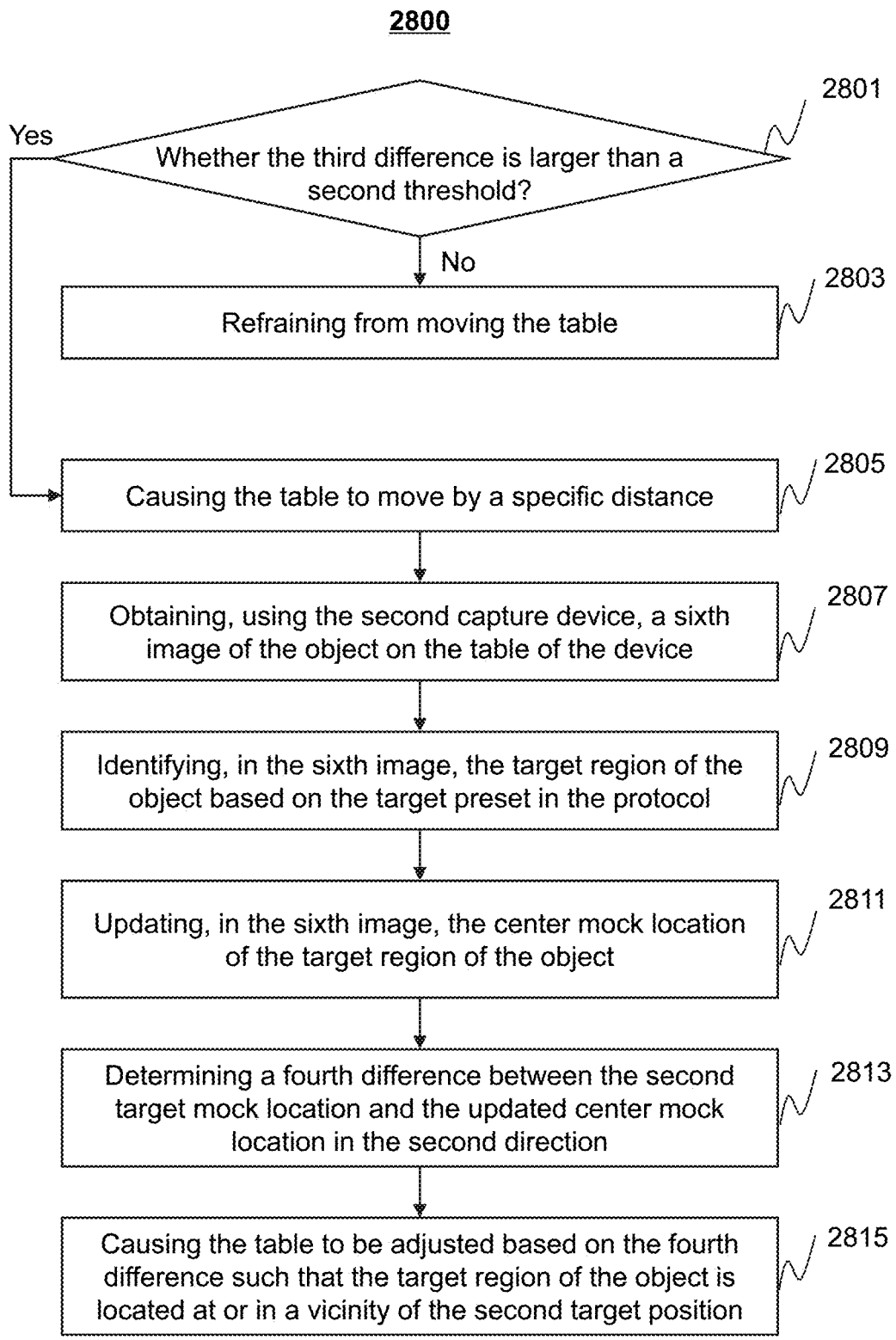
FIG. 28 is a flowchart illustrating an exemplary process for adjusting a table according to some embodiments of the present disclosure.

FIG. 28 is a flowchart illustrating an exemplary process for adjusting a table according to some embodiments of the present disclosure. In some embodiments, a target region of the object in a sixth image may be determined. A center mock location of the target region of the object in the sixth image may be updated. The processing device 140 may cause the table to be adjusted based on a difference between the second target mock location and the updated center mock location. In some embodiments, one or more operations of process 2800 illustrated in FIG. 28 may be performed by the processing device 140. In some embodiments, one or more operations of process 2800 may be implemented in the system 100 illustrated in FIG. 1. For example, the process 2800 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 2, or the like). The operations of the illustrated process presented below are intended to be illustrative. In some embodiments, the process 2800 may be accomplished with one or more additional operations not described, and/or without one or more of the operations discussed. Additionally, the order in which the operations of the process 2800 as illustrated in FIG. 28 and described below is not intended to be limiting. In some embodiments, operation 2709 in FIG. 27 may be performed according to the process 2800 or at least a portion thereof.

In 2801, the processing device 140 (e.g., the control module 420 (e.g., the determination unit 550)) may determine whether the third difference is larger than a second threshold.

In some embodiments, the second threshold may be a default value determined by the system 100 or preset by a user or operator via the terminal(s) 130. In some embodiments, the acquisition module 440 may acquire the second threshold from the storage device 150, the terminal 130, and/or an external data source (not shown). In response to a determination that the third difference is larger than the second threshold, the process 2800 may proceed to operation 2805. In response to a determination that the third difference is not larger than the second threshold, the process 2800 may proceed to operation 2803.

In 2803, the processing device 140 (e.g., the control module 420 (e.g., the table control unit 510)) may refrain from moving the table.

In 2805, the processing device 140 (e.g., the control module 420 (e.g., the table control unit 510)) may cause the table to move by a specific distance. In some embodiments, the specific distance may be determined by the system 100 or preset by a user or operator via the terminal(s) 130. In some embodiments, the acquisition module 440 may acquire the specific distance from the storage device 150, the terminal 130, and/or an external data source (not shown). In some embodiments, the specific distance may be preset in the protocol. In some embodiments, the specific distance may be determined by the processing device 140 dynamically. More descriptions of the determination of the specific distance may be found in the description of 2605.

In 2807, the processing device 140 (e.g., the acquisition module 440) may obtain a sixth image of the object on the table of the device. In some embodiments, the sixth image may be captured using the second capture device. After the table is moved by the specific distance, the capturing control unit 520 may control the second capture device to capture the sixth image of the object, and the sixth image may be transmitted to or acquired by the acquisition module 440. The capturing process of the sixth image may be similar to the capturing process of the first image of the table and/or the second image of the object in the process 2500, and is not repeated here. In some embodiments, because the second capture device is fixed, the sixth image may illustrate a side view of the object. In some embodiments, the second capture device may transmit the sixth image to the computing device 200, the storage device 150 and/or the terminal 130 via the network 120. For example, the second capture device may transmit the sixth image to an interface of the terminal 130 to display the sixth image to the user.

In 2809, the processing device 140 (e.g., the image processing module 430) may identify the target region of the object based on the target preset in the protocol. The process of identifying the target region of the object in the sixth image may be similar to the process of identifying the target region of the object in the second image in operation 2507, and is not repeated here.

In 2811, the processing device 140 (e.g., the image processing module 430) may update the center mock location of the target region of the object.

In some embodiments, the center mock location of the target region of the object may be directly determined in the sixth image. In some embodiments, the center mock location in the sixth image may be determined manually by a user of the terminal 130 (e.g., a doctor or an operation), or automatically by the processing device 140, or semi-automatically by the user of the terminal 130 and the processing device 140. For example, the second capture device may transmit the sixth image to an interface of the terminal 130. The user of the terminal 130 may select or mark the center mock location via the I/O 350, and then the processing device 140 may obtain the center mock location. In some embodiments, similar to the determination of the center mock location in the fifth image (as illustrated in 2705), the processing device 140 may determine the center mock location in the sixth image according to one or more image recognition algorithms described in the present disclosure.

Alternatively or additionally, in some embodiments, the processing device 140 may determine the center mock location in the sixth image based on information relating to the target region of the object in the fifth image. For example, the processing device 140 may estimate the center mock location in the sixth image based on the center mock location in the fifth image and the specific distance that the table is moved. As another example, the processing device 140 may match the target region of the object in the sixth image using a templet including the target region of the object in the fifth image, and determine the center mock location in the sixth image.

In 2813, the processing device 140 (e.g., the image processing module 430) may determine a fourth difference between the second target mock location and the updated center mock location in the second direction. The process of determining the fourth difference may be similar to the process of determining the third difference in operation 2707, and is not repeated here.

In 2815, the processing device 140 (e.g., the control module 420 (e.g., the table control unit 510)) may cause the table to be adjusted based on the fourth difference such that the target region of the object is located at or in a vicinity of the second target position. The adjustment of the table based on the fourth difference may be similar to the adjustment of the table based on the third difference. More descriptions of the adjustment of the table may be found elsewhere in the present disclosure (e.g., operation 2709 of process 2700 in FIG. 27 and descriptions thereof). In some embodiments, to cause the table to be adjusted to the second target position or a vicinity thereof based on the fourth difference, the process 2800 may return to 2801, and the operations 2801 through 2815 may be repeated one or more times, until a current difference between the second target mock location and a currently updated center mock location in the second direction is not larger than the second threshold.

It should be noted that the above descriptions of the process 2800 are merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the process 2800 may move the table and iteratively update the center mock location by performing the operations 2801 through 2815, until the condition in the 2801 is satisfied.

It should be noted that in some embodiments, in the processes 2500, 2600, 2700 and/or 2800, the table may be moved at a certain speed. The speed may be a default value determined by the system 100 or preset by a user or operator via the terminal(s) 130. In some embodiments, during the movement of the table, the first capture device and/or the second capture device may capture video(s) of the object and the table in real time. The processing device 140 may determine, in real time, the difference between the first target mock location and the current starting mock location in the first direction, and/or the difference between the second target mock location and the current center mock location in the second direction, based on the video(s). The processing device 140 may compare, in real time, the difference between the first target mock location and the current starting mock location in the first direction with the first threshold, or compare the difference between the second target mock location and the current center mock location in the second direction with the second threshold. In response to a determination that the difference between the first target mock location and the current starting mock location in the first direction is not larger than the first threshold, and/or the difference between the second target mock location and the current center mock location in the second direction is not larger than the second threshold, the processing device 140 may determine that the target region of the object is located at the isocenter of the apparatus 110 or a vicinity thereof, and the table movement may be terminated. Afterwards, a further imaging procedure or treatment procedure may be performed on the target region of the object.

Figure 29:
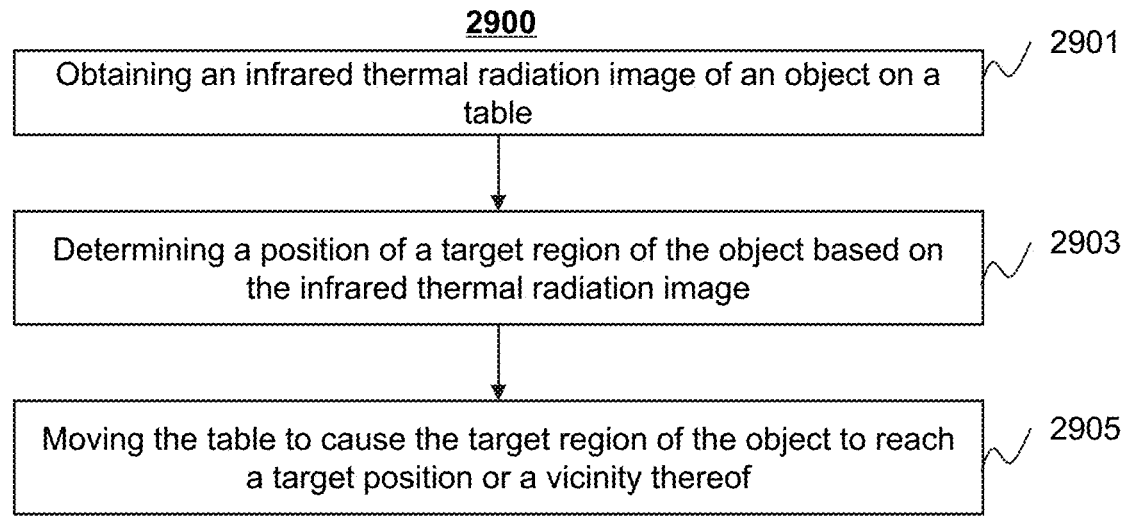
FIG. 29 is a flowchart illustrating an exemplary process for adjusting a table of a medical imaging system according to some embodiments of the present disclosure.
Figure 30A:
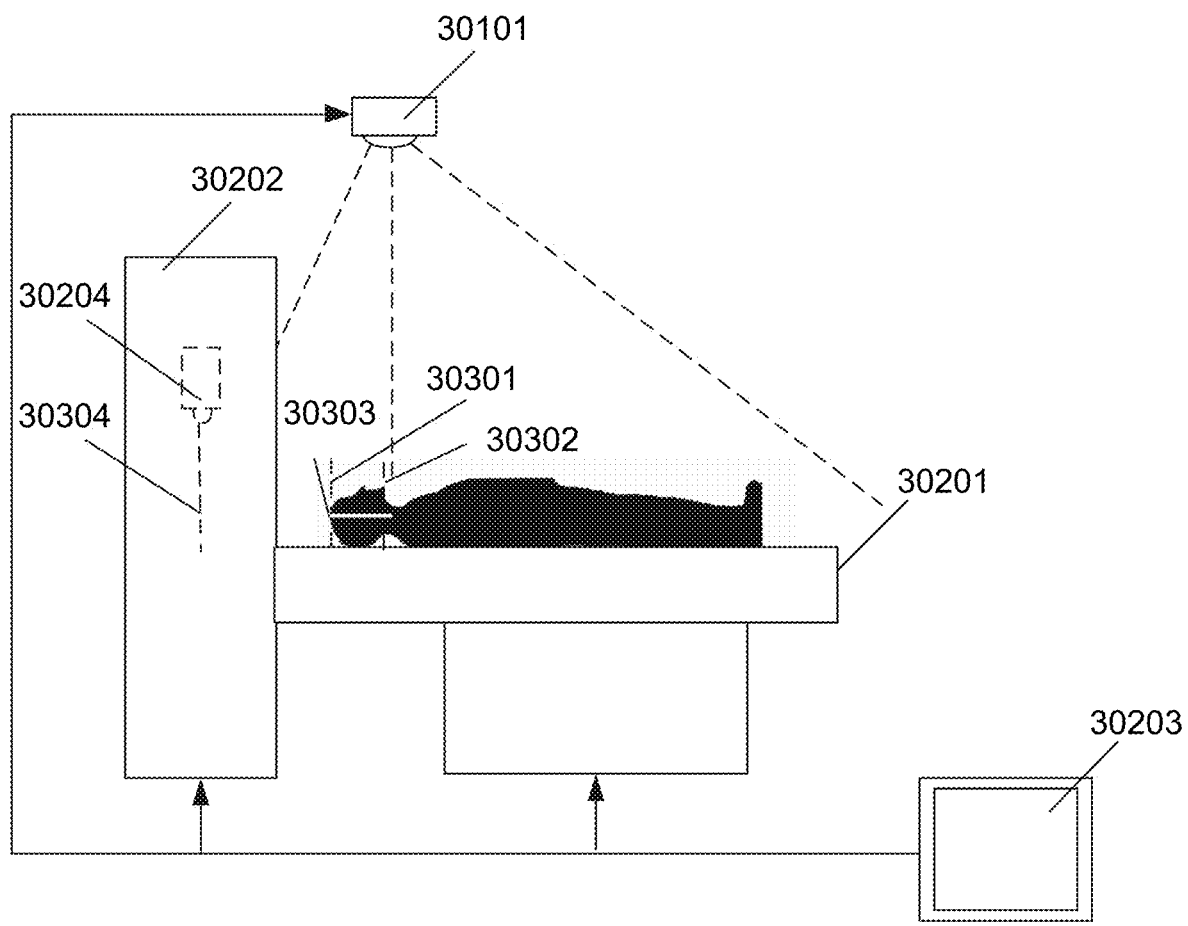
FIGS. 30A and 30B are schematic diagrams illustrating an exemplary medical imaging system according to some embodiments of the present disclosure.
Figure 30B:
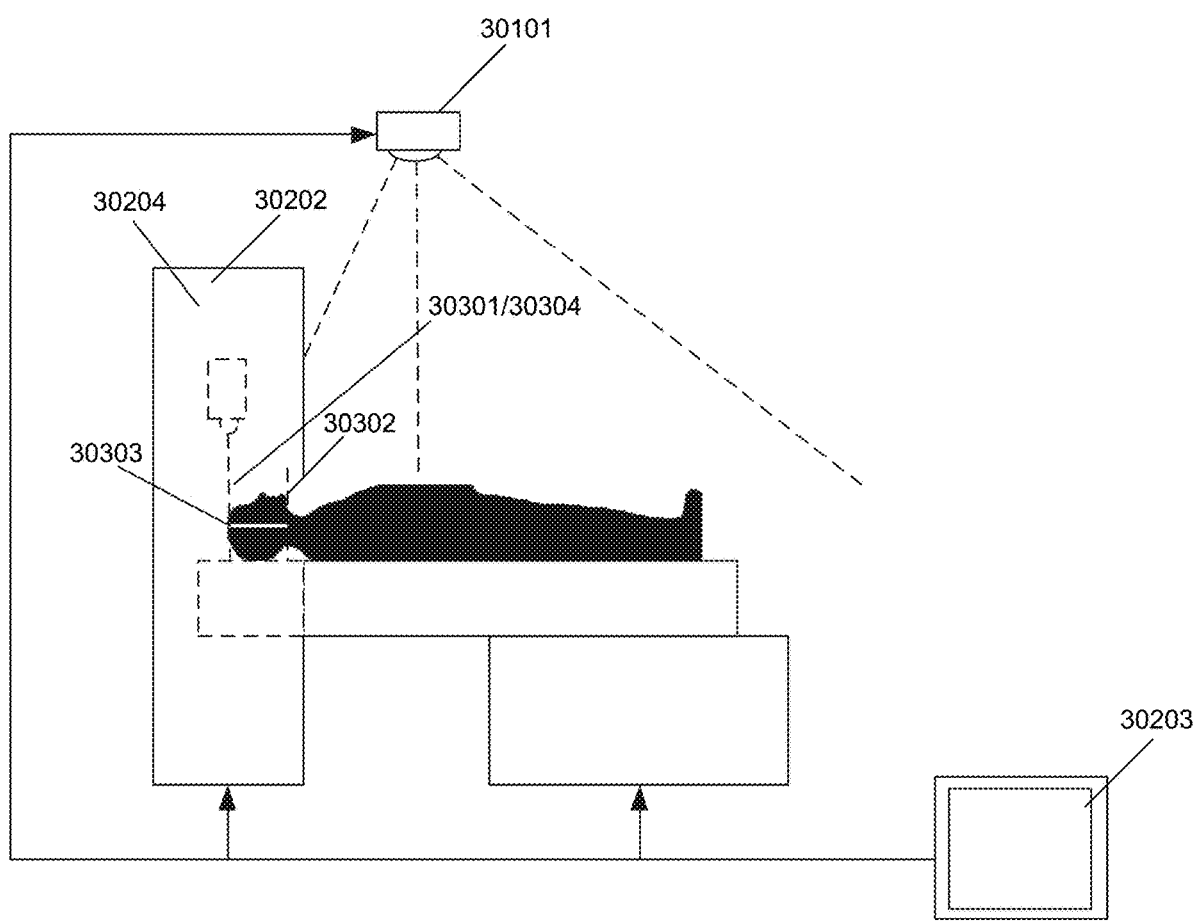

FIG. 29 illustrates an embodiment of the present disclosure. FIG. 29 is a flowchart illustrating an exemplary process for adjusting a table of a medical imaging system according to some embodiments of the present disclosure. The process 2900 can be performed for automatic table positioning of the medical imaging system before an imaging procedure. As shown in FIGS. 30A and 30B, the medical imaging system may include a table 30201, a scanning apparatus 30202, a control apparatus 30203 connecting the table 30201 and the scanning apparatus 30202, and a capture device 30101 located above and/or to the side of the table 30201. In some embodiments, the capture device 30101 may be fixed on the ceiling of a room accommodating the scanning apparatus 30202, and may include an infrared detecting device. Specifically, the process 2900 may include one or more of the following operations.

In 2901, the processing device 140 (e.g., the acquisition module 440) may obtain an infrared thermal radiation image of an object on a table (e.g., the table 30201) when the table is located at a current position.

In order to obtain higher clinical value of medical image(s), a technician may be required to position the object by adjusting the horizontal position and/or the vertical position of the table 30201 before the scanning procedure, so that the target region of the object to be scanned is located at the isocenter of the scanning apparatus 30202. The accuracy of the positioning result can affect the clinical value of the medical image(s) to some extent. The efficiency of the positioning procedure can affect the utilization efficiency of the medical imaging system, and the radiation dosage received by the technician and the object. Therefore, before using the medical imaging system to acquire medical image(s), the technician is required to position the object quickly and accurately.

In order to position the object more quickly and accurately, in some embodiments, an infrared thermal radiation image is used, i.e., the object may be positioned based on the infrared thermal radiation image. Accordingly, in the positioning procedure, it may be necessary to acquire the infrared thermal radiation image of the object by the capture device 30101 when the table 30201 is located at the current position. The infrared thermal radiation image may be a temperature gradient image, and accordingly, the distribution and contour of the organ tissues of the object can be determined based on a mapping relation of color and temperature in the infrared thermal radiation image. FIG. 30A is an exemplary infrared thermal radiation image after grayscale adjustment).

It can be understood that the axial direction of the table can be taken as a front view direction. If the infrared capture device is positioned above the table, then the infrared thermal radiation image may illustrate a top view of the table. If the infrared capture device is positioned on the side of the table, then the infrared thermal radiation image may illustrate a side view of the table. Generally, the table can be adjusted in the horizontal direction based on the top view of the table, and the table can be adjusted in the vertical direction based on the side view of the table.

In 2903, the processing device 140 (e.g., the image processing module 430) may determine a position of a target region of the object to be scanned based on the infrared thermal radiation image.

A preset scanning protocol may include information relating to the target region of the object to be scanned, such as the head, the chest, the abdomen, etc. The preset scanning protocol can be directly read from an information management apparatus (not shown). A starting position of an image scanning range may be determined according to the preset scanning protocol. The starting position may include a horizontal starting position and/or a vertical starting position. Taking a CT scan under the prone position as an example, if the target region to be scanned is the head, and the scanning direction is usually from the head to the feet, then the image scanning range may usually be from the crown of the head (see the dotted line 30301 in FIGS. 30A and 30B) to the lower jaw (see the dotted line 30302 in FIGS. 30A and 30B), the horizontal starting position 30301 of the image scanning range may usually be the crown of the head, and the vertical starting position may be the position of the longitudinal centerline of the head (see the dotted line 30303 in FIGS. 30A and 30B). Therefore, when positioning the object, it is necessary to obtain the object's preset scanning protocol first. Then the target region of the object to be scanned may be identified in the infrared thermal radiation image according to the infrared thermal radiation image and the preset scanning protocol of the object, and a pixel position of the target region to be scanned (especially the pixel position corresponding to the starting position of the target region to be scanned) may be determined in the infrared thermal radiation image. In some embodiments, artificial intelligence algorithm(s) may be used to identify the starting position of the target region to be scanned in the infrared thermal radiation image.

Because the preset scanning protocol usually also includes the gesture of the object, for example, head-feet supine position, feet-head supine position, feet-head side position, etc. Taking a CT scan as an example, the scanning direction corresponding to the head-feet position refers to that the head enters the scanning apparatus first, and the scanning direction corresponding to the feet-head position refers to that the feet enter the scanning apparatus first. That is, for the target region to be scanned, the starting positions corresponding to different scanning directions are different. Therefore, it is also necessary to consider the scanning position of the object in the positioning procedure. That is, it is necessary to consider the posture of the object on the table, as well as the scanning direction. Therefore, before determining the position of the object to be scanned based on the infrared thermal radiation image, it is also preferred to determine the current body position of the object according to the infrared thermal radiation image, and determine whether the current body position is consistent with the scanning body position in the preset scanning protocol. If they are consistent, then the position of the object to be scanned may be determined according to the infrared thermal radiation image. If they are inconsistent, then the processing device 140 may provide a hint to avoid situations including the scanning body position being incorrect due to the technician's neglect.

In 2905, the processing device 140 (e.g., the control module 420 (e.g., the table control unit 510)) may move the table to cause the target region of the object (to be scanned) to reach a target position or a vicinity thereof (e.g., a position within a set distance range of the target position).

The target position may usually be a position in which the laser line projected by the laser source 30204 of the medical imaging system onto the table. In the positioning procedure, it is necessary to make the starting position coincide or approximately coincide with the target position. Therefore, after determining the starting position in the infrared thermal radiation image, it is also necessary to determine the pixel position of the target position in the infrared thermal radiation image. The approximate coincidence described in this embodiment refers to that the distance between the starting position and the target position is within the set distance range, and the distance range is generally set to satisfy a positioning error acceptable for the clinical positioning.

In order to accurately determine the pixel position of the target position in the infrared thermal radiation image, the capture device 30101 in this embodiment may further include an optical camera that appears in combination with the infrared capture device. An optical image may be acquired by the optical camera, a registration relationship between the optical image and the infrared thermal radiation image may be obtained, and then a pixel position of the target position in the optical image may be determined according to the optical image. The pixel position of the target position in the infrared thermal radiation image may be determined based on the infrared thermal radiation image, the pixel position of the target position in the optical image, and the registration relationship of the optical image and the infrared thermal radiation image.

After both the starting position and the target position are determined, the table may be moved to make the starting position to be scanned approach the target position, until the starting position reaches the target position or is within the set distance range of the target position. Specifically, a positional relationship between the pixel position corresponding to the target position and the pixel position of the target region to be scanned may be determined; the table may be moved according to the positional relationship, so that the pixel position of the starting position coincides with (or is within a set distance range of) the pixel position corresponding to the target position.

The positional relationship of this embodiment may be the positional relationship between the pixel position corresponding to the target region to be scanned and the pixel position corresponding to the target position in the infrared thermal radiation image. In this case, the coordinates in the infrared thermal radiation image are directly used as the reference coordinates for moving the table, and after each movement, whether the starting position in the newly taken infrared thermal radiation image coincides or approximately coincides with the target position may be checked. If there is no coincidence (or approximate coincidence), the bed may continue to be moved. In this way, the control apparatus may not need to determine the mapping relation between the infrared thermal radiation image and the spatial position of the table. Therefore, it is generally suitable for manual positioning procedure, and two or more times of manual movement of the table may be required.

The positional relationship of this embodiment may also be the spatial positional relationship between the physical position of the target region to be scanned and the target position that is determined according to the position mapping relation between the infrared thermal radiation image and the actual spatial positions in the medical imaging system. After obtaining the spatial positional relationship between the starting position of the target region to be scanned and the target position, the processing device 140 may determine the required displacement of the table in each direction, and then the table can be moved automatically or manually according to the determined displacement. Because the medical imaging system has a relatively high spatial position control precision, by using this positional relationship, the initial physical position of the target region to be scanned can reach (or approximately reach) the target position by only one operation of moving the table. Additionally or alternatively, two or more ways of moving the table can be used.

For multiple table movement operations, it is necessary to obtain infrared thermal radiation image(s) of the object during the movement of the table to the target position, and update the positional relationship between the position of the target region of the object to be scanned and the target position according to the newly acquired infrared thermal radiation image(s). If the updated positional relationship indicates that the difference between the position of the target region of the object to be scanned and the target position is within the set distance range, the movement of the table may be terminated. If the updated positional relationship indicates that the difference between the position of the target region of the object to be scanned and the target position exceeds the set distance range, then the table may be continued to be moved. Then, the processing device 140 may obtain new infrared thermal radiation image(s) of the object during the movement of the table towards the target position, update the positional relationship based on the new infrared thermal radiation image(s), until the latest positional relationship indicates that the difference between the starting position of the target region of the object to be scanned and the target position is within the set distance range, then the movement of the table may be terminated. It should be noted that, in this embodiment, before the starting position reaches the target position or approximately reaches the target position, any state of the table may be referred to as "the process of moving towards the target position."

Exemplarily, taking a head CT scanning as an example, after the object is lying on the table 30201, the table 30201 may be moved to the scanning center (generally the table is positioned at the highest position, see FIG. 30A), the table may then be moved into the scanning aperture (i.e., detection region), such that the laser source 30204 positioned within the scanning aperture can illuminate the table to form a red line, and the red line can be regarded as the actual target position (corresponding to the target position in the optical image, see the dashed line 30304 in FIG. 30A). When the table is in the current position, infrared thermal radiation image(s) and optical image(s) of the object in the top view, and infrared thermal radiation image(s) and optical image(s) in the side view may be obtained. Scanning information relating to the object's target region to be scanned (e.g., the head CT scan under the head-feet position) may be obtained, and then the position of the crown of the head in the infrared thermal radiation image in the top view may be determined, and then the position may be determined as the horizontal starting position 30301. The position of the longitudinal centerline of the head of the infrared thermal radiation image in the side view may be determined, and the position may be determined as the vertical starting position 30303. The infrared thermal radiation image and the optical image may be registered in one or more directions. A pixel position of the horizontal target position in the infrared thermal radiation image of the top view may be determined based on the pixel position of the target position in the optical image of the top view, and the registration relationship between the optical image and the infrared thermal radiation image in the horizontal direction. A pixel position of the vertical target position in the infrared thermal radiation image of the side view may be determined based on the pixel position of the target position in the optical image of the side view, and the registration relationship between the optical image and the infrared thermal radiation image in the vertical direction. The positional relationship between the horizontal starting position and the horizontal target position may be determined as a horizontal positional relationship. The positional relationship between the vertical starting position and the vertical target position may be determined as a vertical positional relationship. Then, the table may be moved horizontally so that the horizontal starting position coincides or approximately coincides with the spatial horizontal position of the horizontal target position (see FIG. 30B) according to the horizontal positional relationship, and the table may be moved vertically so that the vertical starting position coincides or approximately coincides with the vertical spatial position of the vertical target position according to the vertical position relationship.

According to the embodiment of the automatic positioning process in the medical imaging system provided in the present disclosure, the medical imaging system may include a scanning apparatus, a table that can move axially along the scanning aperture of the scanning apparatus, and a capture device positioned above and/or lateral to the table. The capture device may include an infrared capture device. The process may include acquiring an infrared thermal radiation image of the object when the table is located at the current position; determining a position of a target region of the object to be scanned according to the infrared thermal radiation image; moving the table so that the target region of the object to be scanned reaches the target position or in within the set distance range of the target position. In comparison with the technician's manual positioning based on the visual infrared laser, the image-based positioning process may have relatively high accuracy, and the process may be quick and easy, which can greatly improve the positioning efficiency.

FIGS. 30A and 30B illustrate another embodiment of the present disclosure. FIGS. 30A and 30B are schematic diagrams illustrating an exemplary medical imaging system according to some embodiments of the present disclosure. As shown in FIG. 30A, the medical imaging system may include a scanning apparatus 30202, a table 30201 that can move axially along the scanning aperture of the scanning apparatus 30202, and a control apparatus 30203 and a capture device 30101 positioned above and/or to the side of the table 30201. The capture device 30101 may include an infrared capture device for obtaining infrared thermal radiation image(s) of the object. The control apparatus 30203 may be communicatively coupled to the capture device for controlling the movement of the table 30201 according to the infrared thermal radiation image(s) of the object, so that the target region of the object to be scanned is moved to the target position or a position within the set distance range of the target position.

The control apparatus 30203 may include an image processing module, and the image processing module may identify the pixel position of the target region of the object to be scanned in the infrared thermal radiation image based on the infrared thermal radiation image of the object and the preset scanning protocol of the object.

The image scanning system described in this embodiment may further include an information management apparatus. The information management apparatus may be connected with the control apparatus 30203, and may be configured to store a preset scanning protocol of the object. Therefore, the control apparatus 30203 can read the object's preset scanning protocol from the information management apparatus. The preset scanning protocol may include the image scanning range of the object, such as the head, the chest, or the like. After acquiring the information relating to the object to be scanned, the control apparatus may identify the target region to be scanned in the infrared thermal radiation image based on the infrared thermal radiation image and the preset scanning protocol of the object. The pixel position of the target region to be scanned (especially the pixel position corresponding to the starting position of the target region to be scanned) in the infrared thermal radiation image may be determined. The starting position may include a horizontal starting position and a vertical starting position. If the target region to be scanned is the head, the image scanning range may usually be from the crown of the head to the lower jaw, and the horizontal starting position of the image scanning range may usually be the crown of the head, and accordingly the vertical starting position of the image scanning range may be the vertical position of the longitudinal centerline of the head.

The capture device 30101 may further include an optical camera that appears in combination with an infrared capture device for acquiring an optical image. The image processing module mentioned above may be further configured to determine a registration relationship between the optical image and the infrared thermal radiation image; determine, according to the optical image, a pixel position of the target position in the optical image; and determine the pixel position of the target position in the infrared thermal radiation image based on the infrared thermal radiation image, the pixel position of the target position in the optical image, and the registration relationship between the optical image and the infrared thermal radiation image.

After the start position and the target position are both determined, the control apparatus 30203 may determine a positional relationship between the pixel position corresponding to the target position and the pixel position of the target region to be scanned; determine the table moving direction or the displacement the table needs to be moved based on the positional relationship, so that the technician can move the table according to the displacement; or directly move the table, so that the pixel position of the starting position coincides with or approximately coincides with the pixel position corresponding to the target position.

The positional relationship of this embodiment may be the positional relationship between the pixel position corresponding to the target region to be scanned and the pixel position corresponding to the target position in the infrared thermal radiation image. In this case, the coordinates in the infrared thermal radiation image are directly used as the reference coordinates for moving the table, and after each movement, whether the starting position in the newly taken infrared thermal radiation image coincides or approximately coincides with the target position may be checked. If there is no coincidence (or approximate coincidence), the bed may continue to be moved. In this way, the control apparatus may not need to determine the mapping relation between the infrared thermal radiation image and the spatial position of the table. Therefore, it is generally suitable for manual positioning procedure, and two or more times of manual movement of the table may be required.

The positional relationship of this embodiment may also be the spatial positional relationship between the physical position of the target region to be scanned and the target position that is determined according to the position mapping relation between the infrared thermal radiation image and the actual spatial positions in the medical imaging system. After obtaining the spatial positional relationship between the starting position of the target region to be scanned and the target position, the processing device 140 may determine the required displacement of the table in each direction, and then the table can be moved automatically or manually according to the determined displacement. Because the medical imaging system has a relatively high spatial position control precision, by using this positional relationship, the initial physical position of the target region to be scanned can reach (or approximately reach) the target position by only one operation of moving the table. Additionally or alternatively, two or more ways of moving the table can be used.

For multiple table movement operations, the control apparatus may automatically acquire infrared thermal radiation image(s) of the object during the movement of the table to the target position, or the technician may manually obtain the infrared thermal radiation image(s) of the object during the movement of the table to the target position. The control apparatus may update the positional relationship between the position of the target region of the object to be scanned and the target position according to the newly acquired infrared thermal radiation image(s). If the updated positional relationship indicates that the difference between the position of the target region of the object to be scanned and the target position is within the set distance range, the movement of the table may be terminated, or information indicating the positioning process is successful may be output. If the updated positional relationship indicates that the difference between the position of the target region of the object to be scanned and the target position exceeds the set distance range, the control apparatus may move the table again, or output the required displacement of the table to facilitate the technician to move the table. Then, the control apparatus may automatically acquire infrared thermal radiation image(s) of the object during the movement of the table to the target position, or the technician may manually obtain the infrared thermal radiation image(s) of the object during the movement of the table to the target position. The control apparatus may update the positional relationship based on the new infrared thermal radiation image(s) until the latest positional relationship indicates that the difference between the starting position of the target region of the object to be scanned and the target position is within the set distance range, and then the movement of the table may be terminated. It should be noted that before the starting position reaches the target position or approximately reaches the target position, any state of the table may be referred to as "the process of moving towards the target position."

According to some embodiments, the medical imaging system may include a scanning apparatus, an image reconstruction apparatus connected to the scanning apparatus, and a table that can move axially along the scanning aperture of the scanning apparatus, and may further include: a control apparatus, and a capture device positioned above and/or to the side of the table. The capture device may include an infrared capture device for obtaining infrared thermal radiation image(s) of the object. The control apparatus may be in communication with the capture device, and may be configured to control the movement of the table according to the infrared thermal radiation image(s) of the object, so that the target region of the object to be scanned can be moved to the target position or a position within the set distance range of the target position. In comparison with the technician's manual positioning based on the visual infrared laser, the image-based positioning process may have relatively high accuracy, and the process may be quick and easy, which can greatly improve the positioning efficiency.

Some embodiments of the present disclosure may provide a storage medium including computer executable instructions. The computer executable instructions, when executed by a computer processor, may cause the processor to implement a positioning method for a medical imaging system. The method may include: obtaining an infrared thermal radiation image of the object when the table is located at the current position; determining a position of the target region of the object to be scanned based on the infrared thermal radiation image; moving the table to cause the target region of the object to be scanned to reach the target position or a position within a set distance range of the target position.

The computer executable instructions included in the storage medium provided by the present disclosure are not limited to the operations described above, and may also cause the processor to implement related operations in the automatic positioning process for medical imaging systems provided by any embodiment of the present disclosure.

From the above descriptions of the embodiments, it will be apparent to those skilled in the art that the present disclosure can be implemented by means of software and the necessary general hardware, and of course, it can also be implemented by hardware, but in many cases the former is a better implementation. Based on this understanding, the operations of the present disclosure are essentially or the part that contributes to the existing technology can be embodied in the form of software products. The computer software product can be stored in a computer readable storage medium, such as a computer floppy disk, read-only memory (ROM), random access memory (RAM), flash memory (FLASH), hard disk or CD, etc. including instructions for causing a computer device (which may be a personal computer, server, or network device, etc.) to perform the automatic positioning method for the medical imaging system described in the various embodiments of the present disclosure.

It should be noted that the above is only the preferred embodiment of the present disclosure and the technical principles applied. Those skilled in the art will appreciate that the present disclosure is not limited to the specific embodiments described herein. Various obvious changes, modifications, and substitutions will be apparent to those skilled in the art without departing from the scope of the disclosure. Therefore, although the present disclosure has been described in detail by the above embodiments, the present disclosure is not limited to the above embodiments, and may also include other equivalent embodiments without departing from the present disclosure concept.

Figure 31A:
FIGS. 31A-31C are schematic diagrams illustrating exemplary infrared thermal radiation images according to some embodiments of the present disclosure.
Figure 31B:
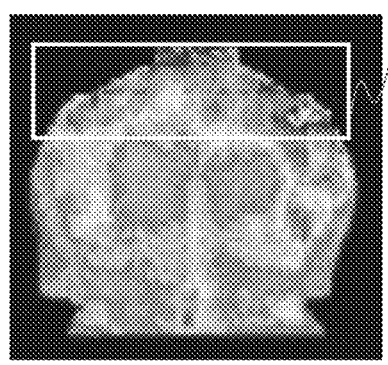
Figure 31C:
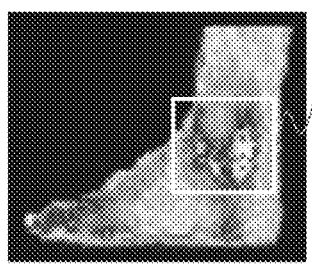

FIGS. 31A-31C are schematic diagrams illustrating exemplary infrared thermal radiation images according to some embodiments of the present disclosure.

As illustrated in FIG. 31A, an object lying on a table at the supine position may be scanned or treated. In some embodiments, different temperatures of the regions of the object may correspond to different infrared thermal radiations. Correspondingly, a color and/or contour, a size, or the like, of the regions may be displayed in an infrared thermal radiation image captured by a capture device (e.g., the capture device 160, the capture device 30101). A user of the terminal 130 may manually determine a target region, or the processing device 140 may automatically determine the target region in the infrared thermal radiation image. For example, the temperature of the head may be higher than the trunk, and the temperature of the trunk may be higher than the temperature of the four limbs in a normal object. As another example, the temperature of the region with a tumor may be higher than the temperature of a normal region. As a further example, the temperature of the region with inflammation may be higher than the temperature of a normal region.

As illustrated in FIG. 31B, a shoulder region 3101 may have a frozen shoulder, and the temperature of the shoulder region 3101 may be relatively high. The color of the shoulder region may be red, and the depth of red may indicate how severe the shoulder is frozen.

As illustrated in FIG. 31C, an infrared thermal radiation image of a foot may be captured by the capture device. The temperature of the ankle region 3102 may be higher than the temperature of a normal ankle, and the color of the ankle region 3102 may be red, which may indicate an injury in the ankle region 3102.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped in a single embodiment, figure, or descriptions thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device including a storage device and at least one processor for positioning an object in a device, the method comprising:
  obtaining, using a first capture device, a first image of a table of the device, the table being positioned at a first position;
  determining, in the first image, a first target mock location, the first target mock location being a pixel position in the first image of one or more pixels representing a first target position of a target region of the object to be scanned or treated by the device;
  obtaining, using the first capture device, a second image of the object on the table of the device, the table being positioned at a second position;
  identifying, in the second image, the target region of the object;
  determining, in the second image, a starting mock location of the target region of the object based on a scanning direction or treating direction preset in the protocol, the starting mock location being a pixel position in the second image of one or more pixels representing a starting position of the target region of the object;

determining a first difference between the first target mock location and the starting mock location in a first direction; and causing the table to be adjusted based on the first difference such that the target region of the object is located at or in a vicinity of the first target position.

2. The method of claim 1, wherein the causing the table to be adjusted based on the first difference such that the target region of the object is located at or in a vicinity of the first target position comprises:

comparing the first difference with a first threshold; and
in response to a determination that the first difference is not larger than the first threshold, refraining from moving the table.

3. The method of claim 1, wherein the causing the table to be adjusted based on the first difference such that the target region of the object is located at or in a vicinity of the first target position comprises:

comparing the first difference with a first threshold; and
in response to a determination that the first difference is no less than the first threshold, causing the table to move by a specific distance.

4. The method of claim 3, wherein in response to a determination that the first difference is no less than the first threshold, causing the table to move by a specific distance, the causing the table to be adjusted based on the first difference such that the target region of the object is located at or in a vicinity of the first target position further comprises:

obtaining, using the first capture device, a third image of the object on the table of the device;
identifying, in the third image, the target region of the object;
updating, in the third image, the starting mock location of the target region of the object based on the scanning direction or treating direction preset in the protocol;
determining a second difference between the first target mock location and the updated starting mock location in the first direction; and
causing the table to be adjusted to the first target position or a vicinity thereof based on the second difference.

5. The method of claim 1, further comprising:
obtaining, using a second capture device, a fourth image of the table of the device, the table being positioned at a third position; and
determining, in the fourth image, a second target mock location, the second target mock location being a pixel position in the second image of one or more pixels representing a second target position of a target region of the object to be scanned or treated by the device.

6. The method of claim 5, further comprising:
obtaining, using the second capture device, a fifth image of the object on the table of the device, the table being positioned at a fourth position;
identifying, in the fifth image, the target region of the object;
determining, in the fifth image, a center mock location of the target region of the object;
determining a third difference between the second target mock location and the center mock location in a second direction; and causing the table to be adjusted based on the third difference such that the target region of the object is located at or in a vicinity of the second target position.

7. The method of claim 1, wherein when the first image is obtained using the first capture device, the table is positioned at the first position such that a portion of the table is irradiated by a laser emitted from a laser source mounted on the device.

8. The method of claim 7, wherein the first target mock location is determined based on one or more pixels representing a light spot of the laser in the first image.

9. The method of claim 1, wherein the capture device includes at least one of a stereo camera, a digital camera, or an infrared camera.

10. A system for positioning an object in a device, comprising:

at least one storage device storing a set of instructions; and at least one processor in communication with the storage device, wherein when executing the set of instructions, the at least one processor is configured to cause the system to perform operations including:

obtaining, using a first image capturing device, a first image of a table of the device, the table being positioned at a first position;

determining, in the first image, a first target mock location, the first target mock location being a pixel position in the first image of one or more pixels representing a first target position of a target region of the object to be scanned or treated by the device;

obtaining, using a second image capturing device, a second image of the object on the table of the device, the table being positioned at a second position;

identifying, in the second image, the target region of the object;

determining, in the second image, a starting mock location of the target region of the object based on a scanning direction or treating direction preset in the protocol, the starting mock location being a pixel position in the second image of one or more pixels representing a starting position of the target region of the object;

determining a first difference between the first target mock location and the starting mock location in a first direction; and causing the table to be adjusted based on the first difference such that the target region of the object is located at or in a vicinity of the first target position.

11. The system of claim 10, wherein the causing the table to be adjusted based on the first difference such that the target region of the object is located at or in a vicinity of the first target position comprises:

comparing the first difference with a first threshold; and
in response to a determination that the first difference is not larger than the first threshold, refraining from moving the table.

12. The system of claim 11, wherein the causing the table to be adjusted based on the first difference such that the target region of the object is located at or in a vicinity of the first target position comprises:

comparing the first difference with a first threshold; and
in response to a determination that the first difference is no less than the first threshold, causing the table to move by a specific distance.

13. The system of claim 12, wherein in response to a determination that the first difference is no less than the first threshold, causing the table to move by a specific distance, the causing the table to be adjusted based on the first difference such that the target region of the object is located at or in a vicinity of the first target position further comprises:

obtaining, using a third image capturing device, a third image of the object on the table of the device;

identifying, in the third image, the target region of the object;

updating, in the third image, the starting mock location of the target region of the object based on the scanning direction or treating direction preset in the protocol;

determining a second difference between the first target mock location and the updated starting mock location in the first direction; and causing the table to be adjusted to the first target position or a vicinity thereof based on the second difference.

14. The system of claim 10, further comprising:

obtaining, using a fourth image capturing device, a fourth image of the table of the device, the table being positioned at a third position; and determining, in the fourth image, a second target mock location, the second target mock location being a pixel position in the second image of one or more pixels representing a second target position of a target region of the object to be scanned or treated by the device.

15. The system of claim 14, further comprising:

obtaining, using a fifth image capturing device, a fifth image of the object on the table of the device, the table being positioned at a fourth position;

identifying, in the fifth image, the target region of the object;

determining, in the fifth image, a center mock location of the target region of the object;

determining a third difference between the second target mock location and the center mock location in a second direction; and causing the table to be adjusted based on the third difference such that the target region of the object is located at or in a vicinity of the second target position.

16. The system of claim 10, wherein when the first image is obtained using the first capture device, the table is positioned at the first position such that a portion of the table is irradiated by a laser emitted from a laser source mounted on the device.

17. The system of claim 16, wherein the first target mock location is determined based on one or more pixels representing a light spot of the laser in the first image.

18. The system of claim 17, wherein at least one of the first image capturing device or the second image capturing device includes one or more cameras selected from the group consisting of: a stereo camera, a digital camera, and an infrared camera.

19. The system of claim 10, wherein the determining, in the first image, a first target mock location comprises:

obtaining, using a sixth image capturing device, a sixth image of the table of the device;

obtaining a registration relationship between the sixth image capturing device and the first image capturing device;

determining, in the sixth image, a third target mock location, the third target mock location being a pixel position in the third image of one or more pixels representing the first target position of the target region of the object;

determining, in the first image, the first target mock location based on the third target mock location and the registration relationship.

20. A non-transitory computer readable medium, comprising at least one set of instructions, wherein when executed by at least one processor of a computing device, the at least one set of instructions direct the at least one processor to perform operations including:

obtaining, using a first capture device, a first image of a table of the device, the table being positioned at a first position;

determining, in the first image, a first target mock location, the first target mock location being a pixel position in the first image of one or more pixels representing a first target position of a target region of the object to be scanned or treated by the device;

obtaining, using the first capture device, a second image of the object on the table of the device, the table being positioned at a second position;

identifying, in the second image, the target region of the object;

determining, in the second image, a starting mock location of the target region of the object based on a scanning direction or treating direction preset in the protocol, the starting mock location being a pixel position in the second image of one or more pixels representing a starting position of the target region of the object;

determining a first difference between the first target mock location and the starting mock location in a first direction; and causing the table to be adjusted based on the first difference such that the target region of the object is located at or in a vicinity of the first target position.

\* \* \* \* \*